(12) United States Patent
Rasmus et al.

(10) Patent No.: US 10,190,407 B2
(45) Date of Patent: Jan. 29, 2019

(54) METHODS FOR EVALUATING INFLOW AND OUTFLOW IN A SUBTERRAEAN WELLBORE

(71) Applicant: Schlumberger Technology Corporation, Sugar Land, TX (US)

(72) Inventors: John Rasmus, Richmond, TX (US); William Lesso, Anderson, TX (US); John James, Houston, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 169 days.

(21) Appl. No.: 15/189,343

(22) Filed: Jun. 22, 2016

(65) Prior Publication Data

US 2016/0376886 A1    Dec. 29, 2016

Related U.S. Application Data

(62) Division of application No. 13/585,628, filed on Aug. 14, 2012, now Pat. No. 9,394,783.

(Continued)

(51) Int. Cl.
*E21B 47/06* (2012.01)
*E21B 49/00* (2006.01)
(Continued)

(52) U.S. Cl.
CPC ............. *E21B 47/06* (2013.01); *E21B 21/08* (2013.01); *E21B 34/06* (2013.01); *E21B 43/12* (2013.01);
(Continued)

(58) Field of Classification Search
USPC ............................................. 702/9
See application file for complete search history.

(56) References Cited

U.S. PATENT DOCUMENTS 3,776,032 A * 12/1973 Vogel .................. E21B 47/101
73/152.19
3,934,468 A    1/1976 Brieger
(Continued)

FOREIGN PATENT DOCUMENTS

WO    2008/101333    8/2008
WO    2010/043951 A2    4/2010
(Continued)

OTHER PUBLICATIONS

Examination Report issued in related GB application GB1215031.4 dated Apr. 3, 2017. 4 pages.
(Continued)

*Primary Examiner* — Paul D Lee

(57) ABSTRACT

A method for evaluating inflow or outflow in a subterranean wellbore includes acquiring first and second axially spaced pressure measurements in the wellbore. The pressure measurements may then be processed to obtain an interval density of drilling fluid between the measurement locations. A tool string including a large number of axially spaced pressure sensors (e.g., four or more or even six or more) electronically coupled with a surface processor via wired drill pipe may be used to obtain a plurality of interval densities corresponding to various wellbore intervals. The interval density may be measured during static conditions or while drilling and may be further processed to compute a density of an inflow constituent in the annulus. Changes in the computed interval density with time may be used as an indicator of either an inflow event or an outflow event.

13 Claims, 29 Drawing Sheets

Related U.S. Application Data

(60) Provisional application No. 61/527,948, filed on Aug. 26, 2011.

(51) Int. Cl.
  *E21B 47/04* (2012.01)
  *E21B 21/08* (2006.01)
  *E21B 34/06* (2006.01)
  *E21B 43/12* (2006.01)
  *E21B 49/08* (2006.01)
  *G01V 3/38* (2006.01)
  *E21B 47/10* (2012.01)

(52) U.S. Cl.
  CPC ............ *E21B 47/04* (2013.01); *E21B 49/003* (2013.01); *E21B 47/10* (2013.01); *E21B 49/087* (2013.01); *G01V 3/38* (2013.01)

(56) References Cited

U.S. PATENT DOCUMENTS

| | | | |
|---|---|---|---|
| 3,971,926 A | 7/1976 | Gau et al. | |
| 4,412,130 A * | 10/1983 | Winters | G01V 5/12 250/260 |
| 4,492,865 A * | 1/1985 | Murphy | E21B 21/08 250/254 |
| 4,571,693 A * | 2/1986 | Birchak | E21B 47/101 702/54 |
| 4,625,553 A | 12/1986 | Charter et al. | |
| 4,703,664 A | 11/1987 | Kirkpatrick et al. | |
| 4,733,232 A * | 3/1988 | Grosso | E21B 21/08 175/48 |
| 4,860,581 A | 8/1989 | Zimmerman et al. | |
| 4,894,534 A * | 1/1990 | Paske | G01V 5/12 250/254 |
| 4,949,575 A | 8/1990 | Rasmus | |
| 5,375,465 A | 12/1994 | Carlson et al. | |
| 5,553,034 A | 9/1996 | Georgi et al. | |
| 5,634,522 A | 6/1997 | Hershberger et al. | |
| 6,148,912 A * | 11/2000 | Ward | E21B 21/08 166/250.07 |
| 6,176,323 B1 | 1/2001 | Weirich et al. | |
| 6,237,404 B1 | 5/2001 | Crary et al. | |
| 6,257,354 B1 | 7/2001 | Schrader et al. | |
| 6,405,808 B1 | 6/2002 | Edwards et al. | |
| 6,766,254 B1 | 7/2004 | Bradford et al. | |
| 6,968,909 B2 | 11/2005 | Aldred et al. | |
| 7,003,439 B2 | 2/2006 | Aldred et al. | |
| 7,136,795 B2 | 11/2006 | Downton | |
| 7,207,396 B2 | 4/2007 | Hall et al. | |
| 7,775,299 B2 | 8/2010 | Khan et al. | |
| 7,805,247 B2 | 9/2010 | Hsu et al. | |
| 7,967,081 B2 | 6/2011 | Sugiura et al. | |
| 8,004,421 B2 | 8/2011 | Clark | |
| 8,061,444 B2 | 11/2011 | Mullins et al. | |
| 8,111,171 B2 | 2/2012 | Clark | |
| 8,121,788 B2 | 2/2012 | Bordakov et al. | |
| 8,429,962 B2 | 4/2013 | Zazovsky et al. | |
| 8,502,696 B2 | 8/2013 | Clark | |
| 8,860,582 B2 | 10/2014 | Clark | |
| 9,228,401 B2 | 1/2016 | Edwards et al. | |
| 9,404,327 B2 | 8/2016 | Rasmus et al. | |
| 2002/0074127 A1 | 6/2002 | Birckhead et al. | |
| 2002/0103630 A1 | 8/2002 | Aldred et al. | |
| 2003/0005747 A1 | 1/2003 | Van Der Geest et al. | |
| 2003/0079912 A1 | 5/2003 | Leuchtenberg et al. | |
| 2003/0127230 A1 * | 7/2003 | von Eberstein, Jr. ... | E21B 21/08 166/337 |
| 2003/0139916 A1 * | 7/2003 | Choe | E21B 21/001 703/10 |
| 2004/0190589 A1 | 9/2004 | Zazovsky et al. | |
| 2004/0211595 A1 | 10/2004 | Pinckard et al. | |
| 2005/0194184 A1 | 9/2005 | Gleitman | |
| 2005/0257611 A1 | 11/2005 | Fogal et al. | |
| 2005/0269079 A1 | 12/2005 | Franklin et al. | |
| 2005/0284641 A1 | 12/2005 | Watkins et al. | |
| 2006/0039842 A1 | 2/2006 | Day et al. | |
| 2007/0144740 A1 * | 6/2007 | Guo | E21B 47/1015 166/254.2 |
| 2007/0151762 A1 | 7/2007 | Reitsma | |
| 2007/0246263 A1 | 10/2007 | Reitsma | |
| 2008/0033704 A1 | 2/2008 | Sayers et al. | |
| 2008/0060846 A1 | 3/2008 | Belcher et al. | |
| 2009/0030858 A1 | 1/2009 | Hegeman et al. | |
| 2009/0205822 A1 | 8/2009 | Difoggio et al. | |
| 2009/0294174 A1 | 12/2009 | Harmer | |
| 2010/0006341 A1 | 1/2010 | Downton | |
| 2010/0042325 A1 | 2/2010 | Beasley et al. | |
| 2010/0067329 A1 | 3/2010 | Edwards et al. | |
| 2010/0101774 A1 | 4/2010 | Ocondi et al. | |
| 2010/0175925 A1 | 7/2010 | Ciglenec et al. | |
| 2010/0193184 A1 | 8/2010 | Dolman et al. | |
| 2010/0201540 A1 | 8/2010 | Li et al. | |
| 2010/0224360 A1 * | 9/2010 | MacDougall | E21B 17/07 166/250.01 |
| 2011/0077867 A1 | 3/2011 | Evans et al. | |
| 2011/0276187 A1 | 11/2011 | Ciglenec et al. | |
| 2012/0013481 A1 | 1/2012 | Clark | |
| 2012/0014219 A1 | 1/2012 | Clark | |
| 2012/0024606 A1 | 2/2012 | Pirovolou et al. | |
| 2012/0037361 A1 * | 2/2012 | Santos | E21B 21/08 166/250.08 |
| 2012/0145462 A1 | 6/2012 | Leising et al. | |
| 2012/0152533 A1 | 6/2012 | Hoefel et al. | |
| 2012/0160563 A1 | 6/2012 | Clark et al. | |
| 2012/0160565 A1 | 6/2012 | Downton et al. | |
| 2013/0000981 A1 | 1/2013 | Grimmer et al. | |
| 2013/0008648 A1 | 1/2013 | Lovorn et al. | |
| 2013/0022476 A1 | 1/2013 | Villareal et al. | |
| 2013/0047696 A1 | 2/2013 | Rasmus et al. | |
| 2013/0048380 A1 | 2/2013 | Rasmus et al. | |
| 2013/0049983 A1 | 2/2013 | Rasmus et al. | |
| 2013/0054146 A1 | 2/2013 | Rasmus et al. | |
| 2013/0090854 A1 | 4/2013 | Rasmus et al. | |
| 2013/0090855 A1 | 4/2013 | Rasmus et al. | |
| 2013/0301389 A1 | 4/2013 | Alford et al. | |
| 2013/0151159 A1 | 6/2013 | Pomerantz et al. | |
| 2013/0204534 A1 | 8/2013 | Anand et al. | |
| 2013/0304679 A1 | 11/2013 | Fleming et al. | |
| 2014/0291023 A1 | 10/2014 | Edbury et al. | |

FOREIGN PATENT DOCUMENTS

| | | |
|---|---|---|
| WO | 2011/044070 | 4/2011 |
| WO | 2011/110914 A2 | 9/2011 |
| WO | WO2011119668 A1 | 9/2011 |
| WO | 2011/124978 A2 | 10/2011 |
| WO | 2011/146923 | 11/2011 |

OTHER PUBLICATIONS

Examination Report issued in related GB application GB1215047.0 dated Apr. 3, 2017. 4 pages.
Examination Report issued in related GB application GB1215056.1 dated Apr. 3, 2017. 4 pages.
Examination Report issued in related GB application GB1215064.5 dated Apr. 3, 2017. 4 pages.
Examination Report issued in related GB application GB1215070.2 dated Feb. 16, 2017. 5 pages.
Examination Report issued in related GB application GB1215078.5 dated Apr. 3, 2017. 4 pages.
Office action 81807 issued in related MX application MX/a/2012/009933 dated Oct. 13, 2014. 4 pages.
Office action 1786 issued in related MX application MX/a/2012/009937 dated Jan. 13, 2015. 6 pages.
Non-Final Rejection Issued in U.S. Appl. No. 13/585,495 dated Apr. 16, 2015. 20 pages.
Non-Final Rejection Issued in U.S. Appl. No. 13/585,562 dated Mar. 31, 2015. 10 pages.
Non-Final Rejection Issued in U.S. Appl. No. 13/585,601 dated Feb. 20, 2015. 15 pages.

(56) References Cited

OTHER PUBLICATIONS

Non-Final Rejection Issued in U.S. Appl. No. 13/585,601 dated Jul. 31, 2015. 9 pages.
Non-Final Rejection Issued in U.S. Appl. No. 13/585,628 dated Apr. 21, 2015. 15 pages.
Non-Final Rejection Issued in U.S. Appl. No. 13/585,650 dated Jan. 15, 2015. 11 pages.
Non-Final Rejection Issued in U.S. Appl. No. 14/819,810 dated Oct. 6, 2016. 14 pages.
Non-Final Rejection Issued in U.S. Appl. No. 13/585,791 dated Dec. 1, 2014. 23 pages.
Final Rejection Issued in U.S. Appl. No. 13/585,791 dated Apr. 6, 2015. 24 pages.
Search Report for related GB Application No. 1215031.4, dated Oct. 9, 2012, 4 pages.
Search Report for related GB Application No. 1215047.0, dated Oct. 9, 2012, 4 pages.
Search Report for related GB Application No. 1215056.1, dated Oct. 9, 2012, 4 pages.
Search Report for corresponding GB Application No. 1215064.5, dated Oct. 9, 2012, 4 pages.
Search Report for related GB Application No. 1215078.5, dated Oct. 9, 2012, 4 pages.
Notice of Allowance for corresponding MX App No. MX/a/2012/009936 with partial translation from Agent Letter, dated Apr. 8, 2015.
Office Action for corresponding MX App No. MX/a/2012/009936 with partial translation from Agent Letter, dated Jul. 29, 2014.
Office Action for related MX App No. MX/a/2012/009937 with partial translation from Agent Letter, dated Apr. 21, 2015.
Search Report for the co-pending GB patent application No. 1215070.2 dated Nov. 13, 2012.
J.C. Rasmus, et al. "Real-Time Pore-Pressure Evaluation From MWD/LWD Measurements and Drilling-Derived Formation Strength," SPE Drilling Engineering, 1991, pp. 264-272.
I.G. Falconer, T.M. Burgess, and M.C. Sheppard, "Separating Bit and Lithology Effects From Drilling Mechanics Data", SPE 17191, SPE Conference 1988, pp. 123-136.
Office action for the equivalent Mexican patent application No. MX/a/2012/009937 dated Feb. 11, 2015.
J.C. Rasmus, D.M.R. Gray Stephens, "Real-Time Rare-Pressure Evaluation from MWD/LWD Measurements and Drilling-Derived Formation Strength," SPE #20443.
Sifferman, et al., "Drill Cutting Transport in Full-Scale Vertical Annuli," J. Pet. Tech., Nov. 1974, 1295-1302.
Moore, "Drilling Practices Manual," Petroleum Publishing Co., Tulsa, 1974.
K. J. Sample and A.T. Bourgoyne, "Development of Improved Laboratory and Field Procedures for Determining the Carrying Capacity of Drilling Fluids," SPE 7497, 1978.
GB Examination Report issued in related case GB1215070.2 dated Jul. 27, 2016. 4 pages.
Office Action 64695 issued in Mexican Patent Application MX/a/2012/009938 dated Aug. 6, 2018, 4 pages.

* cited by examiner

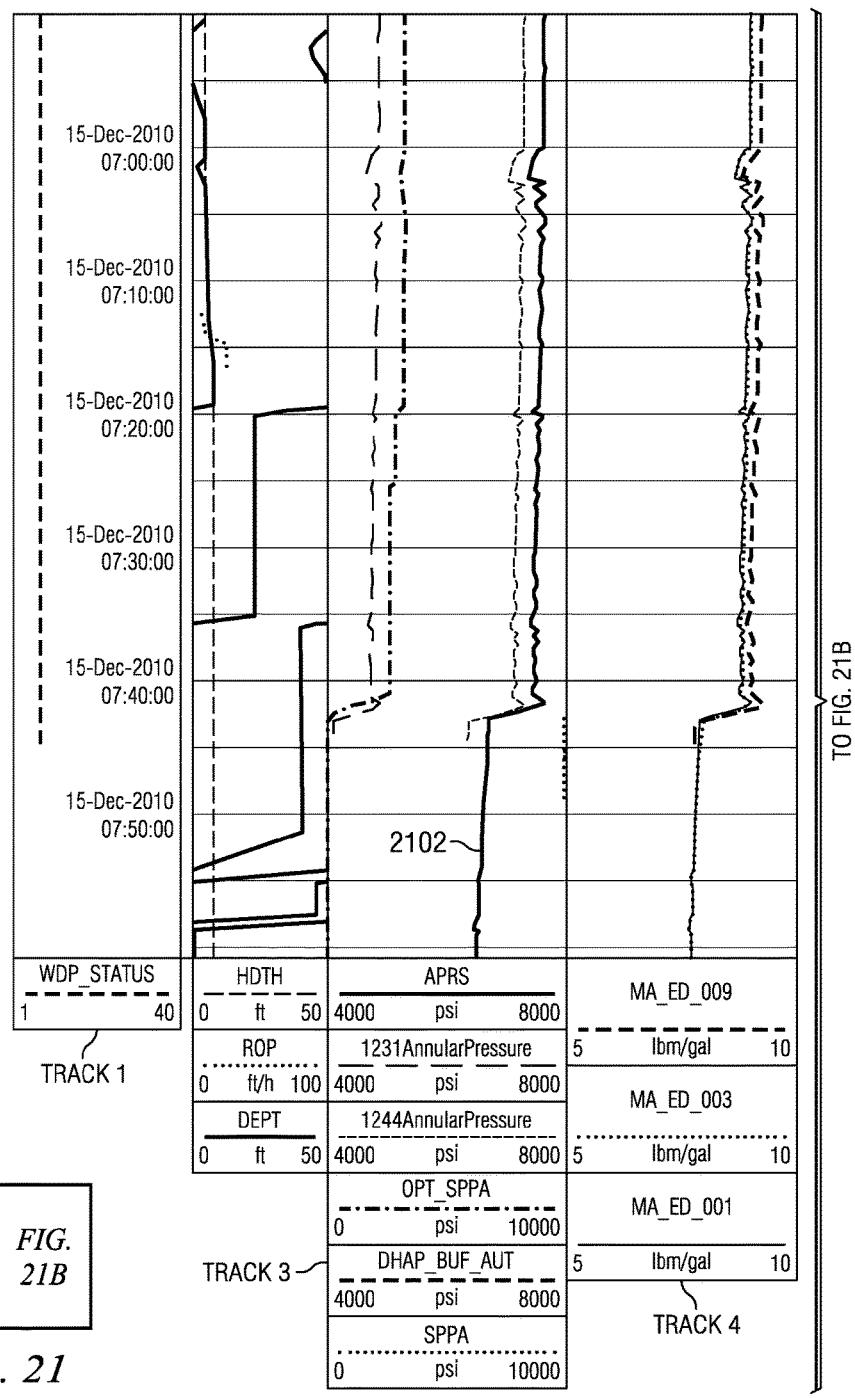

METHODS FOR EVALUATING INFLOW AND OUTFLOW IN A SUBTERRAEAN WELLBORE

CROSS REFERENCE TO RELATED APPLICATIONS

This application is a divisional of Non Provisional application Ser. No. 13/585,628 filed on Aug. 14, 2012, which claims the benefit of U.S. Provisional Application Ser. No. 61/527,948 filed on Aug. 26, 2011.

FIELD OF THE INVENTION

Disclosed embodiments relate generally to geotechnical field measurements and more particularly to Along String Measurements (ASM) that may be incorporated in repeater hardware sections of Wired Drill Pipe (WDP). Methods are disclosed for computing sequential and non-sequential pressure and temperature measurements in these repeaters as well as pressures and temperatures measured by Bottom Hole Assembly (BHA) components. Methods are further disclosed for utilizing these measurements to characterize the subterranean formations, the drilling fluid, and the drilling process.

BACKGROUND INFORMATION

During drilling operations, measurements of downhole conditions taken while drilling can provide valuable information that may be used to by a drilling operator to improve efficiency and performance and minimize risk. Such measurements, when transmitted to the surface while drilling, may also provide an essentially real time view of changing downhole conditions allowing for essentially real time performance improvements and risk avoidance. There is considerable interest in the industry in risk avoidance since even relatively minor interruptions in drilling operations can be prohibitively expensive.

The recent introduction of Wired Drill Pipe (WDP) has significantly increased the communication bandwidth between downhole measurement sensors and the surface and therefore the total quantity of data that may be transmitted to the surface during a drilling operation. For example, measurement while drilling (MWD) and logging while drilling (LWD) data, including borehole imaging data, may be readily transmitted to the surface while drilling using WDP. Along string measurements (ASM), for example, including along string pressure and temperature measurements may also be transmitted to the surface during drilling.

While along string pressure and temperature measurements are known in the art, there has been no disclosure of methods for computing sequential and non-sequential pressure and temperature interval densities nor any methods of utilizing such interval densities to characterize the subterranean formations, the drilling fluid, or the drilling process. There remains a need in the art for further development.

SUMMARY

Methods for evaluating inflow and outflow in a subterranean wellbore are disclosed. For example, a tool string including at least first and second axially spaced pressure sensors may be deployed in a subterranean borehole. Pressure measurements may then be used to compute an annular interval density between the pressure sensors (i.e., between first and second measured depths in the borehole). The tool string may further include a large number of longitudinally spaced pressure sensors (e.g., four or more or even six or more) electronically coupled with a surface processor via wired drill pipe. The interval density may be measured during static conditions or while drilling and may be further processed to compute a density of an inflow constituent in the annulus. Moreover, changes in the computed interval density with time may be used as an indicator of either an inflow of formation fluid into the wellbore (an inflow event) or a lost circulation event in which drilling fluid flows out of the annulus into a subterranean formation (an outflow event).

The disclosed embodiments may provide various technical advantages. For example, disclosed embodiments may provide for timely detection of an inflow event, which in turn provides for timely mitigation. In many drilling operations timely mitigation may be required to prevent a dangerous kick. Moreover, disclosed embodiments may enable a density of an inflow constituent to be computed, thereby possibly distinguishing between a gaseous, oil, or connate water based inflow event. Disclosed methods may further enable a lost circulation event to be identified. In certain embodiments a measured depth interval of the inflow or outflow event may also be located.

In one non-limiting embodiment a method for computing a density of an inflow constituent in a subterranean wellbore is disclosed. The method includes: (a) acquiring first and second subsurface annular pressure measurements at corresponding first and second measured depths in the wellbore; (b) causing a processor to process the first and second annular pressure measurements to compute an annular interval density between the first and second measured depths in the wellbore; and (c) causing the processor to process the annular interval density and a differential flow rate to compute the density of the inflow constituent.

In a second non-limiting embodiment a method for identifying an inflow event in a subterranean wellbore is disclosed. The method includes: (a) processing a plurality of axially spaced annular pressure measurements to compute a plurality of annular interval densities; (b) monitoring the computed annular interval densities with time; and (c) evaluating a decrease in at least one of the annular interval densities and an increase in a differential flow rate as an indicator of an inflow event.

In a third non-limiting embodiment a method for identifying an outflow event in a subterranean wellbore is disclosed. The method includes: (a) processing a plurality of axially spaced annular pressure measurements to compute a plurality of annular interval densities; (b) monitoring the computed annular interval densities with time; and (c) evaluating a decrease in at least one of the annular interval densities and a decrease in a differential flow rate as an indicator of an outflow event.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

For a more complete understanding of the disclosed subject matter, and advantages thereof, reference is now made to the following descriptions taken in conjunction with the accompanying drawings, in which:

FIGS. 6, 9, and 10 depict a hypothetical example of well drilling operation in which a portion of the borehole becomes enlarged during the drilling operation with FIG. 6 depicting the hypothetical drilling operation at time $t_1=0$, FIG. 9 depicting time $t_2=t_1+\Delta t$, and FIG. 10 depicting time $t_3=t_2+\Delta t$.

FIGS. 14, 19, and 20 depict a hypothetical example of a well drilling operation including a drilling fluid outflow event with FIG. 14 depicting the hypothetical drilling operation at time $t_1=0$ and FIGS. 19 and 20 depicting time $t_2=t_1+\Delta t$. FIG. 20 differs from FIG. 19 in that the drilling fluid level has dropped below the first ASM.

DETAILED DESCRIPTION

Figure 1:
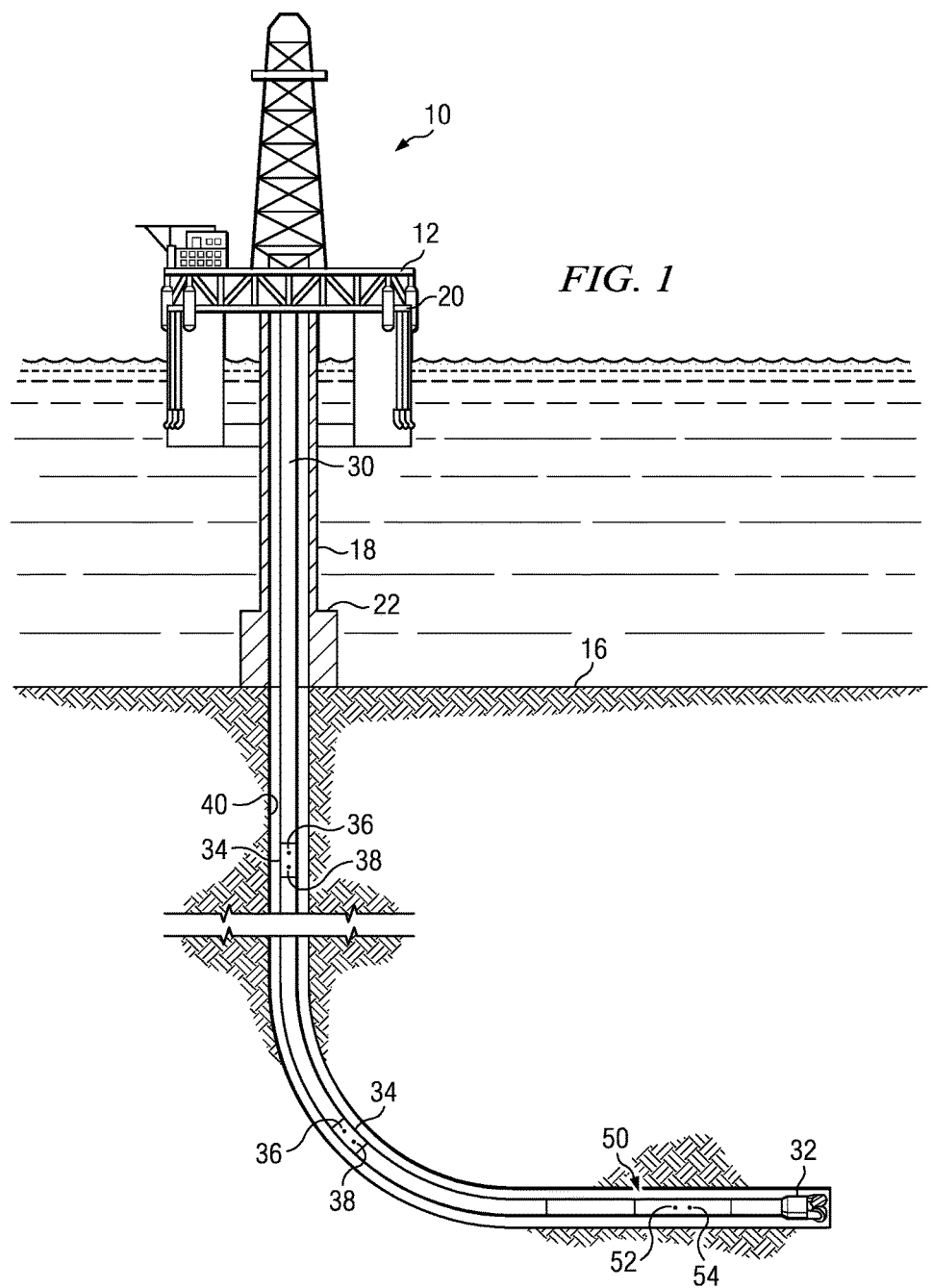
FIG. 1 depicts one example of a conventional drilling rig on which disclosed methods may be utilized.

FIG. 1 depicts a drilling rig 10 suitable for using various method embodiments disclosed herein. A semisubmersible drilling platform 12 is positioned over an oil or gas formation (not shown) disposed below the sea floor 16. A subsea conduit 18 extends from deck 20 of platform 12 to a wellhead installation 22. The platform may include a derrick and a hoisting apparatus for raising and lowering a drill string 30, which, as shown, extends into borehole 40 and includes a drill bit 32 deployed at the lower end of bottom hole assembly (BHA) 50. In the depicted embodiment, drill string 30 includes a plurality of joints of wired drill pipe and therefore provides a high bandwidth digital communications channel (e.g., a bandwidth on the order of 5 kilobits/sec) between the BHA 50 and the surface.

Drill string 30 includes a plurality of longitudinally spaced wired drill pipe repeater subs 34, at least some of which include annular pressure and temperature sensors 36 and 38. These sensor containing repeater subs may be referred to herein as XLINKS and may optionally further include internal pressure and temperature sensors (not shown). It will be understood that internal sensors are configured to measure the pressure and temperature of the drilling fluid in the drill string 30 while the annular (or external) sensors are configured to measure the pressure and temperature of the drilling fluid in the annulus between the drill string 30 and the borehole wall. Internal and annular pressure and temperature sensors may also be deployed within the various MWD and/or LWD tools included in the BHA 50. Example BHA pressure and temperature sensors are depicted at 52 and 54. The aforementioned pressure and temperature sensors may be in communication with the surface via the high bandwidth digital communications channel such that the along string pressure and temperature measurements may be transmitted to the surface while drilling. The pressure and temperature sensors (or the repeater subs 34) may also include onboard memory for saving the pressure and temperature measurements for later analysis. Other drill-string components (although not explicitly depicted) may also contain annular and internal pressure and temperature sensors, for example, including EMAG repeaters, mud pulse signal boosters and, acoustic telemetry boosters. Pressure and temperature measurements obtained via these sensors may also be transmitted to the surface while drilling (or stored in downhole memory) and utilized in the method embodiments disclosed hereinbelow.

The pressure and temperature sensors may have substantially any longitudinal spacing along the length of the drill string 30. For example, the spaced pressure and temperature sensors may have a longitudinal spacing in a range from about 500 to about 5000 feet in measured depth. Moreover, the spacing between the pressure and temperature sensors is not necessarily uniform. For example, a longitudinal spacing between first and second sensors is not necessarily equal to the spacing between second and third sensors. The disclosed embodiments are not limited in these regards.

The disclosed embodiments are also not limited to the use any particular type of BHA and/or repeater sub pressure sensors. Substantially any suitable pressure sensors may be utilized provided that they provide sufficient accuracy and precision and are robust in demanding downhole environments. For example, pressure sensors that make use of strain gauges (such as those that are commercially available from Paine Electronics, LLC) may be utilized. Likewise, silicon-on-insulator solid state pressure gauges may also be utilized.

It will be understood that the deployment illustrated on FIG. 1 is merely an example. BHA 50 may include substantially any suitable downhole tool components, for example, including a steering tool such as a rotary steerable tool, a downhole telemetry system, and one or more MWD or LWD tools including various sensors for sensing downhole characteristics of the borehole and the surrounding formation.

The disclosed embodiments are not limited in these regards. Moreover, the disclosed methods may be used in wellbore applications other than drilling application, for example, including fluid sampling applications, well control during tripping, well maintenance, completion and production applications, and the like.

It will be further understood that disclosed embodiments are not limited to use with a semisubmersible platform 12 as illustrated on FIG. 1. The disclosed embodiments are equally well suited for use with either onshore or offshore subterranean operations. Moreover, it will be appreciated that the terms borehole and wellbore are used interchangeably herein.

The foregoing detailed description is divided into two principle sections, the first describing methodologies for computing interval gradients for along string pressure and temperature measurements. The second section describes methodologies for utilizing the computed interval gradients to interpret various formation and drilling fluid properties and the overall drilling process.

Interval Density Computation Methodologies

Figures 2, 3:
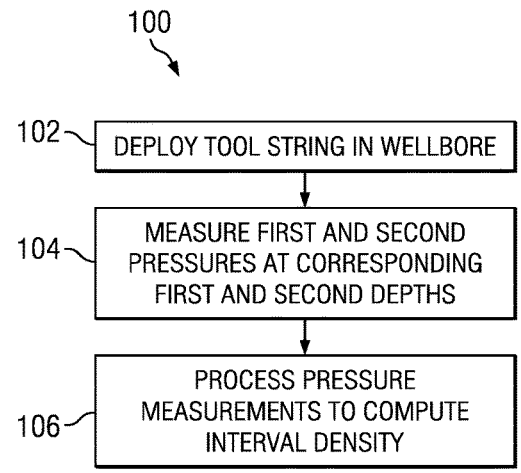
FIG. 2 depicts a flow chart of one example of a method embodiment for obtaining an interval density of a subterranean wellbore.
FIG. 3 depicts one example of a multi-dimensional depth and time based array (database) including two variables.

FIG. 2 depicts a flow chart of one example of a method embodiment 100 for determining an interval density in a subterranean wellbore. A tool string (e.g., drill string 30 depicted on FIG. 1 or a production or completion string) is deployed in the wellbore at 102. The tool string includes at least first and second subsurface pressure sensors (e.g., annular pressure sensors or internal pressure sensors) deployed at corresponding first and second measured depths in the wellbore. The pressure sensors may be used to measure corresponding first and second pressures at 104. The first and second pressures may then be processed to obtain the interval density at 106. It will be understood that tools strings employing three or more pressure sensors may also be utilized and enable a plurality of interval densities to be obtained.

The density of a fluid under static conditions within the interval between two pressure measurements may be computed from knowledge of a vertical spacing between the pressure sensors and the actual pressure measurements. A temperature gradient can likewise be computed. In general, given a number n spaced apart pressure measurements, a corresponding number of intervals between all sensor combinations (neighbor and otherwise) may be computed, for example, as follows:

$$\text{Number of Intevals} = \Sigma_{i=1}^{i=n-1}(n-i) \quad \text{Equation 1}$$

For example, given 2 spaced apart sensors, 1 interval is available; given 3 spaced apart sensors, 3 intervals are available; given 4 spaced apart sensors, 6 intervals are available, given 5 spaced apart sensors, 10 intervals are available, and so on. In certain of the disclosed method embodiments the number of interval densities computed N may, for example, be in the range: $n-1 \leq N \leq \Sigma_{i=1}^{i=n-1}(n-i)$.

Utilizing any one annular pressure measurement, a density of a fluid (e.g., drilling fluid) under static conditions in a wellbore may be computed, for example, as follows:

$$\text{Annular density}_{avg} = \left(\frac{P}{Z_{md}\cos(Inc)}\right)C_1 = \left(\frac{P}{TVD}\right)C_1 \quad \text{Equation 2}$$

where the annular density represents an average density of the annular fluid (e.g., in pounds per gallon), P represents the annular pressure (e.g., in psia), $Z_{md}$ represents the measured depth of the well, TVD represents the true vertical depth of the well, Inc represents the average borehole inclination, and $C_1$ represents a units conversion constant (e.g., 19.25 ppg/psi/ft).

It will be understood by those of ordinary skill in the art that the density of a fluid may be expressed in various units. The common oilfield unit of pounds per gallon is given in Equation 2. Equivalent vertical head may be used to express the pressure in terms of the vertical height of a column of fluid and may be computed as follows:

$$\text{Equivalent Vertical Head} = \frac{PC_1}{\text{density}_{avg}} \quad \text{Equation 3}$$

where, as is known to those of ordinary skill in the art, vertical head refers to hydraulic head (e.g., in units of feet).

Measured Annulus Interval Circulating Density

Of particular interest in this disclosure are methods for computing interval densities (i.e., the density of the fluid) between various spaced apart sensors (e.g., between first and second sensors or between first, second, and third sensors). Utilizing the pressure measurements associated with the endpoints of a specific interval, the density of a fluid between the two sensors may be computed for various specific cases according to the following methodologies. For example, the interval density of a circulating fluid may be computed as follows:

$$\text{MA\_ICD}_{avg} = \frac{\Delta P}{\Delta TVD}C_1 \quad \text{Equation 4}$$

$$\text{MA\_ICD}_{avg} = \left[\frac{(P_{n+1}-P_n)C_1}{(Z_{MD(n+1)}-Z_{MD(n)})\cos(Inc)}\right] = \left[\frac{(P_{n+1}-P_n)^*C_1}{(Z_{TVD(n+1)}-Z_{TVD(n)})}\right]$$

where MA_ICD represents an averaged measured annulus interval circulating density, $\Delta P$ represents a change in pressure between first and second measured depths, $\Delta TVD$ represents a change in true vertical depth between the first and second measured depths, $P_n$ and $P_{n+1}$ represent annular pressure measurements at the first and second depths n and n+1, $Z_{MD(n)}$ and $Z_{MD(n+1)}$ represent the first and second measured depths, and $Z_{TVD(n)}$ and $Z_{TVD(n+1)}$ represent the true vertical depths of the first and second measured depths. Those of ordinary skill in the art will readily appreciate that the true vertical depth (or a change in true vertical depth) may be represented by the measured depth (or a change in measured depth) times the cosine of the average wellbore inclination within an interval.

Under dynamic conditions, e.g., when circulating drilling fluid during a drilling operation, MA_ICD includes the effects of temperature on the compressibility of the input drilling fluid, absolute pressure effects on the density, the volume and mass of the suspended cuttings, the inflow or outflow of drilling fluid between the sensors, and the frictional pressure losses of the circulating mud. This computed interval density (MA_ICD) is described in more detail below via various plots and comparisons with other computed interval densities (e.g., in FIGS. 6 through 26).

Measured Annulus Interval Static Density

Interval densities may also be computed during non-circulating (static) conditions as well using Equation 4. Such conditions are generally available at every connection while adding a pipe stand or a joint to the drill string and occasionally while drilling is suspended during the drilling of a stand. Under such static conditions, the annular frictional pressure losses are absent and the only effects on the interval densities are pressure, temperature, and suspended cuttings effects. This parameter is referred to as MA_ISD and is computed using Equation 4 but under static, non-circulating conditions.

A interval static density may also be computed by subtracting modeled or measured frictional pressure losses from MA_ICD as computed in Equation 4 when computed under circulating conditions. This approach enables a substantially continuous determination of the interval static density and is referred to as $MA\_ISD_{mf}$. Equation 4 may be modified to include these frictional pressure terms as shown below in Equation 5.

$$MA\_ISD_{mf} = \left[\frac{((P_{n+1} - P_{f_{n+1}}) - (P_n - P_{f_n}))^* C_1}{(Z_{TVD(n+1)} - Z_{TVD(n)})}\right] \quad \text{Equation 5}$$

where $P_{f_n}$ represents the frictional pressure loss acting on the fluid above the sensor n and $P_{f_{n+1}}$ represents the frictional pressure loss acting on the fluid above the sensor n+1.

Two methods for computing the frictional pressure loss are disclosed; a hydraulically modeled method and an in-situ measurement method. The hydraulic model makes use of various known or estimated fluid and bore properties to compute the frictional pressure loss. The properties may include, for example, temperature, pressure, compressibility, viscosity, flow rate, and flow regime of the drilling fluid, the annular volume of the borehole, the borehole diameter and shape, rotation rate effects, and properties of the borehole wall such as smoothness.

The measurement method may compute the interval density, for example, using Equation 4 under non-pumping static conditions for distinct hole sections or intervals in the well as a function of time. After the pumps are turned back on and before drilling resumes this quantity may be used in the left hand side of Equation 5 along with the measured pressures to compute $P_{f_{n-1}} - P_{f_n}$ for each distinct hole section in the well. The dynamic frictional pressure loss is generally a strong function of the flow rate and rotation rate for a given hole section and period of time during the drilling of the well. Therefore, this pressure loss is generally a slowly varying value with time under steady state flow conditions. For example, it may be in the range from 0.1 to 1 pound per gallon in a 10,000 foot vertical well. In this second method, an in-situ determination of frictional pressure loss only needs to be performed periodically as long as the drilling parameters do not change (e.g., rotation rate, flow rate, and the BHA components in each distinct hole section that may have a different frictional pressure loss). When the drilling parameters change, the second method may be repeated.

In practice it may be advantageous to make use of both the theoretical and measurement methodologies for computing the frictional pressure losses. For example, when the two methods give similar values, the hydraulic model may be used with increased confidence. Differences between the measured and modeled frictional losses may also be used to calibrate the hydraulic model, compute a cuttings density, or flag certain drilling events of interest as described in more detail below.

Upon determining the frictional pressure losses, the measured annulus interval static density $MA\_ISD_{mf}$ may be determined while circulating and drilling by substituting the frictional pressure losses into Equation 5. The $MA\_ISD_{mf}$ may be computed at various time intervals during drilling.

It should be understood that in drilling operations in which back pressure is applied to the annular fluid (e.g., as is done during managed pressure drilling (MPD) applications), Equations 4 and 5 do not require a back pressure term since a differential pressure is used to determine the interval density. It should also be understood that the interval gradients are a direct function of a down-hole pressure and depth measurements. Therefore any of the principles applied to the interval gradient computations apply to pressure measurements, whether measured or theoretical.

Density of Constituent Mud Components

The measured annulus interval static density MA_ISD or computed $MA\_ISD_{mf}$ may be taken to be the sum of the individual densities of the individual components of the static annular fluid which may be valid for non-soluble components such as liquid formation fluids and formation cuttings normally encountered during drilling. This may be expressed mathematically, for example, as follows and may enable individual component specific gravities to be computed when their volumetric percentages are known:

$$MA\_ISD_{avg} = \sum_{i=1}^{i=n} \left(\frac{M_i}{V_i}\right) \quad \text{Equation 6}$$

where $MA\_ISD_{avg}$ represents an average measured annular interval static density, $M_i$ represents the mass of non-soluble component i, and $V_i$ represents the volume of non-soluble component i. $MA\_ISD_{avg}$ may also be expressed as a volume weighted average of the individual constituents in the drilling fluid mud. It should be noted that the product of volume and density also represents the mass and may therefore be re-written in terms of volumetric percentages as follows:

$$MA\_ISD_{mixture} = \sum_{i=1}^{i=n} \left(\frac{V_i * SG_i}{V_{mixture}}\right) \quad \text{Equation 7}$$

where $MA\_ISD_{mixture}$ represents the measured annular interval static density of a mixture, $V_i$ represents the volume of non-soluble component i, $V_{mixture}$ represents the total volume of the mixture, and $SG_i$ represents the density (or specific gravity) of component i.

The drilling fluid flowing towards the surface in the annulus generally includes a combination of the drilling fluid that is pumped downward through the interior of the drill pipe and cuttings removed by the drill bit during drilling. The volumetric flow rate in the annulus may be expressed as a combination of these two expected constituents plus an additional term that quantifies increased or reduced flow owing to the addition of an unexpected or unwanted constituent or the loss of a constituent. The additional term may quantify, for example, an inflow of formation fluid into the annulus or an outflow of drilling fluid into the formation. The inflow or outflow may involve either previously drilled or currently drilled formations. Alternatively, the additional term may quantify additional cuttings spalling off the borehole wall after drilling. ASM and corresponding interval density computations may enable the enable these inflow or outflow constituents to be identified and located along the length of the borehole.

As stated above, the annular drilling fluid includes a combination of the drilling fluid that is pumped downward through the interior of the drill pipe and cuttings removed by the drill bit. The cuttings volume may be accounted for by integrating the flow rate in a unit volume of annular fluid over a specified time interval and recognizing that the flow rate out of the unit volume must equal the flow rate into the unit volume. In other words, the flow rate of the mixture may be set equal to the sum of the individual flow rates into this volume. The accumulated volume of the mixture flowing out of the unit annular volume over a given time period may be expressed mathematically, for example, as follows:

$$\int_{t1}^{t2} Q_{mixture}\, dt = \int_{t1}^{t2} Q_{out}\, dt = \int_{t1}^{t2} (Q_{mud\ in} + Q_{cuttings} + Q_x)\, dt \quad \text{Equation 8}$$

where $Q_{mixture}$ represents the volumetric flow rate of the mixture at time t, $Q_{out}$ represents the volumetric flow rate out of the unit annular volume, $Q_{mud\ in}$ represents the volumetric flow rate of drilling fluid (mud) pumped into the unit annular volume at time t, $Q_{cuttings}$ represents the volumetric flow rate of cuttings flowing into the unit annular volume at time t, and $Q_x$ represents the volumetric flow rate of component x flowing in or out of the unit annular volume at time t. $Q_{mud\ in}$ and $Q_{cuttings}$ may be further defined, for example, as follows:

$$Q_{mud\ in} = TFLO \left(\frac{gal}{min}\right) * \left(\frac{60\ min}{1\ hr}\right) * \left(0.1337 \frac{ft^3}{gal}\right) \quad \text{Equation 9}$$

where TFLO represents the drilling fluid flow rate in units of gallons per minute. TFLO may be determined at the surface using methods known to those of ordinary skill in the art, for example, using the rig pump stroke rate, number of pump cylinders in use, their displacement/stroke, and the pump efficiency. When pumping a compressible fluid such as synthetic oil-based mud (SOBM), the down-hole flow rates tend to change due to pressure and temperature effects on the fluid properties. The measured ASM pressures and temperatures of the interior drill pipe fluid properties may be used to measure the fluid temperature and density in the drill pipe in order to determine the in-situ fluid compressibility and from this calculate the actual down-hole flow rate given the surface flow rate. The downhole flow rate may also be measured downhole.

The volume rate of cuttings being created and flowing into the annulus during the drilling operation may be considered an input variable and may be expressed mathematically, for example, as follows:

$$Q_{cuttings} = \pi * r^2 * ROP\left(\frac{ft}{hr}\right)(1 - K*\phi) \quad \text{Equation 10}$$

where r represents the borehole radius, ROP represents the drilling rate of penetration, K represents percentage of formation porosity destroyed by the crushing action of the bit, and $\phi$ represents the formation effective porosity.

The percentage of formation porosity destroyed by the action of the bit K may be estimated by observing the size of the cuttings while drilling. When K is set to unity, the crushing action of the bit destroys all of the porosity, creating cuttings akin to individual sand grains. For example, in unconsolidated sands, the cuttings size will be small and few present with predominantly individual sand grains seen in the samples caught coming from the shale shakers. In shale formations, competent or cemented rock, K is typically less than unity due to the crushing component of the bit being reduced (or minimized depending upon the hardness of the formation).

Determining a value of K may be advantageous in certain drilling operations, for example, when a driller desires to compute an expected volumetric flow rate of cuttings in certain cuttings management programs that determine the volume of cuttings that remain in the borehole and may potentially restrict the movement of the BHA. However, in certain applications it may be sufficient to set K to unity so as to have $Q_{cuttings}$ represent the matrix or rock volume of the formation. This allows the density of the fluid contained within the pore volume to be accounted separately in Equation 11.2 as described in more detail below.

The formation porosity $\phi$ may be estimated, for example, from a normalized rate of penetration (ROP) as disclosed in U.S. Pat. No. 4,949,575 or in Rasmus and Stephens (SPE Paper 20443, *Real-Time Pore-Pressure Evaluation From MWD/LWD Measurements and Drilling-Derived Formation Strength*). However, a fractional volume of fine grained clay/shale/silt in the formation, $V_{shale}$, is generally required for this determination. $V_{shale}$ is normally computed from LWD measurements such as natural gamma ray measurements, however, such LWD measurements are not generally available at the bit.

In certain applications, a dimensionless torque ($T_D$), obtained, for example, from a Mechanical Efficiency Log may be used to differentiate between drilling a porous formation and a shale formation due to the unique and increased dimensionless torque signature of a porous formation as compared to shale. Such differentiation can commonly be made regardless of drill bit type. One example of a Mechanical Efficiency Log is given in Equation 11. $V_{shale}$ may be estimated from $T_D$ and a dimensionless rate of penetration ($R_D$) by realizing that both $T_D$ and $R_D$ are functions of clay volumes and effective porosity regardless of the wear conditions of the bit (see Burgess, Falconer, and Sheppard, "*Separating Bit and Lithology Effects From Drilling Mechanics Data*", SPE 17191, 1988). Such $V_{shale}$ measurements may then be updated once LWD data above the bit measures the formation properties. $T_D$ and $R_D$ may be expressed mathematically, for example, as follows:

$$T_D = \frac{12 * DTOR}{DWOB * BS} \quad \text{Equation 11}$$

Where DTOR represents a downhole or surface measured torque, DWOB represents a downhole or surface measured weight on bit, and BS represents a drill bit diameter.

$$R_D = \frac{ROP * 0.2}{RPM * BS} \quad \text{Equation 11.1}$$

Where ROP represents a rate of penetration and RPM represents a rotation rate of the drill string in revolutions per minute.

The pore fluid contained within the pore space of the formation may be retained within the cutting chip or released into the annular fluid depending on the crushing factor, K. Regardless of the degree of crushing, it will affect the measured interval densities of the annular fluid and may therefore be accounted for separately.

$$Q_{pore\_fluid} = \pi * r^{2} * ROP\left(\frac{ft}{hr}\right)(\phi) \qquad \text{Equation 11.2}$$

where $Q_{pore\_fluid}$ represents the pore fluid volumetric flow rate into the annulus in units of cubic feet per hour, r represents the borehole radius, ROP represents the rate of penetration, and $\phi$ represents the formation effective porosity.

The drilling fluid (mud) flow rate exiting the annulus at the surface, $Q_{mixture}$ or $Q_{out}$, may also be considered an input measureable volume and may be measured, for example, by a paddle-type measurement placed into the flow out line or by a venturi-type measurement or other means when utilizing managed pressure drilling (MPD) type equipment. This leaves the quantity $Q_x$ as the only unknown in Equation 8. In drilling operations this represents one way of detecting a formation fluid inflow or a "kick" (as it is referred) in the industry. However, under conditions in which $Q_x$ has been verified to be approximately equal to zero (e.g., via stopping the mud pumps and performing a flow check), Equation 8 may alternatively be used to measure the volume of cuttings flowing into the annulus.

However, in certain applications it can be difficult to utilize the above described methodology to determine $Q_x$ given measurements of $Q_{cuttings}$, $Q_{mud\_in}$ and $Q_{mixture}$ or $Q_{out}$. This can be due to large variations in mud flow volumes sometimes seen while drilling which can in turn be due to erratic pump strokes, fluid compressibility, and inaccurate sensor measurements of these quantities. Equation 10 is often the most accurate means of determining the cuttings volumes. Knowing the volume of cuttings generated and keeping track of the volume of cuttings exiting the wellbore allows one to determine the volume of cuttings, if any, that have been left in the borehole.

However, it is desirable to not only know the volume of cuttings being generated, but the density of the cuttings in the annulus between any two ASM pressure measurements since this gives us information as to the type of formation being drilled. Within any two or more arbitrary depths in the annulus, the relative volumetric percentage of the cuttings volume in the annulus makes up a larger percentage than that computed by Equation 8 due to the cuttings travelling upward through the annulus at a lower velocity than that of the drilling fluid. A corrected cuttings volume may be computed by considering a "slip" velocity for the cuttings where $V_{slip} = V_{annular} - V_{cuttings}$. A transport efficiency $F_{T\_cuttings}$ may be defined as the ratio of the cuttings velocity to the average mud annular velocity and may be expressed mathematically, for example, as follows:

$$F_{T\_cuttings} = \frac{VEL_{cuttings}}{VEL_{mixture}} = \frac{\left(\frac{Q_{cuttings}}{Area_{annulus}*f_{cuttings}}\right)*(\cos(Incl)+a^*\sin(Incl))}{\left(\frac{Q_{mud\ in}+Q_x+Q_{pore\_fluid}}{Area_{annulus}*(1-f_{cuttings})}\right)} \qquad \text{Equation 12}$$

where $f_{cuttings}$ represents the volumetric fraction of cuttings in the mud flowing in the annulus, $Area_{annulus}$ represents the cross sectional area of the annulus a particular depth Z, $Q_{mud}$ represents the volume flow rate of mud from Equation 9, $Q_{cuttings}$ represents the volume flow rate of cuttings from Equation 10, $Q_{pore\_fluid}$ represents the volume flow rate of pore fluid from Equation 11.2, and a represents a saltation flow transport partitioning coefficient, which is generally a function of RPM and $Q_{mixture}$.

The transport efficiency can be computed from empirical correlations such as those disclosed in (i) Sifferman, et al., "*Drill Cutting Transport in Full-Scale Vertical Annuli,*" *J. Pet. Tech.*, Nov 1974, 1295-1302; (ii) Moore, "*Drilling Practices Manual*," Petroleum Publishing Co., Tulsa, 1974, and (iii) *Sample and Bourgoyne, "Development of Improved Laboratory and Field Procedures for Determining the Carrying Capacity of Drilling Fluids,"* SPE 7497, 1978. The volumetric fraction of cuttings flowing in the annulus is also a function of wellbore inclination since the cuttings tend to fall out of suspension in high inclination sections. The constant a is used to account for the fact that as the wellbore becomes closer to horizontal, the cuttings tend to drop out of suspension and are transported along the wellbore in a "saltation" type mechanism. The inclination and saltation terms in Equation 12 are intended to result in a net upward or vertical cuttings slip velocity. Equation 12 may then be rearranged to compute the term $f_{cuttings}$, for example, as given in Equation 13.

$$f_{cuttings} = \frac{X*Q_{cuttings}}{X*Q_{cuttings} + F_{T\_cuttings}*(Q_{mud\ in}+Q_x+Q_{pore\_fluid})} \qquad \text{Equation 13}$$

where X=cos Inc+a sin Inc.

Being liquid at downhole temperatures and pressures, the formation pore fluid volume that is released into the annulus may have negligible slip velocity with respect to the mud. The fractional volume of the pore fluid $f_{pore\_fluid}$, mud $f_{mud\_in}$, and influx/outflux material $f_x$ may then be given, for example, as follows in Equation 13.1, 13.2, and 13.3.

$$f_{pore\_fluid} = \frac{X*F_{T\_cuttings}*Q_{pore\_fluid}}{X*Q_{cuttings} + F_{T\_cuttings}*(Q_{mud\ in}+Q_x+Q_{pore\_fluid})} \qquad \text{Equation 13.1}$$

$$f_{mud\_in} = \frac{X*F_{T\_cuttings}*Q_{mud\_in}}{X*Q_{cuttings} + F_{T\_cuttings}*(Q_{mud\ in}+Q_x+Q_{pore\_fluid})} \qquad \text{Equation 13.2}$$

$$f_x = \frac{X*F_{T\_cuttings}*Q_x}{X*Q_{cuttings} + F_{T\_cuttings}*(Q_{mud\ in}+Q_x+Q_{pore\_fluid})} \qquad \text{Equation 13.3}$$

In some applications, especially at shallower depths, the formation pore fluid volume $f_{pore\_fluid}$ that is released into the annulus may have a slip velocity with respect to the mud velocity when there are density differences between the two fluids. This slip velocity can generally be computed and made available from a hydraulics module in commercial borehole cleaning or cuttings management programs.

Transformation from volumetric or fractional flow dimensions to a depth dimension requires the simultaneous consideration of cross-sectional areas and fractional volumes. The annular volume may be represented mathematically, for example, as follows:

$$Vol_{annulus} = \int_{z=n}^{z=n+1} \pi * r^{2*}(D_{bh}^2 - D_p^2)dz \qquad \text{Equation 14}$$

where Vol$_{annulus}$ represents the annular volume between any two depths z=n and z=n+1, D$_{bh}$ represents the borehole diameter obtained for example from the bit diameter or LWD caliper measurements, and D$_p$ represents the diameter of the drill pipe located between z=n and z=n+1. Equation 14 assumes a borehole having a circular cross section. This assumption may be suitable for many drilling operations, however, the disclosed embodiments are not limited in this regard. For example, a more general elliptical shape may be utilized.

It will be understood that Equation 14 is expressed in terms of borehole depth rather than time. It will further be understood that the link between the volumes and depth is the annular velocity of the mud and cuttings mixture, while the link between the depth based annular volume and time is the rate penetration. Thus the annular volumes and fluid flow rates may be expressed alternatively as functions of time or depth. For example, the cuttings and fluid flow velocity may be integrated over a specific time period to determine the cuttings as a function of depth.

In one workflow example, an array of annular volume over discrete depth intervals may be computed using Equation 14. The array may be as fine as a few inches in depth or as sparse as one to two feet in depth. In the lower BHA (below an LWD caliper tool), the bit size may be used as the borehole diameter. The diameter may be updated using measured values when LWD caliper measurements become available at the predefined depths. The diameter of the drill pipe may also be continually updated using discrete functions of time as the various pipe diameters pass through these same depth points and the various cuttings are lifted from the bit face and carried into the annular volume. The terms Q$_{mud\ in}$ and Q$_{cuttings}$ may be computed from Equations 9 and 10 at discrete time intervals (e.g., every few seconds). These volumes may then be utilized in Equation 13 to compute the fractional volume of cuttings within each discrete time period. The velocity of the cuttings may be integrated to obtain the corresponding depth position of the cuttings with time and may be expressed mathematically, for example, as follows:

$$\Delta Z = \int_{T1}^{T2} VEL_{cuttings}\, dt = \int_{T1}^{T2} \left( \frac{Q_{cuttings}}{Area_{annulus} * f_{cuttings}} \right) \quad \text{Equation 15}$$

It may improve accuracy to integrate the mud annular velocity (as opposed to or in addition to the cuttings velocity) due to the higher fractional volume and larger volumetric flow rates. This may be expressed mathematically, for example, as follows:

$$\Delta Z = \int_{T1}^{T2} VEL_{cuttings}\, dt = \int_{T1}^{T2} \left( \frac{Q_{mud\ in} + Q_x + Q_{pore\_fluid}}{Area_{annulus} * (1 - f_{cuttings})} \right) \quad \text{Equation 16}$$

Equations 15 and/or 16 may be used to generate multi-dimensional arrays indexed by depth increments. Each column represents one chosen time interval and may contain TIME, as well as Area$_{annulus}$, Q$_{mud\ in}$, Q$_{cuttings}$, Q$_{pore\_fluid}$, VEL$_{cuttings}$, VEL$_{mixture}$, f$_{pore\_fluid}$ and f$_{cuttings}$. The total time required to circulate the cuttings out of the annulus to the surface dictates the total number of time intervals (steps). For example, if a time interval of 5 seconds is utilized and it takes 1 hour to circulate cuttings from the bit to the surface, then the array includes 720 times intervals (3600 sec/5 sec). Additional time intervals may be included to accommodate periods of non-circulation (e.g., a time period in which a new pipe stand is added to the drill string). One example of a multi-dimensional depth and time based array (database) including multiple variables is depicted on FIG. 3. For ease of illustration only two of the many variables are shown in the depicted example. It will be understood that rows are typically added to the array as the wellbore is drilled deeper into the earth.

The quantities MA_ISD and MA_ICD described above and calculated using the ASM data and Equation 5 may include multiple depth intervals within the previously described depth array. This multi-dimensional array may be integrated over the depth intervals corresponding to the ASM interval to derive an averaged density of the mixture which may be compared directly with the ASM measured values. A similar process may also be followed for the fractional cuttings volume. From Equation 7, MA_ISD$_{mixture}$ may be expressed mathematically, for example, as follows:

$$MA\_ISD_{mixture} = f_{cuttings} \cdot SG_{cuttings} + f_{pore\_fluid} \cdot SG_{pore\_fluid} + f_{mud\ in} \cdot SG_{mud\ in} + f_x \cdot SG_x \quad \text{Equation 17}$$

where f$_{cuttings}$, f$_{pore\_fluid}$, f$_{mudin}$ and f$_x$ represent fractional volumes of the cuttings, pore fluid, the drilling mud, and the inflow or outflow constituents and SG$_{cuttings}$, SG$_{pore\_fluid}$, SG$_{mud\ in}$, and SG$_x$ represent the specific gravities of the cuttings, pore fluid, the drilling mud, and the inflow or outflow constituents. Under conditions in which there is no inflow, outflow or other event, such that constituent x is zero, Equation 17 may be used to compute SG$_{cuttings}$ as all other variables may be determined via other means as described above. Such calculations are described in more detail below.

Equation 17 may be further expanded by considering the pore fluid to include a combination of hydrocarbons and water that may or may not have been flushed by the drilling mud. The expanded form of Equation 17 may be represented mathematically, for example, as follows:

$$MA\_ISD_{mixture} = f_{cuttings} \cdot SG_{cuttings} + F \cdot f_{pore\_fluid} \cdot S_w \cdot SG_{pore\_free\_water} + F \cdot f_{pore\_fluid} \cdot (1 - S_w) \cdot SG_{pore\_hydrocarbons} + (1-F)f_{pore\_fluid}SG_{mud\_in} + f_{mud\ in} \cdot SG_{mud\ in} + f_x \cdot SG_x \quad \text{Equation 17.1}$$

where F represents a flushing factor such that $1 \leq F \leq 0$ with F=1 representing no flushing and F=0 representing complete flushing, S$_w$ represents pore water saturation, 1−S$_w$ represents pore hydrocarbon saturation, SG$_{pore\_free\_water}$ represents the density of the pore water, SG$_{pore\_hydrocarbons}$ represents the density of the pore hydrocarbons, and SG$_{mud\_in}$ represents the density of the input drilling fluid (mud).

When drilling under conditions of no influx or outflux (i.e., f$_x$=0), Equation 17.1 includes four unknowns (SG$_{cuttings}$, F, S$_w$, SG$_{pore\_hydrocarbons}$) with the remainder of the variables being measured directly or computed from other measurements. As described above, a MEL may be used to determine whether the drilled formation is shale or a porous formation. When drilling shale, the water saturation may be assumed to be 100%. In certain geological environments the lithology of a porous formation is known to be, for example, sandstone, limestone, or dolomite such that the SG$_{cuttings}$ can be input. Equation 17.1 may be rearranged to solve for S$_w$ as follows (recognizing that S$_{hyr}$=(1−S$_w$):

$$S_w = \quad \text{Equation 17.2}$$

$$\frac{MA\_ISD_{mixture} - f_{cuttings} \cdot SG_{cuttings} - f_{mud\ in} \cdot SG_{mud\ in} -}{F \cdot f_{pore\_fluid}(SG_{pore\_free\_water} - SG_{pore\_hydrocarbons})}$$
$$(1-F) \cdot f_{pore\_fluid} \cdot SG_{mud\ in} -$$
$$F \cdot f_{pore\_fluid} \cdot SG_{pore\_hydrocarbons}$$

Given that Equations 17.1 and 17.2 include at least four unknowns, various techniques may be utilized to determine which water saturation is appropriate. For example, by assuming no flushing (F=1), inputting $SG_{cuttings}$ from the known lithology (e.g., shale or porous formation as determined by MEL), and assuming a value for $SG_{pore\_hydrocarbons}$, enables $S_w$ to be computed for various scenarios. An appropriate scenario may be selected based on expected values of $S_w$. In one scenario, it may be assumed that hydrocarbons are present but that the formation is water bearing. In such a scenario the calculated water saturation would be expected to be unity. In another scenario, it may be assumed that hydrocarbons are present and that the formation is hydrocarbon bearing. In such as scenario, the calculated water saturation would be expected to range between 0 and 1, but typically greater than 0.1-0.2.

Computing $S_w$ requires that the hydrocarbon density be input. Since this quantity is unknown, $S_w$ may be computed based on a first hydrocarbon density representing gas ($SG_{gas} \approx 0.2$) and a second hydrocarbon density representing oil ($SG_{oil} \approx 0.8$). When the formation is gas bearing, the computed $S_w$ using $SG_{oil}$ is typically less than zero and therefore erroneous. When the formation is oil bearing, the the computed $S_w$ using $SG_{gas}$ is typically between zero and one, but erroneously high. The computed $S_w$ using $SG_{gas}$ advantageously represents an upper bound on the actual water saturation.

When inflow is detected, the quantity $f_{cuttings}SG_{cuttings}$ may be assumed to be constant for a time interval. Equation 17 may then be used to compute $f_xSG_x$ from which $SG_x$ may be computed when $f_x$ is known (e.g., from Equation 8). Determining (or estimating) $SG_x$ can be advantageous in determining the type of fluid inflow into the wellbore.

Measured Drill Pipe Internal Interval Static and Circulating Density

The aforementioned internal ASM pressure sensors that are deployed and configured to measure an internal pressure of the drill pipe ($ASM_{internalP}$) may be used to obtain internal fluid gradients within the drill pipe under no flow (MIF_ISD) and flowing conditions (MIF_ICD), for example, using Equation 4. The difference between MIF_ISD and MIF_ICD is generally due to frictional losses in the drill pipe. When two axially spaced pressure sensors are sufficiently close to the bit and separated in TVD so as to give adequately high signal/noise measurements, the internal interval static density can be measured when not pumping. The internal interval static density may also be computed using Equations 4 and 5 as described above to determine the frictional pressure losses and to subtract them from the measured internal dynamic interval density. Frictional losses may also be computed using a hydraulics model.

The measured internal interval static density (MIF_ISD) is a function of the density of the actual fluid being pumped into the pipe at the surface plus any pressure and temperature effects that affect the compressibility of the fluid. If the sensor pairs are far above the bit, a computed temperature correction to the interval static density may be applied using an appropriate hydraulics model that includes temperature and frictional pressure effects.

MIF_ISD represents the fluid exiting the bit before any cuttings loading and annular frictional loss effects and may therefore be used as the input to the computation of the expected annulus fluid interval static density described in more detail hereinbelow.

Expected Drill Pipe Internal Interval Static and Circulating Density

Known hydraulic modeling techniques may be utilized to predict the internal fluid density as a function of the internal (predicted or measured) pressure and temperature using the surface mud density properties as a base fluid for the modeling. The surface mud properties are typically measured by mud loggers but may also be measured by sensors at the surface. Accounting for the pressure and temperature effects results in an expected internal fluid interval static density EIF_ISD. By taking into account modeled frictional effects an expected internal fluid interval circulating density EIF_ICD may be obtained. Expected interval densities are also referred to herein as modeled interval densities. The expected internal densities are generally equal to the measured quantities MIF_ISD and MIF_ICD when the hydraulic model is correct. A minimization process may be used to adjust appropriate hydraulic parameters until a suitably accurate match is found.

Expected Annulus Fluid Interval Static Density

An expected annulus fluid interval static density (EAF_ISD) may be obtained by correcting MIF_ISD for pressure and temperature effects as the input mud flows up the annulus to the surface. The EAF_ISD may be compared to the various measured interval densities to identify certain undesirable drilling events as described more detail below in various applications of the INTERVAL DENSITY APPLICATIONS section of this disclosure. The annulus pressure and temperature are typically measured by the ASM sensors in the WDP. When these measurements are not available, and only the BHA sensors are present, pressure and temperature gradients may be assumed between the BHA sensors and the surface.

Expected Annulus Interval Static Density

The fluid leaving the bit and being pumped into the annulus is a fluid having properties defined by EAF_ISD, which as is described above is MIF_ISD corrected for pressure and temperature effects on the density. The cuttings load (with $Q_x=0$) computed using one or more of Equations 8-16 may be added to EAF_ISD to obtain an expected annulus interval static density EA_ISD. Expected interval densities are also referred to herein as 'modeled' interval densities. The EA_ISD represents a hypothetical fluid having the properties of the mud being injected into the annulus at the bit loaded with the drilled and suspended cuttings having a certain interval density and may be expressed mathematically, for example, as follows:

$$EA\_ISD = f_{mud\ in} \cdot SG_{mud\ in} + f_{cuttings} \cdot SG_{cuttings} \quad \text{Equation 18}$$
$$= \cdot f_{mud\ in} \cdot EAF\_ISD + f_{cuttings} \cdot SG_{cuttings}$$

The difference between EAF_ISD and EA_ISD is due to the cuttings loading. If the difference is minimal at the bottom of the hole, the cuttings density and loading effects computed using Equations 8-16 is likely correct. Given a discrepancy, the cutting density may be adjusted. If MA_ISD decreases and drops below EA_ISD as the mud flows up the annulus into the deviated section of the borehole, it indicates that the cuttings may be dropping out of suspension and settling at the bottom of the borehole. Moreover, inflow or outflow from the wellbore may result in differences between these two computed parameters and may be used to flag lost circulation and gas kicks.

Expected Annulus Interval Circulating Density

Taking the computation of EA_ISD and adding the annular friction pressure losses to it results in an expected annulus interval circulating density EA_ICD. This parameter is a function of the input mud density adjusted for temperature, pressure, cuttings load, and annular frictional pressure losses and is therefore comparable to MA_ICD. The expected and measured quantities (EA_ICD and MA_ICD) tend to be equal to one another when the cuttings density and the frictional losses are input correctly. When these quantities are not equal (or not close to equal), it may indicate a change in cuttings density from the assumed cuttings density or inflow or outflow event (a $Q_x$ event). EA_ICD may be expressed mathematically, for example, as follows:

$$EA\_ICD = f_{mud\ in}EAF\_ISD + f_{cuttings}SG_{cuttings} + \frac{(P_{f_{n+1}} - P_{f_n}) \cdot C_1}{(Z_{TVD(n+1)} - Z_{TVD(n)})} \quad \text{Equation 19}$$

where $Z_{TVD(n)}$ and $Z_{TVD(n+1)}$ represent the true vertical depths of the well at the first and second depths n and n+1 and $P_f$ represents the frictional pressure drop acting on the fluid above the sensor as described above with respect to Equations 4 and 5.

Equivalent Top of Fluid Level

The equivalent measured or true vertical depth of the top of the fluid level may be computed from the annular mud interval density existing between any two pressure sensors using the concept of hydraulic head. This may be referred to as the equivalent top of fluid level (ETOFL) and is intended to define the uppermost depth or level that a fluid would occupy if it were continuous and had the same properties as the fluid between the two measured pressures. A back pressure may sometimes be applied to the annular choke during managed pressure drilling (MPD) operations. With an incompressible fluid in the annulus, the pressure may be subtracted from the measured pressure to compute ETOFL. When the fluid is compressible, simply subtracting the back pressure may not to be suitably accurate such that it may be necessary to compute an equivalent back pressure at the sensor. Such calculations may be accomplished, for example, using hydraulic models.

The following mathematical equations may be used to compute ETOFL in the presence of an applied back pressure using the previously calculated interval densities. In these equations, a positive ETOFL indicates that the computed fluid level is below the surface, while a negative ETOFL indicates the fluid level is above the surface.

$$ETOFL = Z_{TVD(n)} - \left[\frac{(P_n - P_{f_n} - BP) * C_1}{\frac{(P_{n+1} - P_n) - (P_{f_{n+1}} - P_{f_n})}{(Z_{TVD(n+1)} - Z_{TVD(n)})}}\right] \quad \text{Equation 20.1}$$

$$ETOFL = Z_{TVD(n)} - \left[\frac{(P_n - P_{f_n} - BP) * C_1}{MA\_ISD}\right] \quad \text{Equation 20.2}$$

where ETOFL represents the equivalent top of fluid level which is essentially equivalent to the fluid elevation in a well including a fluid having a static density, P represents the measured pressure, $P_f$ represents the frictional pressure loss, BP represents the surface annular applied back pressure, n represents a pressure sensor at some measured depth, and n+1 represents a pressure sensor at some deeper measured depth.

Theoretical or Extrapolated Surface Annular Back Pressure

In MPD operations it may be useful to compute a theoretical or extrapolated surface annular back pressure (BP) from the measured downhole annular pressures and to compare the computed values with the actual surface annular back pressure (SBP). Automated software routines may then be employed to adjust the actual applied BP so as to minimize any differences to maintain a constant bottom hole pressure (BHP).

Equations 20.1 and 20.2 show that an increase in the interval density at a given BP results in an increase in ETOFL. This increase in interval density may cause the theoretical back pressure in Equations 20.1 and 20.2 to decrease and even go negative in some cases. In an event causing a sudden increase in the annular pressure measured by the lowermost pair of sensors (e.g., due to a restriction in the drill string above the sensors), the lowermost interval density remains substantially constant, ETOFL decreases, and the computed surface annular back pressure (SBP) increases. Since the theoretical BP depends on the interval from which it is computed and the impact that various events have on the interval density, interpretation of the theoretical BP is application dependant as described in more detail below with respect to Table 10. In general interpretation of the theoretical BP is used in combination with a computed interval density in order to obtain the proper action for adjusting the actual surface back pressure.

The theoretical back pressure BP may be expressed mathematically, for example, as follows:

$$BP = -(Z_n) * \left[\frac{(P_{n+1} - P_n)}{(Z_{TVD(n+1)} - Z_{TVD(n)})}\right] + P_n \quad \text{Equation 21}$$

where BP represents the theoretical back pressure, $P_n$ and $P_{n+1}$ represent the measured pressures at sensors n and n+1, and $Z_{TVD(n)}$ and $Z_{TVD(n+1)}$ represent the true vertical depths of sensors n and n+1.

Velocity and Acceleration of Interval Density Changes

It is often desirable to know the direction and degree of change in the computed interval specific gravities with time in order to determine if the system is tending towards stability or instability, and for example, tracking an inflow as it moves up the annulus. The rate of change of the interval density may be represented mathematically, for example, as follows:

$$VID = \frac{d(ID)}{dt} = \frac{(ID_{t2} - ID_{t1})}{(t_2 - t_1)} \quad \text{Equation 22}$$

where VID represents the rate of change of the interval density with time and $ID_t$ represents one of the interval densities described above at time t.

A further derivative of the rate of change (i.e., an acceleration) may also be useful in determining the direction of the change and how quickly the interval density is changing in order to determine the necessary reaction time for remedial action. The acceleration may also help distinguish between gas kicks versus water or oil inflows. Interval density acceleration may be expressed mathematically, for example, as follows:

$$AID = \frac{d(VID)}{dt} = \frac{VID_{t2} - VID_{t1}}{t_2 - t_1} \quad \text{Equation 23}$$

where AID represents the rate of change of the velocity of the interval density with time (i.e., the rate of change of the rate of change of the interval density) and $VID_t$ represents one of the velocities of the interval densities at time t.

Interval Density Applications

In this section methodologies for interpreting the computed interval densities are presented along with several applications for using computed interval densities to determine, diagnose, manage, and/or remedy various drilling events.

Interpretive Methodology

Table 1 summarizes the various interval densities described above in the INTERVAL DENSITY COMPUTATION METHODOLOGIES section and the physical effects that are included in each. The mathematical equations listed above may be used to compute the various interval densities. The computations may be performed in substantially real time while the well is being drilled or subsequent to the drilling operation using recorded historical data. The disclosed embodiments are not limited in this regard. The computed interval densities as well as their depth and time relationships may be plotted on various crossplots or other displays enabling the driller (or a computer software program) to recognize, differentiate, and take control of mitigating various situations discussed later in this section. Moreover, use of the computed interval densities is not limited to drilling operations, but may also be useful in various completion and production operations.

the surface input mud properties, including downhole pressure and temperature in the drill string at the depth of interest. The expected quantities may be compared directly with the measured internal interval circulating and static densities MIF_ICD and MIF_ISD. MIF_ISD may be obtained by subtracting an internal frictional pressure loss from the measured MIF_ICD or by direct measurement. The frictional pressure losses may be obtained via modeling and/or measurements. For example, MIF_ICD may be measured directly by measuring MA_ISD when the mud pumps are turned off (e.g., when adding a length of drill pipe to the drill string). The difference between MIF_ICD measurements made while circulating and not circulating (when the pumps are on and off) may be considered to be a direct measurement of the internal frictional pressure losses ($\Delta P\_Internal_{fric}$).

The modeled EIF_ISD may be compared with MIF_ISD (which is MIF_ICD$-\Delta P\_Internal_{fric}$ when circulating and MIF_ISD when not circulating). An error minimization process (or a manual procedure) may be used to adjust the hydraulic model parameters that account for pressure and temperature effects on the drilling fluid such that EIF_ISD equals MIF_ISD. A subsequent error minimization process may then be employed to adjust the hydraulic model parameters that account for internal frictional pressure losses such that EIF_ICD equals MIF_ICD (i.e., such that the modeled frictional pressure loss equals to the measured frictional pressure loss $\Delta P\_Internal_{fric}$). Iterative minimization processes may be utilized to provide for accurate results. The minimization processes may also be repeated at various flow rates and the results stored in a look-up table for future reference.

The hydraulic model parameters obtained above for the pressure and temperature effects on the input mud properties may be utilized in the annulus environment as well. The annular fluid properties as a function of the annular pressure and temperature may be input to the hydraulic model to obtain a modeled (expected) annular fluid interval static

TABLE 1

| Interval Density Computation | Actual Pressure Effects | Actual Temperature Effects | Modeled Pressure Effects | Modeled temperature Effects | Actual Cuttings Effects | Modeled Cuttings Effects | Actual Annular Friction Effects | Modeled Annular Friction | Actual Internal Friction Effects | Modeled Internal Friction | Comments |
|---|---|---|---|---|---|---|---|---|---|---|---|
| MIF_ISD | ● | ● | | | | | | | | | Internal friction effects are effectively removed |
| MIF_ICD | ● | ● | | | | | | | ● | | Measured while Circulating |
| EIF_ISD | | | ● | ● | | | | | | | To be compared to MIF_ISD |
| EIF_ICD | | | ● | ● | | | | | | ● | To be compared to MIF_ICD |
| MA_ISD | ● | ● | | | ● | | | | | | Annular friction effects are effectively removed by taking measurements when not circulating. |
| MA_ISD$_{mf}$ | ● | ● | | | ● | | | ● | | | Annular friction effects are effectively removed by modeling. |
| MA_ICD | ● | ● | | | ● | | ● | | | | Measured while Circulating |
| EAF_ISD | | | ● | ● | | | | | | | |
| EA_ISD | | | ● | ● | | ● | | | | | To be compared to MA_ISD |
| EA_ICD | | | ● | ● | | ● | | ● | | | To be compared to MA_ICD |

EIF_ICD and EIF_ISD are the modeled (expected) internal interval circulating and static densities computed using density EAF_ISD. This parameter represents the interval density of the annular fluid (without cuttings and friction effects) as a function of annular pressure and temperature as a function of depth and time. Calibration and determination of the annular friction effects may be accomplished in the same manner as described above for the internal frictional effects. For these minimizations, EA_ISD, EA_ICD, MA_ISD and MA_ICD are computed as opposed to EIF_ISD, EIF_ICD, MIF_ISD and MIF_ISD as described in the preceding paragraph.

The modeled annular interval static density EA_ISD may be utilized as the input mud properties with annular pressure and temperature and modeled cuttings effects included. EA_ISD may be equal to MA_ISD when the generation and transport of cuttings in the annulus is properly modeled and the modeled frictional pressure losses that are subtracted from MA_ICD are correct. An error minimization process may be utilized to compute a cuttings density using appropriate values for frictional transport efficiency, ROP, porosity, and the density of the cuttings free fluid flowing in the annulus determined from the minimization described above for EAF_ISD. Changes in the computed cuttings density by interval may indicate that cuttings are dropping out of suspension since the modeled cuttings density is constant with depth. A cuttings management process may track the loss of cuttings in the annulus and indicate the potential for undesirable drilling events such as pack-offs while drilling or while reaming or pulling out of the hole.

Disclosed method embodiments may further utilize measurements of the actual flow into and out of each interval (e.g., as described above with respect to Equation 8). Such measurements provide for a determination of $Q_x$ and may therefore be used to differentiate between inflow or outflow effects versus incorrect cuttings modeling effects such as the assumed cuttings density. When flow in does not equal flow out, differences may be attributed to the quantity $f_x \cdot SG_x$ in Equation 17 indicating flow in or out of the annulus in the interval in which the difference occurs. In certain applications the interval densities may then be used to compute the fractional volume and density of an inflow material (e.g., using Equations 8-17). This process may be useful for distinguishing between gas and salt water kicks, for example.

MA_ICD and EA_ICD may be equal when the various parameters discussed above are modeled correctly. Differences between these two quantities may also indicate undesirable drilling events as discussed above. Additionally, modeled frictional effects may depend on the borehole diameter. Using an LWD caliper, these effects can be properly accounted for. However, with time the borehole wall may experience washout or enlargement, for example, due to drilling practices, shale stability, or other geomechanical effects. Differences in MA_ICD and EA_ICD may be used to detect and monitor borehole diameter changes. A minimization process may also be used to determine the average borehole size within each interval as a function of time.

The annular frictional losses also depend on the drill pipe rotation speed (RPM) and fluid flow rate. Since these parameters may change with time, the annular frictional effects can also be time dependant and may be accounted for during drilling.

Effects of Pressure and Temperature on Fluid Densities

The fluid or mud being pumped into the well while drilling may be affected by the pressure and temperature changes it undergoes as it travels down the drill pipe and back up the annulus. For example, pressure and temperature changes cause corresponding changes to the density of the fluid. These changes may be measured using the aforementioned ASM measurements and may enable the relationship between fluid density and pressure and temperature to be quantified and/or modeled which in turn enables other effects such as cuttings loading and friction to be determined.

Internal ASM pressures, temperatures, and computed interval densities and temperature gradients may be used with a hydraulic model to calibrate the model parameters. The hydraulic model may then be used to predict the effects at any other point in the system as a function of depth and time. Annular measurements may be used in the same manner under non-drilling conditions (i.e., when there are no cuttings in the annular fluid). When the hydraulic model parameters are well defined and predictable for a particular drilling fluid, and in cases where either a measured temperature or measured pressure is not available, the hydraulic model may be used to predict the missing measurement.

Figure 4:
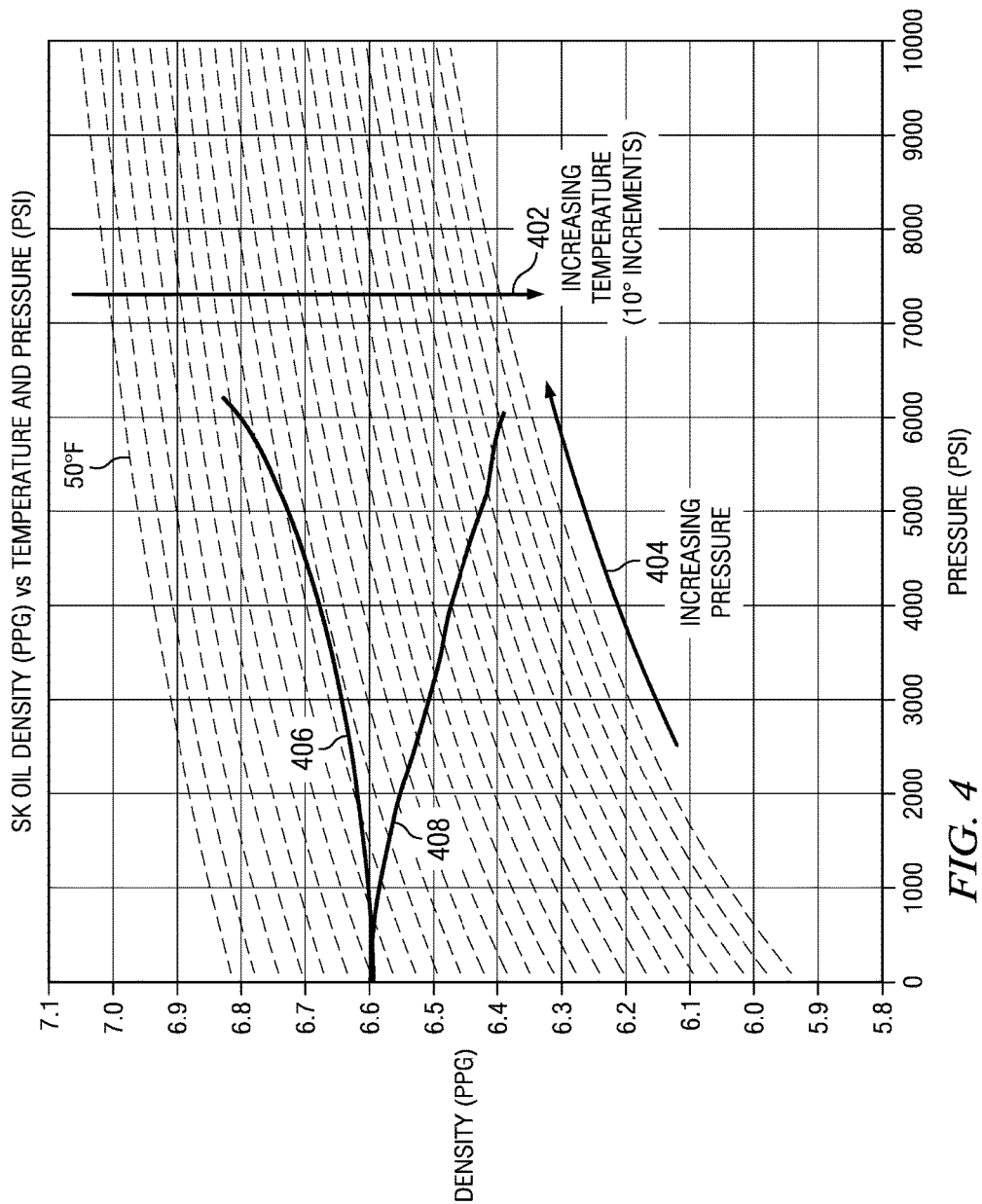
FIG. 4 depicts modelled oil based mud (OBM) density as a function of pressure and temperature.

FIG. 4 depicts modelled oil based mud (OBM) density as a function of pressure and temperature. As indicated at 402 and 404, the density of the mud increases with decreasing temperature 402 and increasing pressure 404. Under circulating conditions in which the OBM temperature remains somewhat constant (i.e., does not increase significantly with depth), OBM density increases with depth (and therefore pressure) as indicated at 406. Under non-circulating conditions in which the OBM temperature increases significantly with depth, the temperature effect can overwhelm the pressure effect (i.e., the fluid density can decrease with increasing depth as indicated at 408).

Figure 5A:
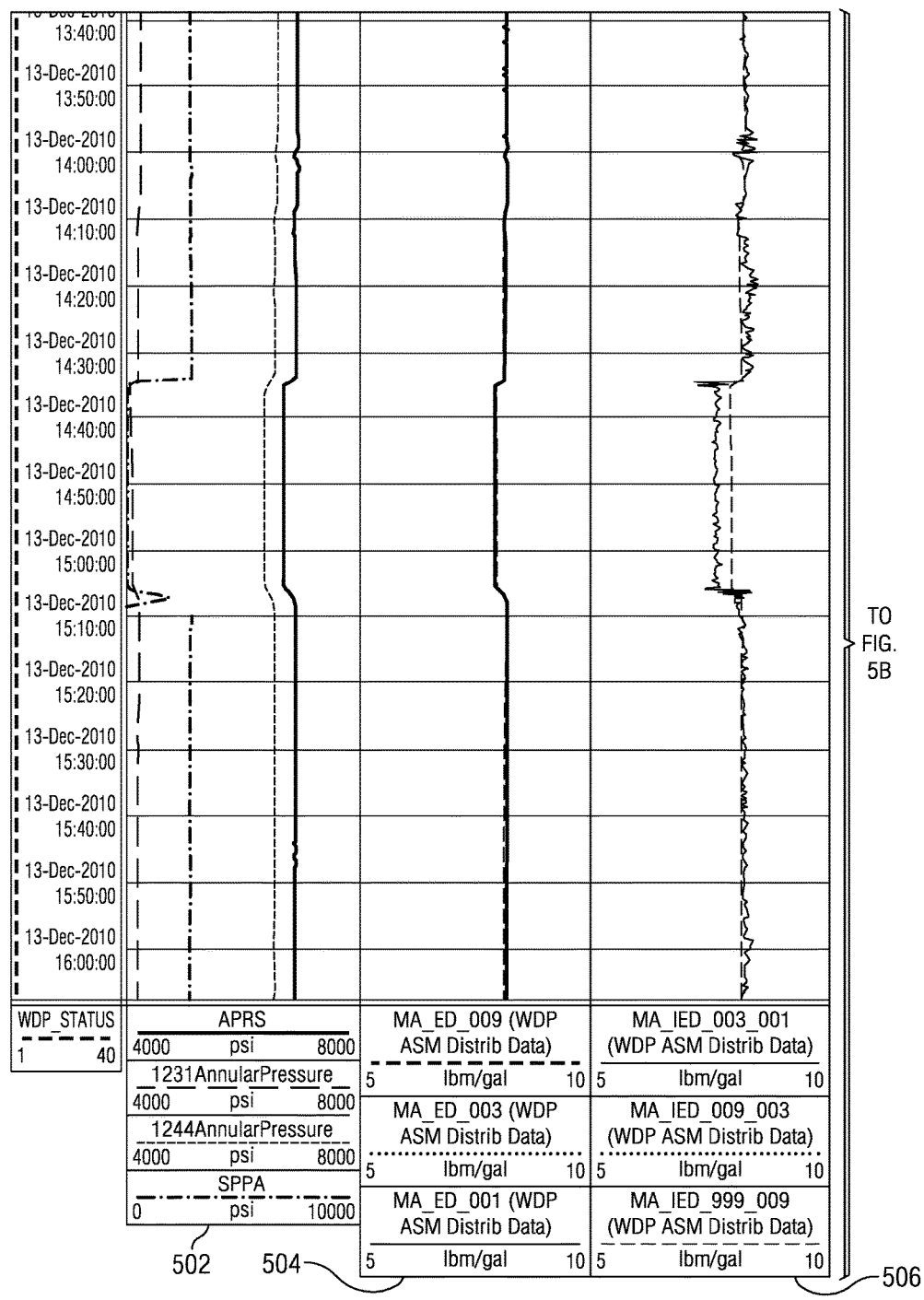
FIGS. 5A and 5B collectively depict one example of a log including computed interval densities obtained during an ASM while drilling operation, with FIG. 5A depicting Tracks 2, 7, and 4 and FIG. 5B depicting Tracks 5 and 6.
Figure 5B:
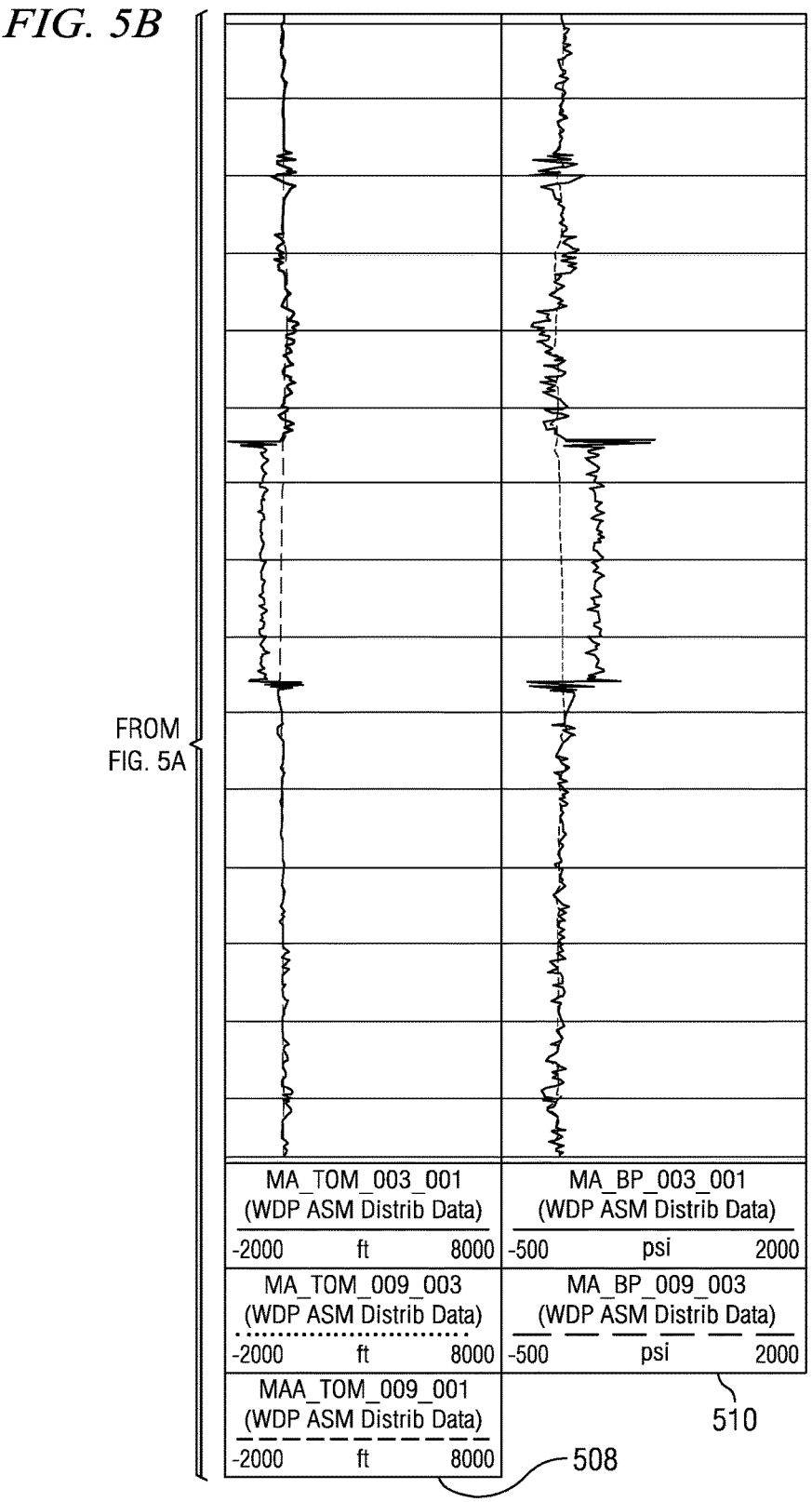

FIGS. 5A and 5B depict one example of a log including computed interval densities obtained during an ASM while drilling operation. Table 2 summarizes the relative locations of the annular pressure measurements when the drill bit was located at a measured depth of 17,000 feet. The lowermost annular pressure measurement was made in a Schlumberger arcVISION® tool deployed in the BHA. This pressure measurement is labeled "APRS" in track 2 (at 502). The drill string further included first and second ASM annular pressure sensors labeled "1231" and "1244" in track 2. The 1244 sensor was located about 1259 feet (in measured depth) and 787 feet (in true vertical depth) above the BHA annular pressure measurement. The 1231 sensor was located about 5777 feet (in measured depth) and 5603 feet (in true vertical depth) above the 1244 sensor. A surface measurement SPPA was located about 9934 feet above the 1231 sensor.

TABLE 2

| Sensor | Bit Depth | Sensor offset from bit | Sensor MD | Inclination | Sensor TVD |
|---|---|---|---|---|---|
| Surface | 17000 | 17000 | 0 | 0 | 0 |
| ASM 1231 | 17000 | 7066 | 9934 | 0.2 | 9932 |
| ASM 1244 | 17000 | 1289 | 15711 | 62 | 15535 |
| APRS from arcVISION tool in BHA | 17000 | 30 | 16970 | 64 | 16322 |

Table 3 summarizes the parameters depicted on FIGS. 5A and 5B. Many of these parameters are described above in the INTERVAL DENSITY COMPUTATION METHODOLOGIES section and are further described in more detail below with respect to the present example.

TABLE 3

| Track | Curve name | Definition |
|---|---|---|
| 1 | WDP Status | 0 = down 1 = up |
| 2 | APRS | arcVISION annular Pressure |
|   | 1231AnnularPressure | Annular Pressure from ASM sensor #1231 |
|   | 1244AnnularPressure | Annular Pressure from ASM sensor #1244 |
|   | SPPA | Surface Stand Pipe Pressure |
| 3 | MA_ED_001 | ECD calculation from APRS measurement using TVD of sensor |
|   | MA_ED_003 | ECD calculation from ASM 1244 measurement using TVD of sensor |
|   | MA_ED_009 | ECD calculation from ASM 1231 measurement using TVD of sensor |
| 4 | MA_IED_003_001 | Interval density calculation between ASM sensor 1231 and surface annular pressure. |
|   | MA_IED_009_003 | Interval density calculation between ASM sensor 1244 and ASM 1231 sensor annular pressure. |
|   | MA_IED_999_009 | Interval density calculation between ASM sensor 1244 and surface sensor. |
| 5 | MA_TOM_003_001 | ETOFL estimate calculated from APRS and ASM sensor 1244 pressures. |
|   | MA_TOM_009_003 | ETOFL estimate calculated from ASM 1244 and 1231 sensors pressures. |
|   | MA_TOM_009_001 | ETOFL estimate calculated from APRS and ASM sensor 1231 pressures. |
| 6 | MA_TOM_003_001 | Calculated surface back pressure using APRS and 1244 sensor measurements. |
|   | MA_TOM_009_003 | Calculated surface back pressure using 1244 and 1231 sensor measurements. |

With continued reference to FIG. 5A, track 7 (depicted at 504) includes the densities and interval densities computed between the aforementioned pressure sensors in the BHA and the drill string. The annular mud density is computed for each individual sensor and labeled MA_EC (measured annular equivalent circulating density). MA_ED_001 corresponds to the equivalent density for the APRS pressure measurement, MA_ED_003 corresponds to the 1244 pressure measurement, and MA_ED_009 corresponds to the 1231 pressure measurement. These parameters tend to be insensitive to heterogeneities in the local mud density as illustrated in this example by the fact that the values at each sensor are substantially identical and overlay one another on the plot. While not depicted on FIGS. 5A and 5B, the computed equivalent density for each of the sensors has a value about equal to the density of the base OBM (about 7.9 ppg or 0.95 g/cm$^3$). When the pumps are shut down at the simulated connection (from 14:35 to 15:05 in track 1), these densities drop as expected due to the lack of annular friction losses.

The computed interval densities are also shown in track 4 (506) and are labeled as MA_IED_003_001 (the interval density between the APRS and 1244 sensors), MA_IED_003_009 (the interval density between the 1244 and 1231 sensors), and MA_IED_999_009 (the interval density between the 1244 ASM sensor and the surface annular pressure sensor). When the pumps are shut down at the connection, the interval densities drop due to the elimination of annular friction losses. The interval densities are essentially the aforementioned quantities MA_ICD when circulating and MA_ISD when not circulating. In this particular example, the interval densities also closely represent the EAF_ISD since the rate of penetration (ROP) was low and there were long periods of circulation between drilling events, implying there were little to no cuttings suspended in the annular fluid.

The uppermost interval density (MA_IED_999_009) is approximately equal to the computed equivalent densities shown in track 3 (at 8 ppg). As depicted in track 4, the interval densities decrease significantly with increasing depth, with MA_IED_003_009 being about equal to 7.6 ppg and MA_IED_003_001 being about equal to 7.3 ppg. The decreasing interval densities are likely due to increasing temperatures lower in the wellbore. Absent such temperature effects, one would expect the density of a compressible fluid such as an OBM to increase with increasing depth. However, as shown on FIG. 4, the increasing temperature of the drilling fluid with increasing depth can result in a decreasing density. This may be observed directly using the interval densities disclosed herein (as depicted on FIGS. 5A and 5B).

With still further reference to FIG. 5B, tracks 5 and 6 (shown at 508 and 510) depict equivalent top of fluid (ETOFL) and computed back pressure. In track 5, the top of fluid levels are labeled MA_TOM_003_001 (the interval between the APRS and 1244 sensors), MA_TOM_003_009 (the interval between the 1244 and 1231 sensors), and MA_TOM_009_001 (the interval between the APRS and 1231 sensors). In track 6, the back pressures are labeled MA_BP_003_001 (the interval between the APRS and 1244 sensors) and MA_BP_003_009 (the interval between the 1244 and 1231 sensors). As depicted, the computed back pressures have positive values. The annular choke pressure may be set to a value equal to the value calculated for the lowermost pair of sensors (MA_BP_003_001) in track 6 in order to maintain a constant bottom hole annular pressure when drilling a narrow mud weight window. Upon resuming circulation, the lowermost sensor (APWD) measures the full annular friction pressure above the sensor (in addition to the static pressure) while those sensors located further uphole sense diminishing frictional losses. The resulting interval densities are therefore larger than the corresponding interval static densities.

In well drilling operations, the borehole temperature commonly increases with increasing depth. Under circulating (and drilling) conditions, the temperature of the drilling fluid is generally not a strong function of depth (due to the mixing of the fluid and transport back to the surface). When circulation stops, the temperature typically increases with time and any particular depth until a steady-state temperature is reached. As a result, the density of the drilling fluid may also be expected to decrease with time after circulation ceases. These time dependent changes in density may also be observed using the aforementioned interval densities.

The ASM pressure and temperature measurements and their relationship to fluid density may be further utilized in refining and/or calibrating conventional hydraulic models. For example, the measurements may be utilized to determine the coefficients in the conventional API-13D equations:

$$\rho_{base} = (a_1 + b_1 P + c_1 P^2) + (a_2 + b_2 P + c_2 P^2) T \qquad \text{Equation 24}$$

$$\rho_{brine} = (a_3 + b_3 P + c_3 P^2) + (a_4 + b_4 P + c_4 P^2) T \qquad \text{Equation 25}$$

where $\rho_{base}$ represents the density of the base drilling OBM, $\rho_{brine}$ represents the density of the brine, P represents pressure, T represents temperature, and a, b, and c represent fitting coefficients. Table 4 includes sample "book" values for various conventional oil and/or brine solutions as well as fitting statistics and range of validity.

TABLE 4

|  | Calcium Chloride 19.3 wt % | Diesel | Mineral Oil | Internal Olefin | Paraffin |
|---|---|---|---|---|---|
| Pressure Coefficients |  |  |  |  |  |
| $a_1$ ($lb_m$/gal) | 9.9952 | 7.3183 | 6.9912 | 6.8358 | 6.9692 |
| $b_1$ ($lb_m$/gal/psi) | 1.77E−05 | 5.27E−05 | 2.25E−05 | 2.23E−05 | 3.35E−05 |
| $c_1$ ($lb_m$/gal/psi$^2$) | 6E−11 | −8E−10 | −1E−10 | −2E−10 | −5E−10 |
| Temperature Coefficients |  |  |  |  |  |
| $a_2$ ($lb_m$/gal/° F.) | −2.75E−03 | −3.15E−03 | −3.28E−03 | −3.39E−03 | −3.46E−03 |
| $b_2$ ($lb_m$/gal/psi/° F.) | 3.49E−08 | 7.46E−08 | 1.17E−07 | 1.12E−07 | −1.64E−08 |
| $c_2$ ($lb_m$/gal/psi$^2$/° F.) | −9E−13 | −1E−12 | −3E−12 | −2E−12 | 2E−13 |
| Fitting Statistics for Modeled Data |  |  |  |  |  |
| Avg. Error % | 0.135 | 0.237 | 0.166 | 0.194 | 0.214 |
| $r^2$ coefficient | 0.998 | 0.997 | 0.998 | 0.998 | 0.999 |
| Range of Validity |  |  |  |  |  |
| Max. Applied Pressure (psi) | 20,300 | 20,000 | 20,300 | 24,000 | 14,500 |
| Min. Temperature (° F.) | 77 | 40 | 77 | 56.4 | 68 |
| Max. Temperature (° F.) | 392 | 400 | 392 | 392 | 302 |

It may be advantageous in certain applications to adjust these "book" values according to in-situ conditions. Since the oil to water ratio is known (it is commonly controlled at the surface), Equations 24 and 25 may be combined into a single equation having six coefficients, for example as follows:

$$\rho_{mud} = (i_1 + j_1 P + k_1 P^2) + (i_2 + j_2 P + k_2 P^2) T \quad \text{Equation 26}$$

where $\rho_{mud}$ represents the density of the drilling fluid (the combination of base and brine) and i, j, and k represent the coefficients. This density may be measured in-situ, for example, using the aforementioned interval density computations where the pressure and temperature values represent an average value for the interval.

A drill string including six ASM pressure and temperature sensors, for example, may enable the six coefficients to be computed. For example, six interval densities may be calculated using the corresponding six pressure and temperature measurements to obtain six equations having six unknowns (the six coefficients). Values for the coefficients may then be determined using conventional root finding algorithms. It will be understood that the necessary number of intervals may be reduced, for example, via using minimization techniques or using interval densities computed at multiple times (or multiple depths) provided that the pressure and temperature measurements are sufficiently different.

Alternatively, Equations 24 and 25 may be combined into a single equation having twelve coefficients, for example as follows:

$$\rho_{mud} = \text{MIF\_ISD} = \frac{V_{base} \cdot \rho_{base} + V_{brine} \cdot \rho_{brine}}{V_{mix}}; \quad \text{Equation 27}$$

$$\text{MIF\_ISD} = V_{base}[(a_1 + b_1 P + c_1 P^2) + (a_2 + b_2 P + c_2 P^2) T] + (1 - V_{base})[(a_3 + b_3 P + c_3 P^2) + (a_4 + b_4 P + c_4 P^2) T] \quad \text{Equation 28}$$

where $V_{base}$ and $V_{brine}$ represent the volume fractions of base and brine. The coefficients in Equations 27 and 28 may be obtained by making 12 independent interval density measurements, for example, at two distinct locations using the drill string described above having six ASM pressure and temperature sensors.

In another alternative embodiment, values for the brine coefficients ($a_3$, $b_3$, $c_3$ and $a_4$, $b_4$, $c_4$ in Equations 25 and 28) may be assumed and the six base coefficients evaluated, for example, using at least six independent interval density measurements.

In the foregoing embodiments, the coefficients may be determined using either internal interval density measurements or annular interval density measurements. Internal interval density measurements may be preferred due to the lack of cuttings in the interior of the drill string, however, annular measurements may also be utilized when the cuttings are accounted for using one or more of the aforementioned techniques.

Cuttings Transport Efficiencies and Formation Characterization

ASM pressure and temperature measurements may be utilized to detect changes in cuttings densities and transport efficiencies and may therefore further be utilized in characterizing the lithology of the formation being drilled. As described above with respect to Equations 8-17, the ASM pressure measurements may be used to determine constituent densities of various materials in the drilling fluid. In operations in which there is no annular inflow or outflow (i.e., when $Q_x$ and $f_x$ are approximately equal to zero), the cuttings density may be readily determined using EA_ISD and MA_ISD.

Figure 6:
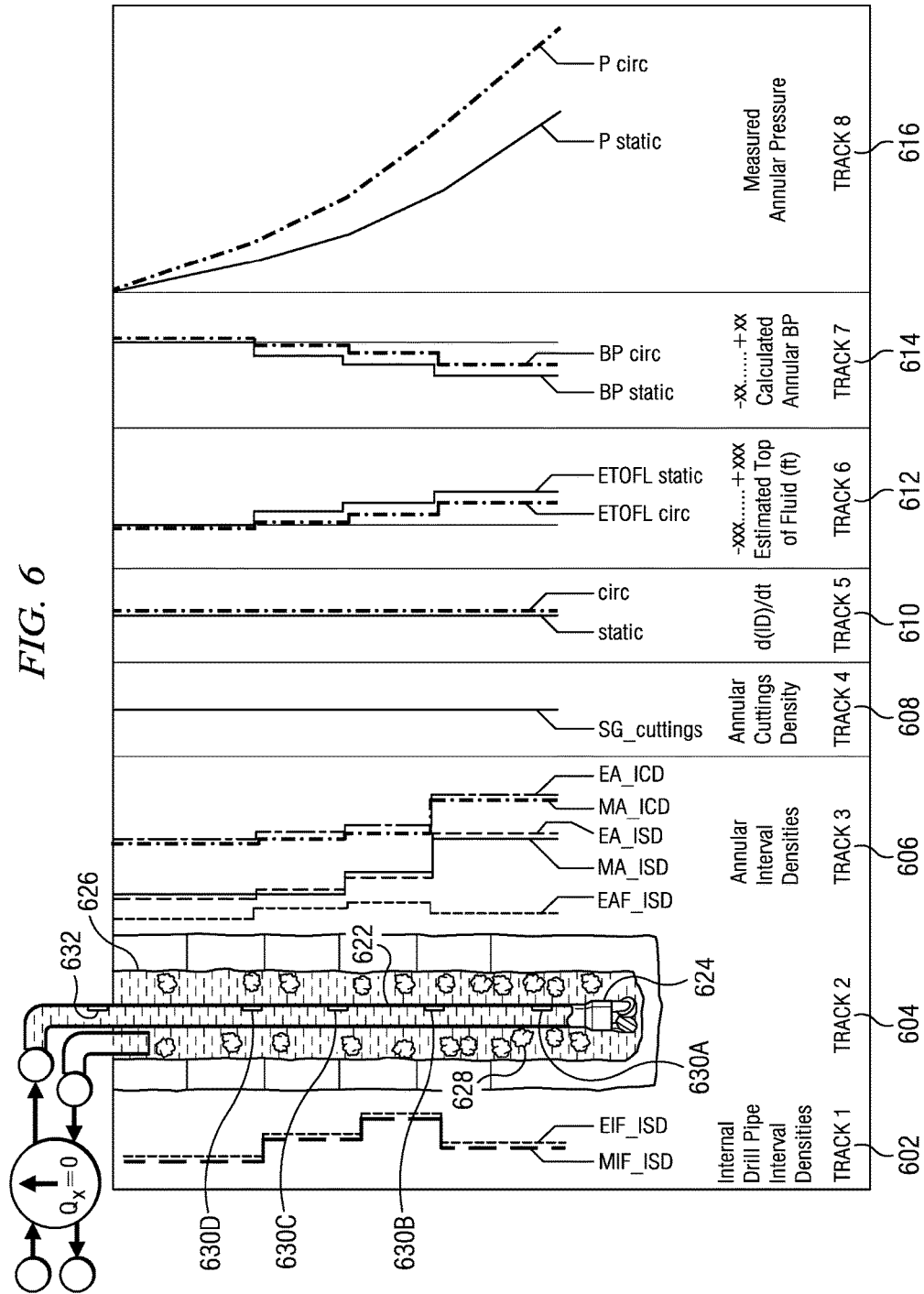
FIGS. 6, 7, and 8 depict a hypothetical example of a well drilling operation in which a change in formation lithology is encountered that results in a reduced cuttings density with FIG. 6 depicting the hypothetical drilling operation at time $t_1=0$, FIG. 7 depicting time $t_2=t_1+\Delta t$, and FIG. 8 depicting time $t_3=t_2+\Delta t$.
Figure 7:
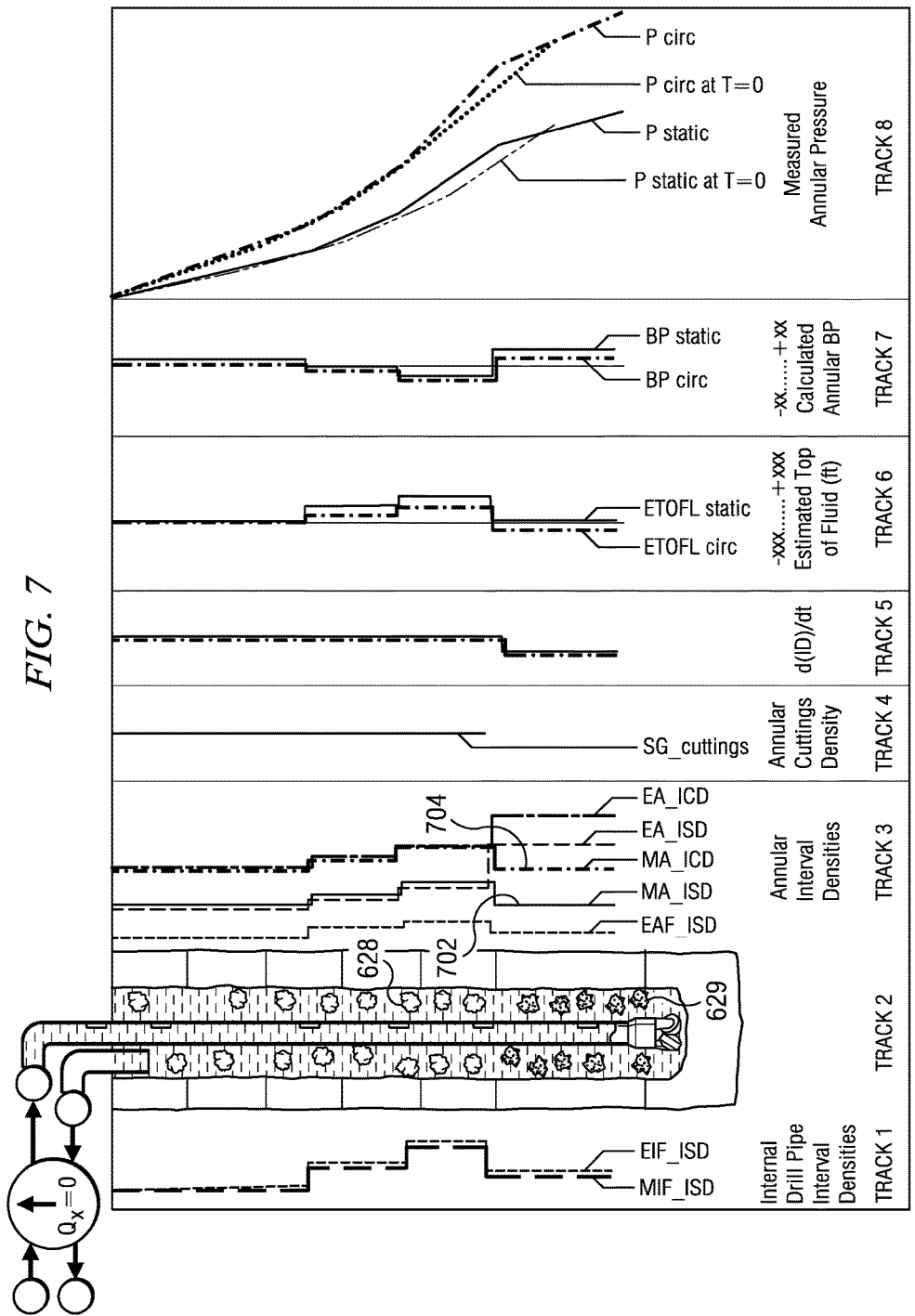
Figure 8:
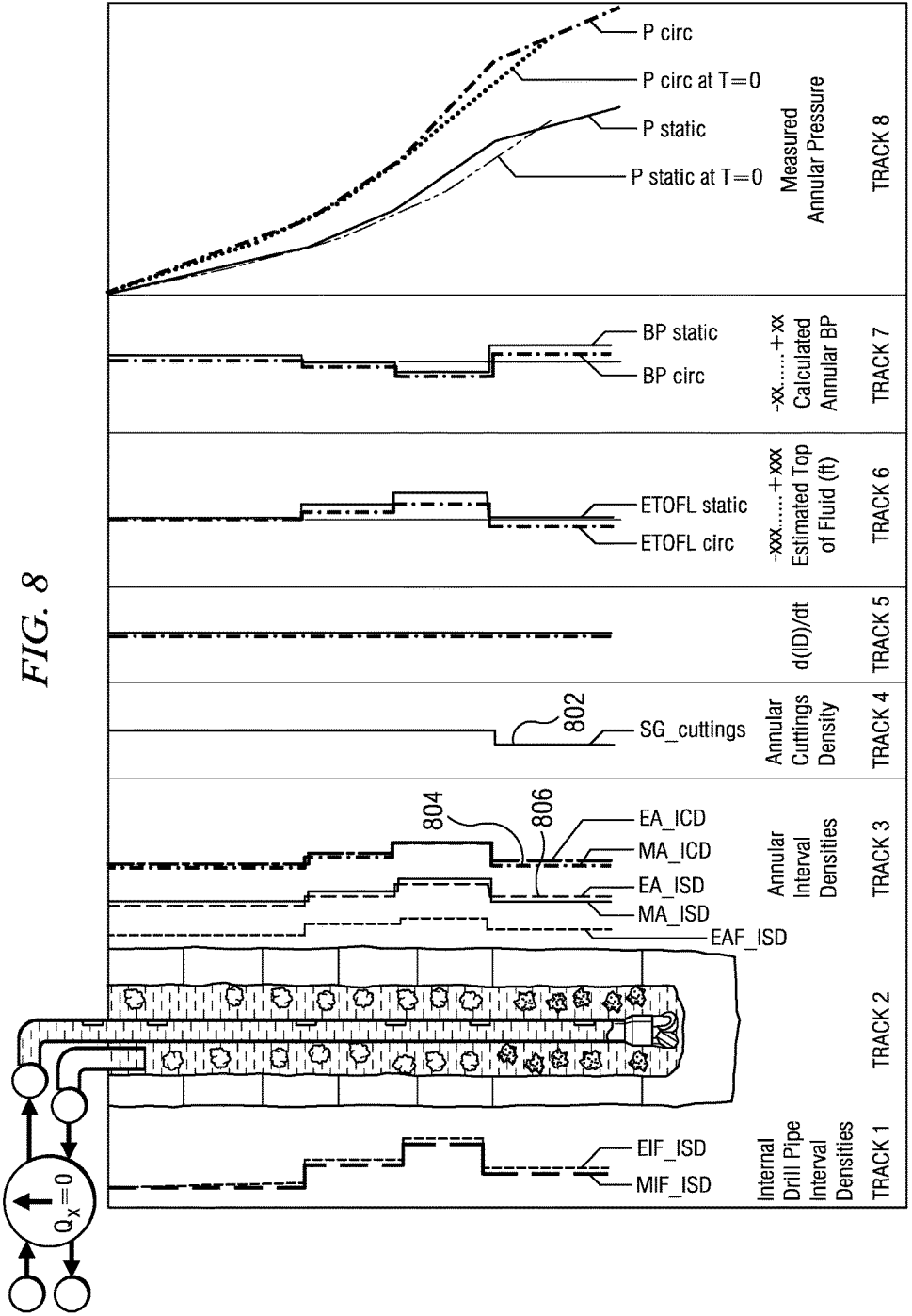

FIGS. 6, 7, and 8 depict a hypothetical example of a well drilling operation in which a change in formation lithology is encountered that results in a reduced cuttings density. In each of FIGS. 6, 7, and 8, track 2 (shown at 604) schematically depicts the lithology being drilled, for example, as determined by a computed cuttings density and a dimensionless torque. The drill pipe and drill bit are shown at 622 and 624, while the outline of the borehole is shown at 626. Cuttings are further depicted at 628 as being transported to the surface in the drilling fluid moving upward through the annulus. The depicted drill string includes four along string pressure and temperature sensors 630A, 630B, 630C, and 630D and a surface sensor 632. It will be understood that the disclosed embodiments are not limited to any particular number of ASM sensors.

Track 1 depicts (at 602) MIF_ISD and EIF_ISD, the former of which is computed from MIF_ICD by subtracting the modeled and/or measured internal drill pipe frictional effects on the flowing mud. EIF_ISD represents the input mud density properties corrected for the effects of the internal drill pipe measured and/or modeled pressures and temperatures using a suitable hydraulic modeling program. The necessary hydraulic modeling parameters for the pressure and temperature effects may be determined by matching EIF_ISD to MIF_ISD over the intervals where MIF_ISD computations are available.

Track 3 includes (at 606) the computed annular interval densities, EAF_ISD, MA_ISD, EA_ISD, MA_ICD, and EA_ICD. EAF_ISD represents the density of the cuttings free input mud flowing up the annulus corrected for the measured annulus pressures and temperatures using the same hydraulic modeling parameters determined for the internal mud. The modeled cuttings load is added to EAF_ISD to obtain EA_ISD. The measured interval static density MA_ISD is equal to the measured interval circulating density MA_ICD less the annular frictional losses when the cuttings volume, density, and transport and the frictional flow parameters are properly modeled. A minimization program may be utilized in the modeling as described above in to achieve this as described above.

Track 4 depicts (at 608) the computed cuttings density. Other parameters are shown on Tracks 5-8 and discussed in more below with regards to other examples. It will be understood in FIGS. 6, 7, and 8 that when two parameters (e.g., represented by dashed and solid curves) are equal to one another, they are shown with a slight separation (approximately a curve width) in order to make both curves visible. Such representation is merely convenience and not meant to be limiting.

Time differentials of the measured interval static and circulating densities MA_ISD and MA_ICD are shown in track 5 at 610. Equivalent top of fluid ETOFL for the static and circulating fluid are shown in track 6 at 612. Calculated annular back pressure BP for the static and circulating fluid are shown in track 7 at 614 and the measured annulus static and circulating pressures P are shown in track 8 and 616.

FIG. 6 depicts the hypothetical drilling operation at time $t_1=0$. As shown in track 3 (at 606), the measured and expected annulus static and circulating densities are equal to one another (i.e., MA_ISD is approximately equal to EA_ISD and MA_ICD is approximately equal to EA_ICD). The computed cuttings density shown in track 4 is constant with depth indicating that the time required for the cuttings to reach the surface is less than the time taken to drill the present formation layer. The volume fraction of the cuttings $f_{cuttings}$ decreases towards the top of the borehole (as shown schematically on track 2) and may be due, for example, to the rate of penetration, formation porosity, and/or cuttings transport effects as a function of time. These variables may be accounted for in the minimization process. The quantity $f_{cuttings}$ may also be shown in the log if desired.

FIG. 7 depicts the hypothetical drilling operation shown in FIG. 6 at time $t_2=t_1+\Delta t$ and includes the same tracks as described above. As depicted on track 2, the drill bit has penetrated a new formation having a lower density, thereby resulting in cuttings 629 having a lower density than the previously generated cuttings 628. As a direct result of the reduced cuttings density, MA_ISD falls below EA_ISD and MA_ICD falls below EA_ICD in the lower most interval (as depicted at 702 and 704 in track 3).

It will be understood that a change in cuttings density may be identified by signatures other than those discussed above with respect to FIG. 7. Tables 5A and 5B list the expected signatures that result from such a change in the cuttings density in the annulus (typically as a result of drilling a new formation before the minimization process has computed a new cuttings density value). Table 5A lists expected signatures when drilling a formation having a lower density while Table 5B lists expected signatures when drilling a formation having a higher density.

TABLE 5A

| Parameter | Changes with Time | Changes with Depth |
|---|---|---|
| $Q_x$ | $Q_x = 0$; No change | $Q_x = 0$; No change |
| $F_x$ | may change | may change |
| $SG_{cuttings}$ | Computed value will decrease | NA |
| MA_ISD vs. EA_ISD | MA_ISD < EA_ISD; MA_ISD decreasing with time until interval contains only the new lighter cuttings | Decrease in MA_ISD moves uphole as lighter cuttings move uphole in the annulus |
| MA_ICD vs. EA_ICD | MA_ICD < EA_ICD; MA_ICD decreasing with time until interval contains only the new lighter cuttings. | Decrease in MA_ICD moves uphole as lighter cuttings move uphole in the annulus |
| ETOFL | ETOFL decreases with time over affected interval. | ETOFL is lower over intervals having lighter cuttings. |
| Calculated Annular Surface BP | BP increases with time over affected interval. | BP is higher over intervals having lighter cuttings. |
| ASM Pressure | Slight decrease with time over affected interval. | Slight decrease over intervals having lighter cuttings. |
| ASM Temperature | No change | No change |

TABLE 5B

| Parameter | Changes with Time | Changes with Depth |
|---|---|---|
| $Q_x$ | $Q_x = 0$; No change | $Q_x = 0$; No change |
| $F_x$ | may change | may change |
| $SG_{cuttings}$ | Computed value will increase | NA |
| MA_ISD vs. EA_ISD | MA_ISD > EA_ISD MA_ISD increasing with time | Increase in MA_ISD moves uphole as heavier cuttings move uphole in |

TABLE 5B-continued

| Parameter | Changes with Time | Changes with Depth |
|---|---|---|
| | until interval contains only the new heavier cuttings. | the annulus |
| MA_ICD vs. EA_ICD | MA_ICD > EA_ICD MA_ICD increasing with time until interval contains only the new heavier cuttings. | Increase in MA_ICD moves uphole as heavier cuttings move uphole in the annulus |
| ETOFL | ETOFL increases with time over affected interval. | ETOFL is higher over intervals having heavier cuttings. |
| Calculated Annular Surface BP | BP decreases with time over affected interval. | BP is lower over intervals having heavier cuttings. |
| ASM Pressure | Slight increase with time over affected interval. | Slight increase over intervals having heavier cuttings. |
| ASM Temperature | No change | No change |

FIG. 8 depicts the hypothetical drilling operation shown on FIG. 6 at time $t_3=t_2+\Delta t$ and includes the same tracks as described above. When $Q_x=0$ a minimization program may be used to directly determine the density of the cuttings. This new cuttings density is depicted in track 4 at 802 and indicates a reduced cuttings density as expected. The new cuttings density may also be utilized to compute new expected interval circulating and static densities EA_ICD and EA_ISD, which are approximately equal to the corresponding measured interval densities MA_ICD and MA_ISD as shown in track 3 at 804 and 806.

The cuttings density $SG_{cuttings}$ may be used, for example, to identify the lithology of the formation being drilled (e.g., sandstone, limestone, dolomite, shale, tar, salt, etc.). For example, quartz sandstone has a density of about 2.65, calcium carbonate limestone has a density of about 2.71, calcium magnesium carbonate dolomite has a density of about SG of 2.85, mixed mineral shale formations have an average density in the range from about 2.6 to about 2.7, halite salts have a density of about 2.17, tar layers have a density in the range from about 0.8 to about 1.1, and anhydrite has a density of about 2.97. Knowledge of the cuttings velocity (or velocities) with time, enables cuttings depths to be assigned, which in turn may enable a lithology log (e.g., as depicted in track 2) to be constructed. In the example depicted on FIGS. 6-8, the cuttings density in the interval being drilled is less than that of the previous interval which further aids in the identification of the formation lithology.

Those of ordinary skill in the art will readily appreciate that formation bulk density is a widely used petrophysics parameter. This parameter is commonly used for applications ranging from overburden calculations, geomechanical modeling, synthetic seismograms, and formation porosity determination. The formation bulk density is generally a function of the lithology (or mineral content of the formation) and the fluid type and volume in the formation. In drilling operations in which the drilling process destroys the formation porosity, the computed cuttings density may be used as the mineral density (formation matrix density) to compute the porosity from a borehole geophysical measurement of bulk density.

Tar Mat Identification

Tar zones (also referred to in the art as tar mats) are a common threat in drilling operations and can at times represent a serious risk to a drilling operation. Since tar is difficult to identify in seismic maps, avoidance can be challenging and often relies primarily on local experience. Moreover common utilized logging while drilling (LWD) technologies, such as gamma ray and resistivity logging measurements, are not always capable of identifying tar zones. As such a drilling operator sometimes does not realize that a tar zone has been intercepted until the annulus is full of tar. This can result in a pack-off situation and a stuck BHA. The ASM pressure and temperature measurements and the interval densities disclosed herein may be used to quickly identify and mitigate intercepted tar zones.

The disclosed interval densities may be utilized to identify tar in the annulus via computing the interval cuttings density as described above with respect to FIGS. 6-8 and Tables 5A and 5B. The presence of tar in the annulus may be identified by a decrease in the lowermost interval density. This decrease may be modeled as a corresponding decrease in the computed cuttings density. Tar mats tend to cause a significant decrease in the interval density for at least two reasons. First, the density of the tar is significantly less than that of the rock formations commonly drilled (e.g., in a range from about 0.8 to about 1.1 as compared to a range from about 2 to about 3 for the drilled rock as described above). Second, the tar mats generally include a high volume fraction of tar (many tar mats are non porous layers that are made up nearly 100% tar) such that the volume fraction of tar in the local annular interval is also high.

Early identification of tar mats enables the drilling operator to mitigate the influx of tar into wellbore. Such mitigation may include any number of techniques, for example, including, the use of managed pressure to artificially boost the constraining pressure or back pressure in the annulus to keep additional tar from sloughing into the borehole, moving the pipe up above the point of the tar mat without circulating, then introducing a heavier weight mud into the borehole (called spotting a pill), side tracking around the tar, treating the tar with various chemical additives, and isolating the tar via the use of various types of casing. The disclosed embodiments are, or course, not limited to any particular mitigating action.

Borehole Washout

Due to various geomechanical and/or drilling practices the borehole can become enlarged with time during a drilling operation. Such borehole enlargement can be detrimental for several reasons. For example, an enlarged borehole can reduce the velocity of cuttings moving up through the annulus thereby enhancing the possibility of cuttings dropping out of suspension and packing off the borehole. Enlarged boreholes also require larger volumes of cement during casing operations.

Figure 9:
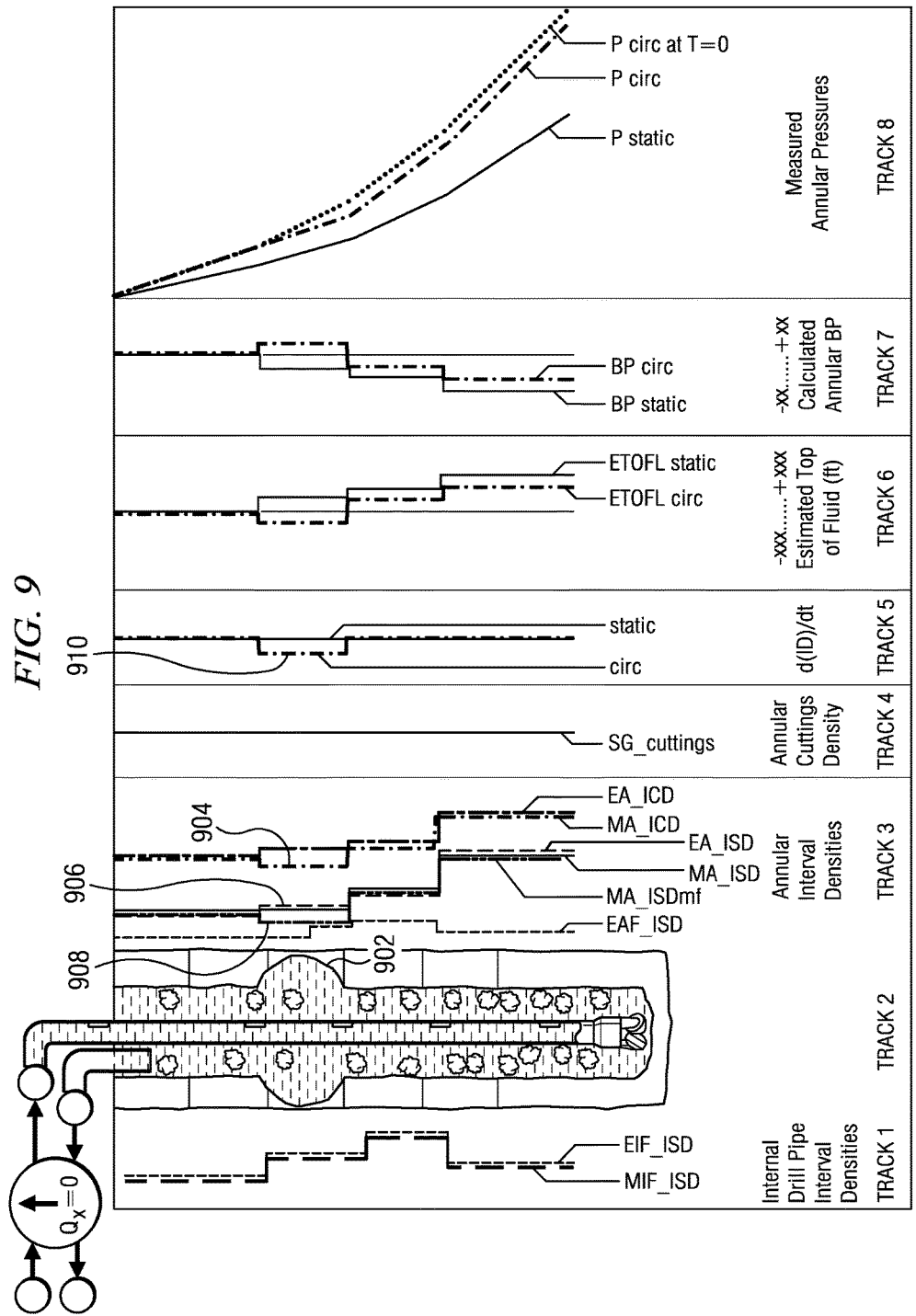
Figure 10:
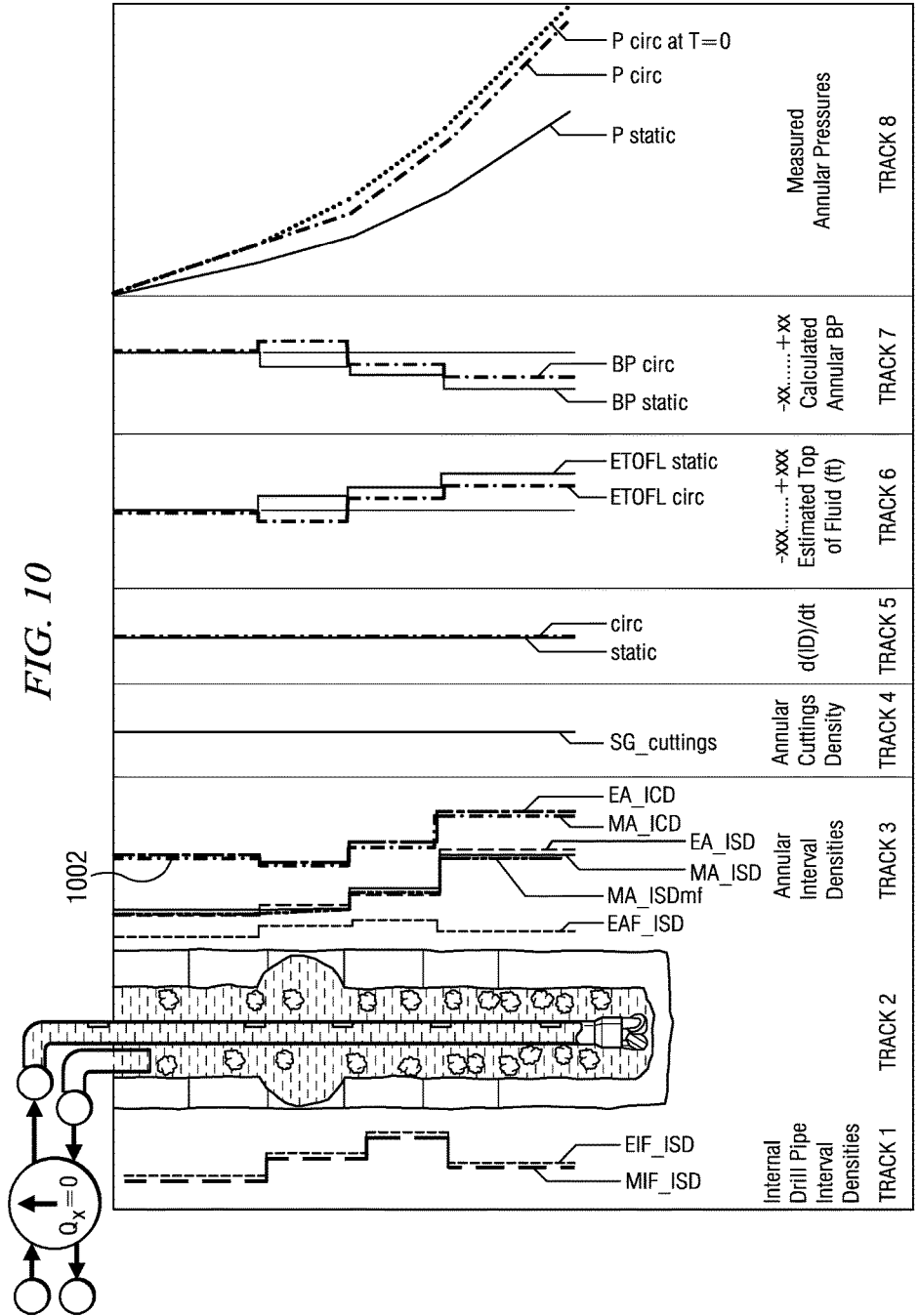

FIGS. 6, 9, and 10 depict a hypothetical example of another well drilling operation in which a portion of the borehole becomes enlarged during the drilling operation (FIGS. 9 and 10 depict the enlargement). This example again uses FIG. 6 to depict the hypothetical drilling operation at time $t_1=0$. As described above, the measured and expected interval densities are substantially equal to one another along the length of the wellbore (i.e., MA_ISD=EA_ISD and MA_ICD=EA_ICD as shown in track 3) indicating that the cuttings volume, cuttings density, cuttings transport and fractional volume, and the annular frictional effects have been properly modeled.

computed at the end of the drilling process may be used to calculate the volume of cement needed in the post-drilling casing operation.

It will be understood that a change in borehole diameter (e.g., caused by a washout) may cause corresponding changes in certain of the disclosed parameters other than those described above with respect to FIGS. 9-10. Table 6 lists the expected changes caused by a borehole washout or enlargement.

TABLE 6

| Parameter | Changes with Time | Changes with Depth |
|---|---|---|
| $Q_x$ | $Q_x = 0$; No change | $Q_x = 0$; No change |
| $f_x$ | May decrease and can change with time | May decrease and can change as other intervals washout |
| $SG_{cuttings}$ | No change | No change |
| MA_ISD vs. EA_ISD | MA_ISD constant with time and equal to EA_ISD during washout. MA_ISD > MA_ISD$_{mf}$ | MA_ISD = EA_ISD at same depth interval, not moving uphole unless other intervals are enlarging. |
| MA_ICD vs. EA_ICD | MA_ICD decreasing with time and less than EA_ICD during washout. | MA_ICD less than EA_ICD over affected depth interval, not moving uphole unless other intervals are enlarging. |
| Circulating ETOFL | Decreases as washout enlarges with time. Static ETOFL not changing. | Decreases as washout enlarges, Remains at fixed depth. |
| Circulating Calculated Surface annular BP | Increases as washout enlarges with time. Static BP not changing. | Increases as washout enlarges, Remains at fixed depth. |
| ASM Pressure | Slight decrease of circulating pressure during enlargement. | Slight decrease, can change as other intervals washout. |
| ASM Temperature | Slight increase with time due to flow velocity decrease. | Slight increase due to flow velocity decrease at that depth |

FIG. 9 depicts the hypothetical drilling operation at time $t_2=t_1+\Delta t$ and includes the same tracks as described above with respect to FIG. 6. A washout zone having an increased diameter is depicted at 902 in track 2. In track 3 at 904, MA_ICD has decreased and is less than EA_ICD in the washout interval, however, MA_ISD remains substantially constant and is about equal to EA_ISD as shown at 906. The enlarged borehole causes the annular frictional pressures to decrease in the washout interval thereby reducing the measured interval circulating densities, but not the expected interval densities that are computed using a model that makes use of LWD caliper measurements or the bit size when the interval was drilled. The measured and expected interval static densities remain substantially equal since the washout is at a constant depth and since the cuttings are not dropping out of suspension in this example. MA_ISD$_{mf}$ which is computed by subtracting a modeled annular friction from MA_ICD also decreases in the washout interval as shown at 908. In track 5 at 910, the derivative of MA_ICD is negative indicating a drop in MA_ICD with time as the borehole washes out (becomes enlarged).

FIG. 10 depicts the hypothetical drilling operation at time $t_3=t_2+\Delta t$. A minimization process has been instructed to compute a new borehole diameter such that the expected annulus frictional pressures are reduced and match the measured interval circulating density. As depicted in track 3 at 1002, MA_ICD and EA_ICD are now substantially equal in the washout interval (as a result of the minimization process creating a larger borehole diameter). This new diameter may be stored as a function of time for plotting and analysis against drilling practices and parameters and time dependant formation strength determinations to further enhance the understanding of the formation strength and to acknowledge and prevent the practice of detrimental drilling practices in the future. Moreover, the borehole diameter Borehole Pack-Off As used in the art, a pack-off describes a situation in which the borehole diameter has been reduced creating a "choke" to fluid flowing up the annulus. Such a reduction may be caused, for example, by a large volume of cuttings that have dropped out of suspension in the annulus or sloughing of the borehole wall into the annulus. With insufficient annular fluid velocity, mud viscosity, or in a highly inclined borehole, the cuttings may accumulate at some depth in the well and cause a restriction (the pack-off). Depending upon the severity of the pack-off, the pressure may increase to undesirable levels deeper in the well and may even cause the formations to fracture if remedial action is not performed in a timely manner. The pack-off can also result in lost circulation which in turn can cause a loss of hydrostatic head and a possible inflow or even a kick from a permeable formation. A severe pack-off can even also result in a stuck BHA if sufficient cuttings are allowed to accumulate around the drill string.

Figure 11:
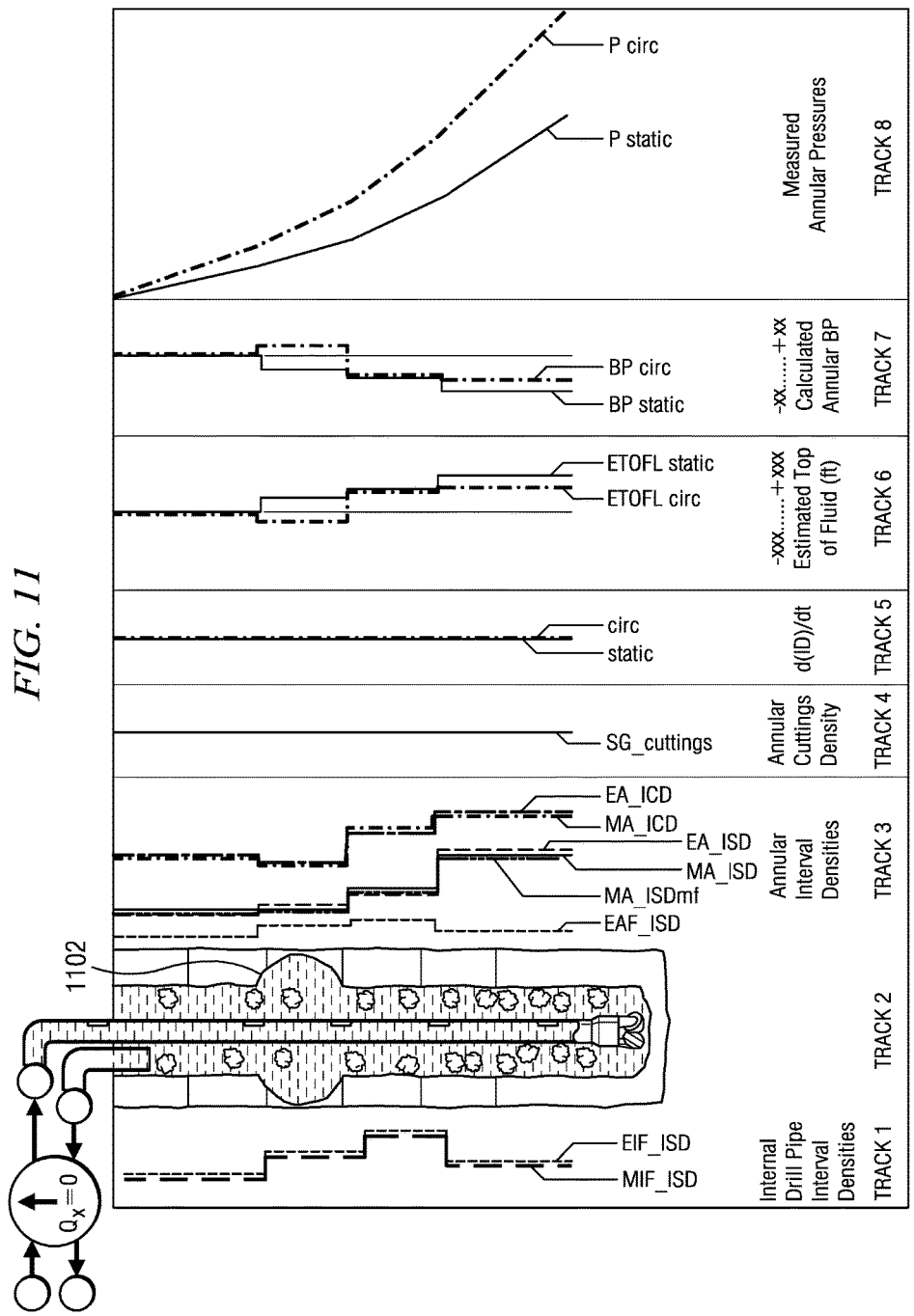
FIGS. 11, 12, and 13 depict a hypothetical example of a well drilling operation in which borehole cuttings drop out of suspension and form a pack-off with FIG. 11 depicting the hypothetical drilling operation at time $t_1=0$ and FIGS. 12 and 13 depicting distinct methodologies for computing interval densities at time $t_2=t_1+\Delta t$.
Figure 12:
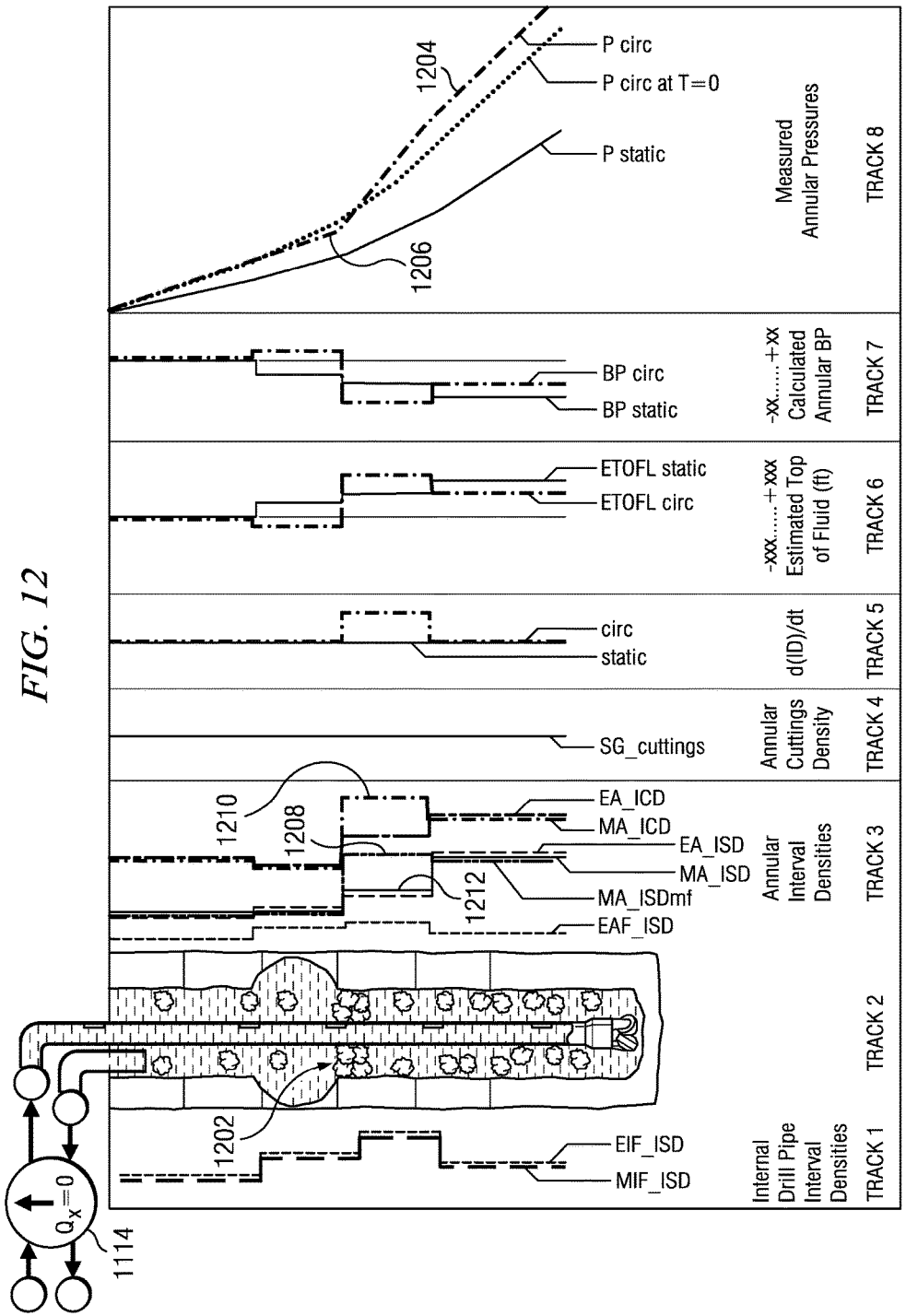
Figure 13:
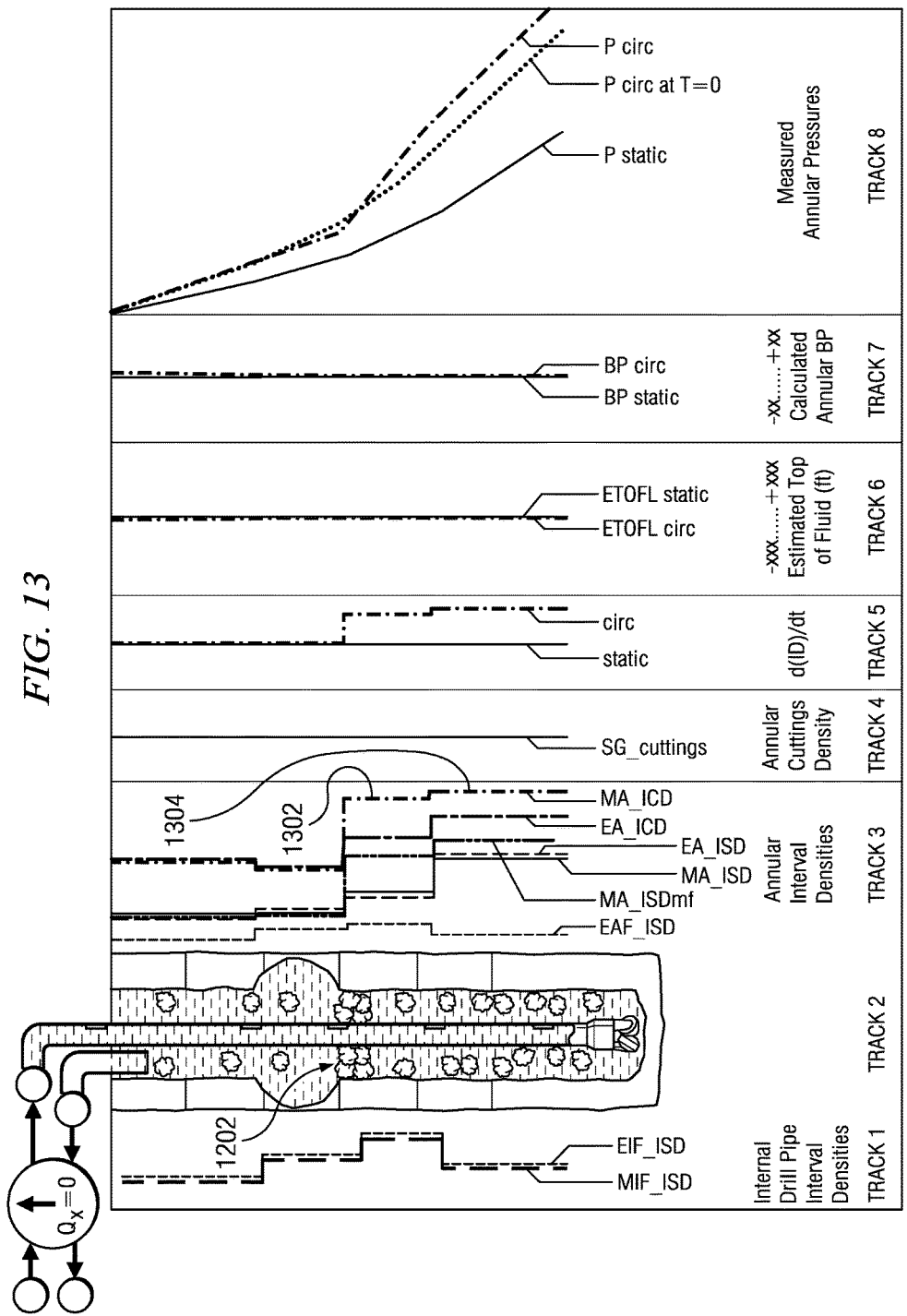

FIGS. 11, 12, and 13 depict a hypothetical example of a well drilling operation in which borehole cuttings drop out of suspension and form a pack-off. Track 2 of FIG. 11 includes an enlargement at 1102 as described above with respect to FIGS. 9 and 10. In FIGS. 12 and 13 a pack-off is depicted just below the enlargement at 1202. FIGS. 11-13 display the same tracks as described above in FIGS. 6-8. In this example, FIG. 11 depicts the hypothetical drilling operation at time $t_1=0$ (after the formation of the washout). It will be understood that the disclosed embodiments are not limited by the depiction of a washout. In track 3 of FIG. 11, the measured and expected interval densities are substantially equal to one another along the length of the wellbore (i.e., MA_ISD=EA_ISD and MA_ICD=EA_ICD) indicating that the cuttings volume, cuttings density, cuttings transport and fractional volume, and the annular frictional effects have been properly modeled.

The pack-off is depicted schematically in track 3 (at 1202) in FIGS. 12 and 13. The restriction causes the annular circulating pressures further down in the well to increase as shown at 1204 in track 8 of FIG. 12. The circulating pressure above the restriction may also decrease slightly as depicted at 1206 if the flow rate is significantly reduced above the pack-off. Conventional annular pressure measurements by themselves may at times be used to identify the pack-off by monitoring annular pressure changes with time and depth. The disclosed interval densities may also be utilized to identify a pack-off and tend to provide a more definitive signature. For example, as depicted on FIG. 12, the interval 1304. The calculated ETOFL and BP are zero by definition when using this calculation technique as shown in tracks 6 and 7. In the methodology shown on FIG. 13, the interval densities from the pack-off location to the drill bit increase. This may advantageously make the visual impact of the event more noticeable in certain display configurations and may further enable the axial location of the pack-off to be estimated.

It will be understood that the development of a pack-off or a restriction may cause corresponding changes in certain of the disclosed parameters other than those described above with respect to FIGS. 12 and 13. Table 7 lists the expected changes caused by a pack-off or annular restriction.

TABLE 7

| Parameter | Changes with Time | Changes with Depth |
|---|---|---|
| $Q_x$ | $Q_x = 0$; No change | $Q_x = 0$; No change |
| $F_x$ | No change | No change |
| $SG_{cuttings}$ | No change | No change |
| $MA\_ISD_{mf}$ vs. $MA\_ISD$ | $MA\_ISD_{mf} > MA\_ISD$ Increases with time as pack-off Develops | $MA\_ISD_{mf} > EA\_ISD$ Over pack-off depth interval only |
| $MA\_ISD$ vs. $EA\_ISD$ | $MA\_ISD \approx EA\_ISD$ | $MA\_ISD \approx EA\_ISD$ Over pack-off depth interval |
| $MA\_ICD$ vs. $EA\_ICD$ | $MA\_ICD > EA\_ICD$ Increases with time as pack-off Develops | $MA\_ICD > EA\_ICD$ Over pack-off depth interval only |
| Estimated Top of Fluid | Circulating ETOFL increasing across event, slightly decreasing below event, and no change above event, all changing as pack-off develops. Static ETOFL not affected if pack-off interval is short. | Circulating ETOFL increasing across event, slightly decreasing below event, and no change above event. Pack-off interval has the largest ETOFL. Static ETOFL not affected if pack-off interval is short. |
| Calculated Annular Surface BP | Circulating BP decreasing across event, slightly increasing below event, and no change above event, all changing as pack-off develops. | Circulating BP decreasing across event, slightly increasing below event, and no change above event. Pack-off interval has the lowest BP. |
| ASM Pressure | Circulating pressures increase below the pack-off, no change above pack-off, increases as pack-off develops. | Circulating pressures increase below the pack-off, no change above pack-off. |
| ASM Temperature | Slight increase below pack-off with time, decrease above pack-off | Slight increase below pack-off, decrease above pack-off | densities that span the pack-off tend to increase while the interval densities above and below this span tend to remain unchanged. Within the pack-off span, the measured interval densities $MA\_ISD_{mf}$ and $MA\_ICD$ increase significantly over the corresponding expected (modeled) interval densities $EA\_ISD$ and $EA\_ICD$ as depicted at 1208 and 1210. When the pumps are brought down and the actual static density is measured, $MA\_ISD_{mf}$ is also observed to be larger than the measured interval static density $MA\_ISD$. Moreover, $MA\_ISD$ may be approximately equal to (or possibly slightly greater than) $EA\_ISD$ as shown at 1212 depending on the mass of accumulated cuttings. $Q_x$ is also observed to be approximately equal to zero as indicated at 1214 in FIG. 12. These observed signatures tend to be uniquely attributable to pack-offs (or other annular restrictions) with the added characteristic that the aforementioned interval density differences remain at a fixed depth (since the pack-off itself remains at fixed depth).

FIG. 13 is similar to FIG. 12, but depicts an alternative methodology for computing the interval densities. In particular, each of the intervals used in FIG. 13 extends from the depth of the ASM sensor to the surface (instead of the interval between adjacent sensors as depicted on FIG. 12). In FIG. 13, each of the measured interval circulating densities below the pack-off is greater than the corresponding expected interval circulating density as depicted at 1302 and The identification of the pack-off by observing annular pressures and interval densities may be automated such that the signature shown in FIG. 12 (e.g., MA_ISD>EA_ISD and MA_ICD>EA_ICD with the differences not changing with time) triggers an alarm that alerts the drilling operator. The automation routine may further reduce the circulation rate to reduce the pressure buildup below the pack-off. The drilling operator may then initiate a sequence of steps designed to break-up or dislodge the pack-off (e.g., working the drill string up and down in the borehole while rotating). It will be understood that the disclosed embodiments are not limited in these regards.

Inflow to the Borehole Annulus

As is known to those of ordinary skill in the art, formation fluids tend to flow into the wellbore during drilling when the formation has a higher pore pressure than the mud pressure at the formation depth. Such inflow events can occur further up the borehole if the mud column is allowed to drop below the surface, fore example, when tripping the drill pipe out of the borehole. Swab events can also contribute to an inflow. Formation fluids, such as gas, oil, or connate water, generally exhibit a lower density than the drilling mud. Any inflow therefore tends to further reduce the hydrostatic head, allowing the inflow rate to increase until the wellbore can no longer be controlled. Timely mitigation therefore requires early recognition of the inflow event. ASM pressure and temperature measurements and the disclosed interval densities may be used to identify inflow events soon after they begin.

Figure 14:
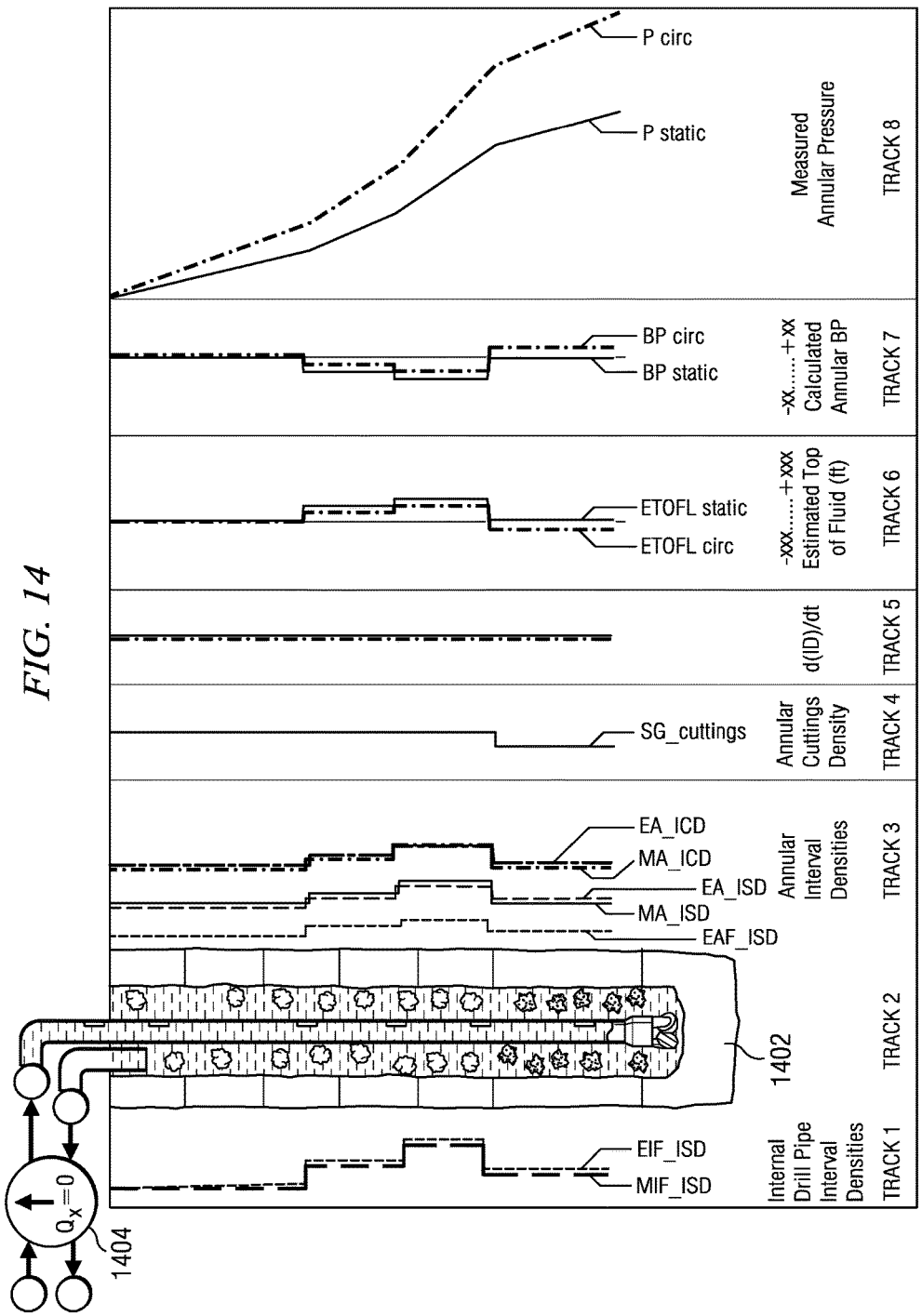
FIGS. 14, 15, 16, and 17 depict a hypothetical example of a well drilling operation including a formation fluid inflow event (also referred to as a kick) with FIG. 14 depicting the hypothetical drilling operation at time $t_1=0$, FIG. 15 depicting time $t_2=t_1+\Delta t$, FIG. 16 depicting time $t_3=t_2+\Delta t$, and FIG. 17 depicting time $t_4=t_3+\Delta t$.
Figure 15:
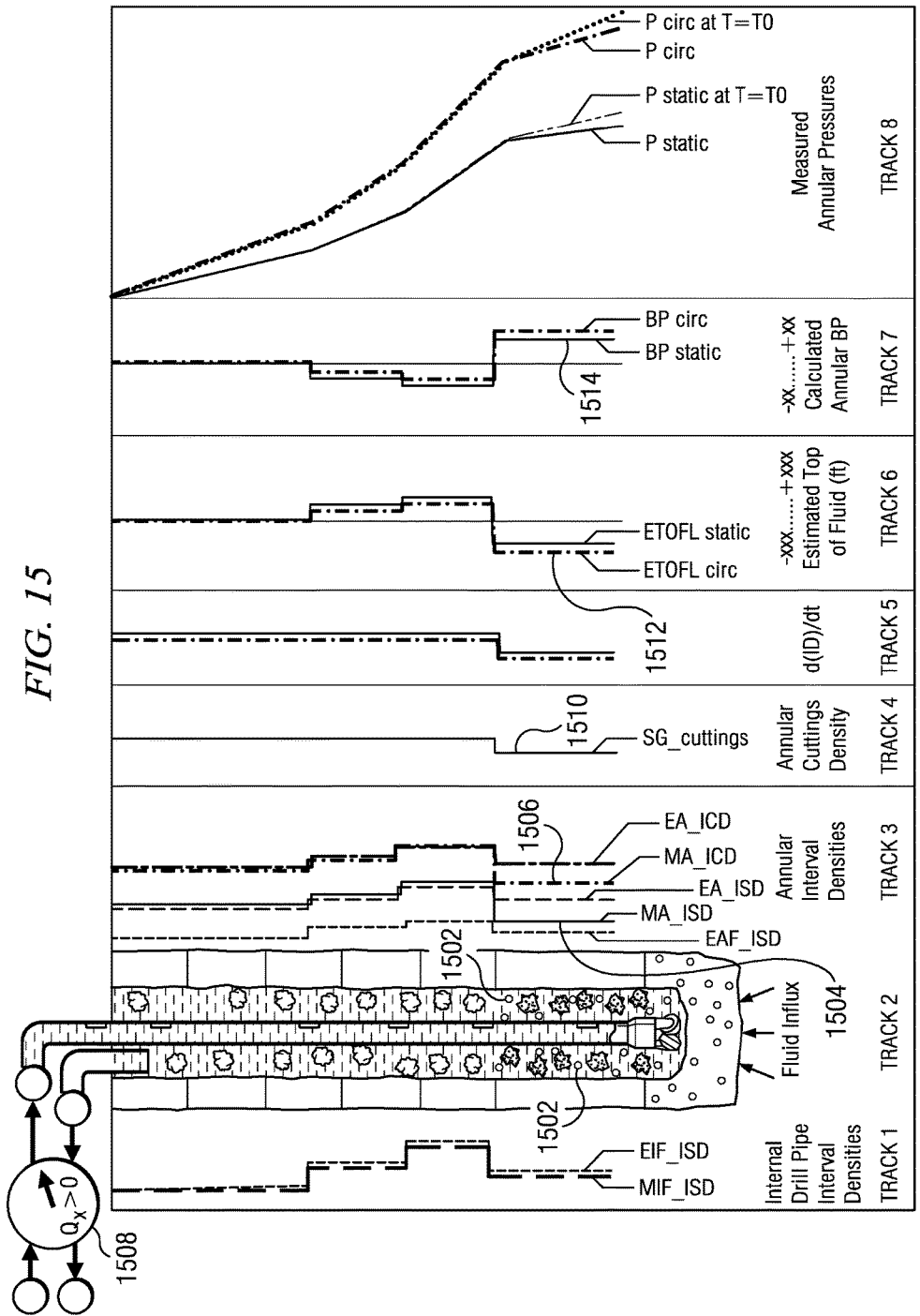
Figure 16:
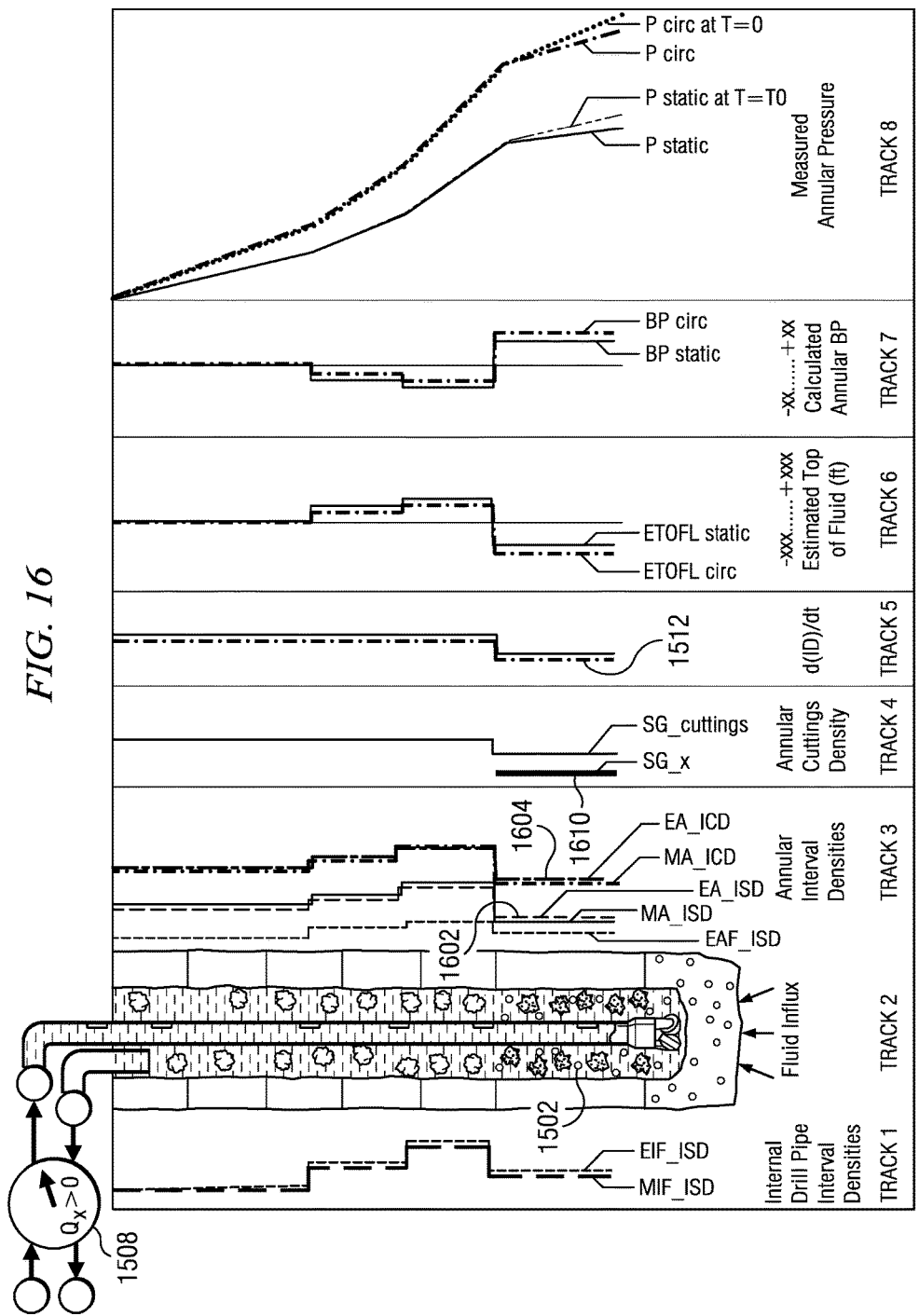
Figure 17:
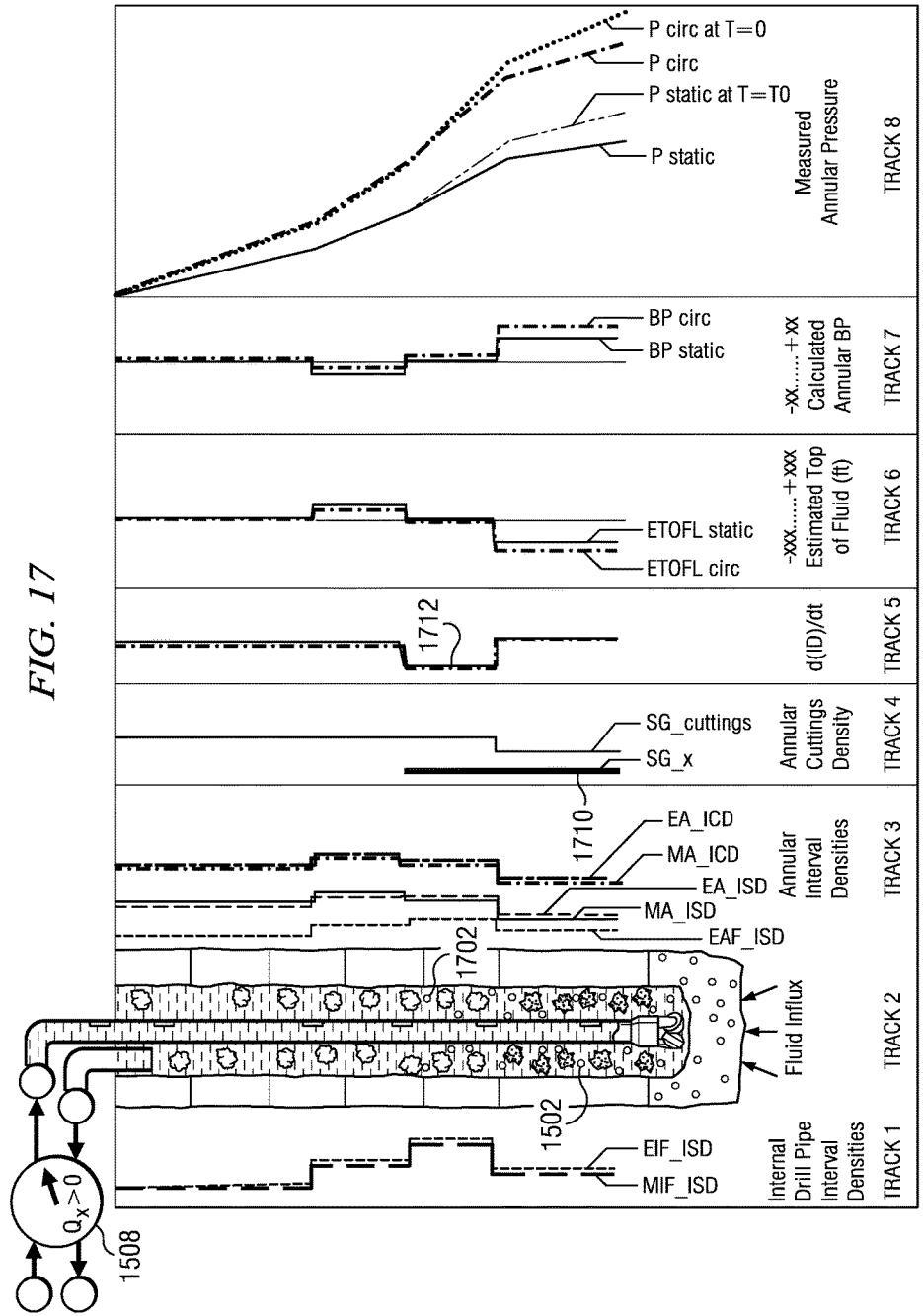

FIGS. 14, 15, 16, and 17 depict a hypothetical example of a well drilling operation including a formation fluid inflow event (also referred to as a kick). Track 2 of FIG. 14 depicts the drill bit penetrating a new formation 1402. In FIGS. 15-17 formation fluid influx is depicted at 1502 in track 2. FIGS. 14-17 display the same tracks as described above in FIGS. 6-8. In this example, FIG. 14 depicts the hypothetical drilling operation at time $t_1=0$ (after penetrating formation 1402 but prior to the fluid influx event shown on FIGS. 15-17). It will be understood that the disclosed embodiments are not limited by the depiction of the fluid inflow coming for the bottom of the well. Inflow may occur substantially anywhere along the length of the borehole as is known to those of ordinary skill in the art. In track 3 of FIG. 14, the measured and expected interval densities are substantially equal to one another along the length of the wellbore (i.e., MA_ISD=EA_ISD and MA_ICD=EA_ICD) indicating that the cuttings volume, cuttings density, cuttings transport and fractional volume, and the annular frictional effects have been properly modeled. Moreover, as shown at 1404, $Q_x$ is approximately equal to zero indicating no inflow.

FIG. 15 depicts the hypothetical drilling operation at time $t_2=t_1+\Delta t$. The inflow event has started as depicted at 1502 of track 2 causing $Q_x$ to be greater than zero as depicted at 1508. The parameter $Q_x$ may be estimated via a surface measurement of the difference in flow rate between the flow out of the annulus and the flow into the drill string (a differential flow volume). Equations 8-17 described above may be used to estimate or more accurately determine $Q_x$. In some instances a simple difference between the flow rate out of the annulus and the flow rate into the drill string may be suitable to estimate a value of $Q_x$. More accurate values of $Q_x$ may be obtained by taking into account $Q_{cuttings}$ generated from the drilling operation as disclosed in Equations 8-17. In normal drilling operations, $Q_{cuttings}$ may be in a range, for example, from about 1 to about 5 percent of the drilling fluid flow rate. An inflow event (e.g., a kick) may be a result in $Q_x$ being in a range, for example, from about 5 to about 100 percent or more of the drilling fluid flow rate.

With continued reference to FIG. 15, the measured interval static and circulating densities MA_ISD and MA_ICD decrease below the corresponding expected values EA_ISD and EA_ICD as shown at 1504 and 1506 in track 3. Since $Q_x \neq 0$ the program logic retains the most recent value of $SG_{cuttings}$ as indicated at 1510 (and via comparison of track 4 in FIGS. 14 and 15).

FIG. 16 depicts the hypothetical drilling operation at time $t_3=t_2+\Delta t$. A minimization process is used instead to compute a value for the density of the inflow material $SG_x$ as indicated at 1610 in track 4 of FIG. 16 (e.g., using Equations 8-17). The computed density of the inflow material $SG_x$ may then be utilized to estimate the type of fluid coming into the annulus. For example, a gas influx may have a density of less than about 0.6, an oil influx may have a density in a range from about 0.6 to about 0.8, and a connate water influx may have a density of about 1 to about 1.2. After assigning a value for $SG_x$ the measured interval static and circulating densities MS_ISD and MS_ICD are again approximately equal to the expected values ES_ISD and ES_ICD as shown at 1602 and 1604.

FIG. 17 depicts the hypothetical drilling operation at time $t_4=t_3+\Delta t$. As the inflow rises or is circulated up the annulus as shown at 1702 in track 2 of FIG. 17, the computed $SG_x$ moves up the annulus as well as shown at 1710 in track 4. This further illustrates the signature differences between an inflow and a pack-off or a borehole enlargement where the pressure disturbance remains at a constant depth. Moreover the derivative of the interval densities (shown at 1612 and 1712 of FIGS. 16 and 17) indicate how rapidly the inflow is moving up the annulus, thereby facilitating the planning of the particular control methodology used to control the well.

With continued reference to FIGS. 14-17, the Equivalent top of fluid level ETOFL becomes negative in the annular intervals having the inflow material (e.g., as indicated at 1512 in track 6 of FIG. 15). Furthermore, the calculated surface annular back pressure BP becomes positive in the annular intervals having the inflow material (e.g., as indicated at 1514 in track 7 of FIG. 15). As the inflow material moves up the wellbore, the ETOFL decreases (or goes negative) and BP increases (or goes positive) in progressively higher intervals in the borehole.

Figure 18:
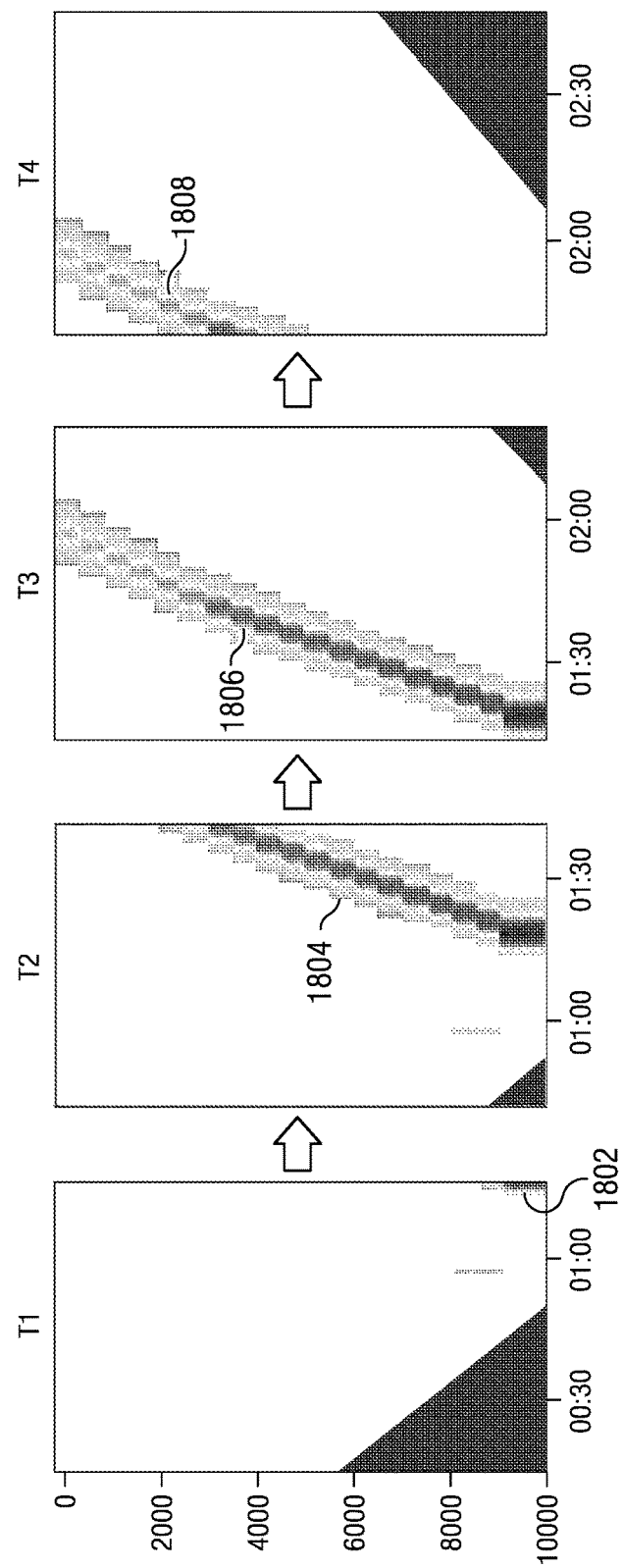
FIG. 18 depicts one example of a visual display illustrating inflow as a function of time and depth.

FIG. 18 depicts one example of a visual display illustrating inflow as a function of time and depth. Depth is shown on the vertical axis increasing in the downward direction. Time is shown on the horizontal axis increasing to the right. Interval density values are plotted as contours (for example using pseudo-color enhancement with warmer colors representing lower interval density values—but using grey scale contours in the depicted example in which a darker shade represents lower interval density values). The black regions are below the bit in the depicted example and therefore include no data. The left screen at time $t_1$ represents a snapshot of a time interval in which drilling is progressing. A lighter interval density is shown to be appearing at the lowermost interval on the right at 1802. The subsequent screens represent subsequent times $t_2$, $t_3$, and $t_4$ in which the a kick of comparatively low density fluid is moving up the annulus with time (the time progression is indicated at 1804, 1806, and 1808).

It will be understood that the development of an inflow (or kick) may cause corresponding changes in certain of the disclosed parameters other than those described above with respect to FIGS. 14-17. Table 8 lists the expected changes caused by an inflow before $SG_x$ and $Q_x$ have been computed (e.g., via the aforementioned minimization processes) and adjusted the expected annulus interval densities EA_ISD and EA_ICD.

TABLE 8

| Parameter | Changes with Time | Changes with Depth |
| --- | --- | --- |
| $Q_x$ | $Q_x > 0$; May change with time | $Q_x > 0$ |
| $F_x$ | No change | No change |
| $SG_{cuttings}$ | No change | No change |
| MA_ISD vs. EA_ISD | MA_ISD < EA_ISD Difference increases with time if inflow continues | MA_ISD < EA_ISD Moving up the annulus with time if the inflow continues |

TABLE 8-continued

| Parameter | Changes with Time | Changes with Depth |
| --- | --- | --- |
| MA_ICD vs. EA_ICD | MA_ICD < EA_ICD Difference increases with time if inflow continues | MA_ICD < EA_ICD Moving up the annulus with time if the inflow continues |
| Equivalent top of fluid | ETOFL is negative in the intervals containing the inflow and decreasing with time if inflow continues | ETOFL is negative in the intervals containing the inflow and inflow effect will move up the annulus with time |
| Calculated Surface annular BP | BP is positive and increasing with time if inflow continues | BP is positive in the intervals containing the inflow, and inflow effect will move up the annulus with time |
| ASM Pressure | Decreases with time if inflow Continues | Decrease in the intervals containing the inflow, and inflow effect will move up the annulus with time |
| ASM Temperature | Depends on the influx temperature, influx type, and pressure if there are Joule-Thomson effects. Changes with time if influx rate changes. | Highest rate of change at influx depth, changes migrate uphole with the influx fluid. |

During formation fluid sampling operations, formation fluid may be pumped (or released) into the annulus. For example, formation fluid is often pumped into the annulus for a period of time prior to sampling the formation fluid to ensure that only virgin fluid is sampled (i.e., that the sampled fluid is not contaminated with drilling fluid or cuttings). Up to one barrel or more of formation fluid may be released into the annulus for each sample acquired. The density of the annular fluid may be monitored while sampling using the interval density techniques describes herein. Moreover, after the samples are acquired, the formation fluid may be circulated to the surface and released through an annular choke. The interval densities may also be used to monitor the upward movement of the formation fluid through the annulus, thereby potentially saving considerable rig time.

When an inflow event (e.g., a kick) is encountered, a drilling operator may elect to circulate through an annular choke while heavy mud is pumped downhole. The disclosed interval densities may continue to be measured and computed and used to determine when the bottom hole density and pressure is sufficient to stop the inflow. For example, a measured bottom hole pressure may be used to drive a choke to keep the pressure within a desired range while pumping the heavy mud.

Outflow from the Borehole Annulus

Annular fluids may flow into the formation as it is drilled when the formation has a lower pore pressure than the drilling fluid pressure at that depth. Such an outflow may happen at the bit or further up the borehole if the drilling fluid pressure is allowed to increase above the formation pressure. In some operations, an outflow reduces the hydrostatic head thereby causing the outflow rate to decrease until the wellbore stabilizes. Such outflow events may be thought of as self-mitigating. However, in other operations, the reduced hydrostatic head caused by the outflow may trigger an inflow (or kick) in another formation (e.g., at another location in the borehole). As described above, inflow events can lead to highly dangerous and uncontrollable well conditions. Timely mitigation requires early recognition of the problem, and in keeping with the purposes of this section, timely recognition of the outflow event. ASM pressure and temperature measurements and the disclosed interval densities may be used to identify outflow events soon after they begin.

Figure 19:
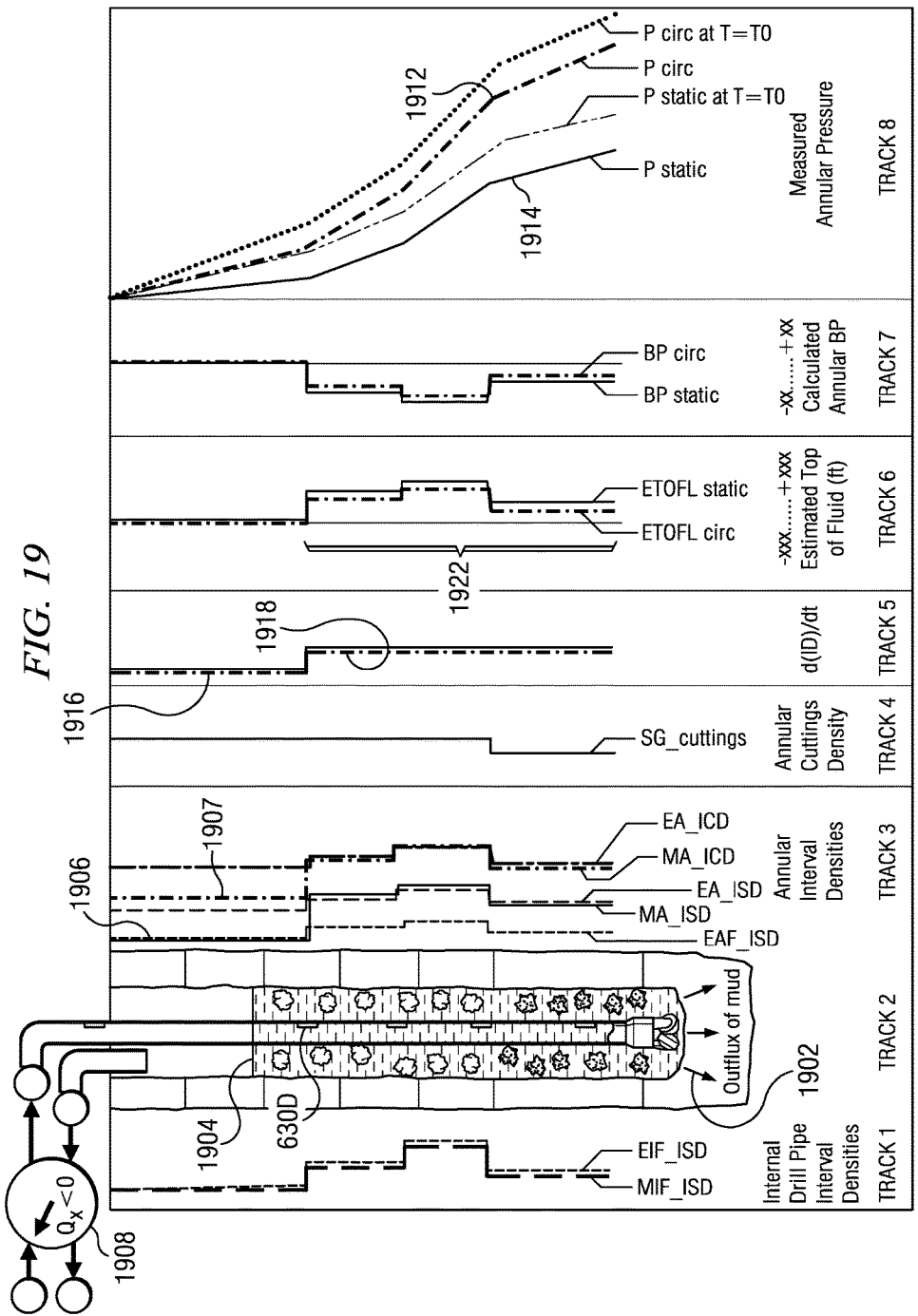
Figure 20:
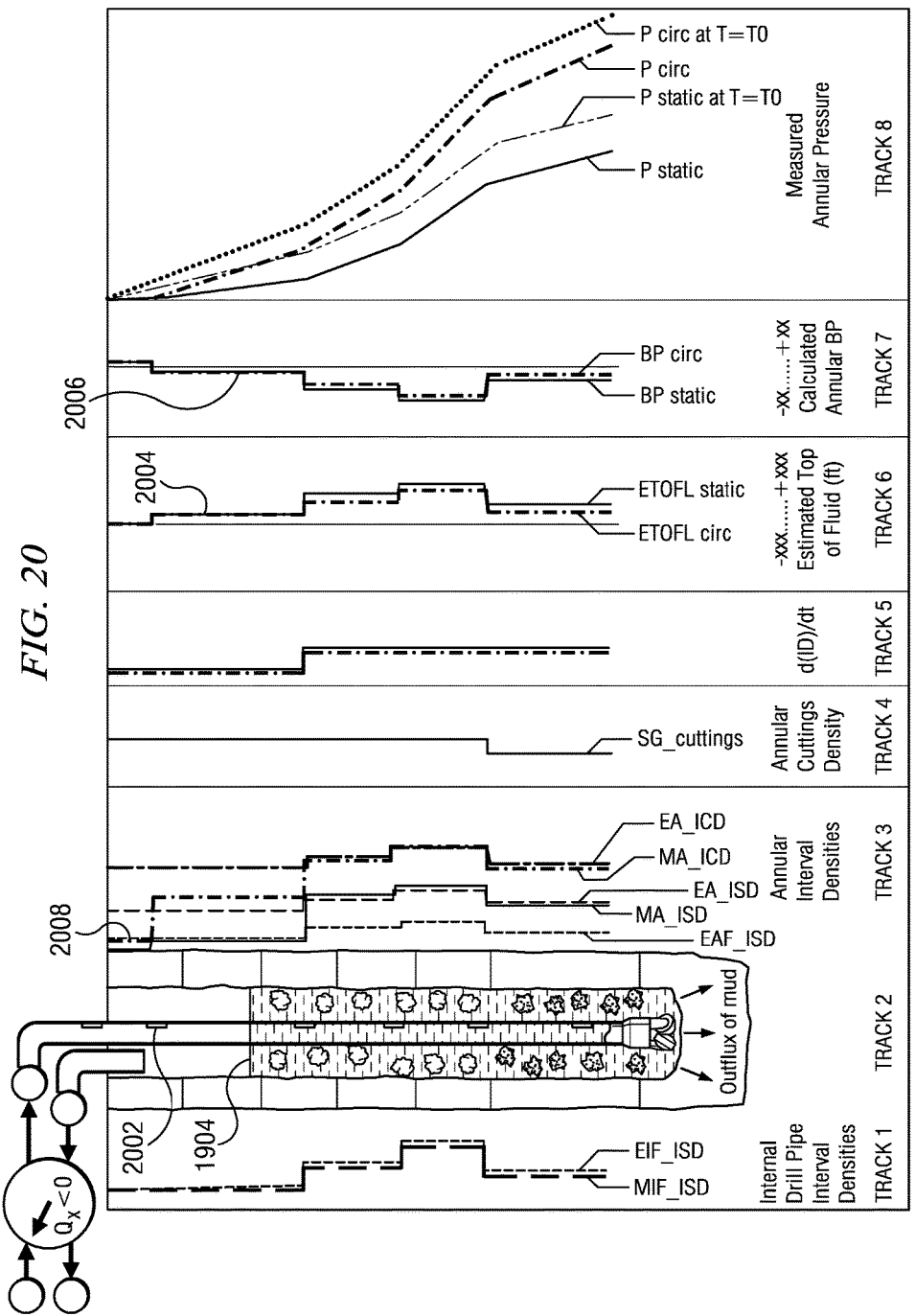

FIGS. 14, 19, and 20 depict a hypothetical example of a well drilling operation including a drilling fluid outflow event. Track 2 of FIG. 14 depicts the drill bit penetrating a new formation 1402 as described above with respect to FIGS. 14-17. In FIGS. 19 and 20, outflow of drilling fluid into the formation is depicted at 1902 in track 2. FIGS. 14, 19, and 20 display the same tracks as described above in FIGS. 6-8. In this example, FIG. 14 depicts the hypothetical drilling operation at time $t_1=0$ (after penetrating formation 1402 but prior to the fluid outflow event shown on FIGS. 19 and 20). It will be understood that the disclosed embodiments are not limited by the depiction of the fluid exiting the bottom of the well. Outflow may occur substantially anywhere along the length of the borehole as is known to those of ordinary skill in the art. In track 3 of FIG. 14, the measured and expected interval densities are substantially equal to one another along the length of the wellbore (i.e., MA_ISD=EA_ISD and MA_ICD=EA_ICD) indicating that the cuttings volume, cuttings density, cuttings transport and fractional volume, and the annular frictional effects have been properly modeled. Moreover, as shown at 1404, $Q_x$ is approximately equal to zero indicating no inflow or outflow.

With continued reference to FIG. 14, the circulating and static top of fluid levels ETOFL are shown on track 6. These values may be computed from the measured interval static densities MA_ISD (e.g., according to Equation 20). As depicted, ETOFL from the surface to the first pressure sensor is zero. The ETOFL values tend to vary downhole, however the net sum or average is approximately zero. The calculated surface annular back pressure BP anti-correlates with ETOFL (as shown on track 7) and again averages approximately zero at the $t_1=0$ conditions.

FIG. 19 depicts the hypothetical drilling operation shown at time $t_2=t_1+\Delta t$. The outflow event has started as depicted at 1902 of track 2 causing $Q_x$ to be less than zero as depicted at 1908. The parameter $Q_x$ may be obtained as described above with respect to FIG. 15. In the depicted example, the drilling fluid level in the annulus has dropped below the surface due to the outflow as shown at 1904 in track 2 (e.g., during static wellbore conditions). The measured static and circulating pressures are less than the pre-outflow values as depicted at 1912 and 1914 in track 8. The interval densities MA_ICD and MA_ISD have decreased in the interval containing the liquid level and any intervals above that one as shown at 1906 and 1907 of track 3. These values may (or may not) drop below EAF_ISD depending on the liquid level, cuttings loading and annular frictional effects. The derivatives of the interval circulating and static densities are negative within and above the interval containing the liquid level and zero in the intervals below the interval containing the liquid level as shown at 1916 and 1918 of track 5.

With continued reference to FIG. 19, the ETOFL values have increased at all intervals containing a full column of drilling fluid as shown at 1922 such that the sum or average has become positive. FIG. 19 depicts a scenario in which the fluid level is above the uppermost ASM pressure sensor 630D. In this example, the interval between the surface and uppermost pressure has a zero-valued ETOFL by definition. The interval directly below the interval containing the liquid level may be taken to have a high quality ETOFL and BP values. The calculated average surface annular BP is negative. The average value represents the initial amount of reduction in the actual BP for the MPD surface equipment. As the BP is reduced, gas or nitrogen may come out of solution thereby reducing the density of the annular fluid in a positive feedback condition. If no BP is being applied, the bottom hole pressure (BHP) of the lowermost sensor extrapolated to total depth represents the formation pore pressure and maximum BHP for drilling ahead.

FIG. 20 is similar to FIG. 19, but depicts a scenario in which the drilling fluid level has dropped below the first ASM (note that fluid level 1904 is below uppermost ASM sensor 2002). In this scenario the interval including the fluid level now has a non-zero ETOFL and BP as shown at 2004 and 2006 in tracks 6 and 7. Moreover, the interval densities MA_ISD and MA_ICD are near zero in the uppermost interval as shown at 2008 in track 3 since this interval contains no fluid. The ETOFL and BP values may again be obtained from the first interval below the fluid level.

It will be understood that while the annular fluid level may drop during a lost circulation event, the internal drill-pipe fluid level may or may not coincide with the annular fluid level due to differing pressures above and below both fluid levels. This condition is sometimes referred to as in the art as "U-tubing". Internal pressure measurements may be used to determine the fluid levels in the interior of the drill-pipe in an analogous manner to the method described above for the annular fluid level. Moreover, in extreme lost circulation events, the fluid level in the annulus may drop during circulation while drilling fluid is being pumped down the interior of the drill string.

It will be understood that the development of an outflow may cause corresponding changes in certain of the disclosed parameters other than those described above with respect to FIGS. 14, 19, and 20. Table 9 lists the expected changes caused by an outflow. It will be understood that the minimization may not be required to compute the new expected interval densities EA_ISD and EA_ICD.

TABLE 9

| Parameter | Changes with Time | Changes with Depth |
|---|---|---|
| $Q_x$ | $Q_x < 0$; May change with time | $Q_x < 0$; May change with depth |
| $F_x$ | No change | No change |
| $SG_{cuttings}$ | No change | No change |
| MA_ISD vs. EA_ISD | MA_ISD < EA_ISD Difference changes until liquid level stabilizes. MA_ISD decreases with time over the affected intervals which are the intervals above and including the fluid level. | MA_ISD < EA_ISD Moving down the annulus with time until liquid level stabilizes. MA_ISD drops below or close to EAF_ISD in interval having liquid level. MA_ISD and MA_ICD in intervals below liquid level not be affected. |
| MA_ICD vs. EA_ICD | MA_ICD < EA_ICD Difference changes until liquid level stabilizes. MA_ICD decreases with time over the affected intervals which are the intervals above and including the fluid level. | MA_ICD < EA_ICD Moving down the annulus with time until liquid level stabilizes. MA_ICD drops below or close to EAF_ISD in interval having liquid level. MA_ICD closely approaches MA_ISD in interval containing the fluid level and equals MA_ISD in intervals above the fluid level in which non-liquids are present. |
| Equivalent top of fluid | Both static and circulating ETOFL increase with time in each interval below the interval containing the fluid level until fluid level stabilizes. Average of all intervals is positive. | Both static and circulating ETOFL is positive in the intervals below and including the liquid level. Moves down until liquid level stabilizes. Interval below fluid level has representative ETOFL. Average of all intervals is positive. |
| Calculated Surface annular BP | Both static and circulating BP decrease with time in each interval below the interval containing the fluid level until fluid level stabilizes. | Both static and circulating BP are negative in the intervals below and including the liquid level. Moves down until liquid level stabilizes. Average of all intervals is negative. |
| ASM Pressure | Decreases in all sensors. Decreases with time if outflow continues. | Decreases in all sensors until liquid level stabilizes. Amount of decrease will be the same for all sensors below the fluid level for incompressible fluids. |
| ASM Temperature | Increases in all intervals due to lack of circulation. Increases with time. | May increase in affected intervals due to lack of circulation. |

In response to an outflow event a drilling operator often shuts in the well, stops pumping, and closes the annular choke until pressures stabilize. The interval densities may be utilized to determine the liquid level of the drilling fluid while the ASM and APWD measurements may be used to obtain the BHP when the liquid level stabilizes. This BHP then becomes the maximum BHP that should be applied during the future drilling operations. When drilling restarts, the flow rate may be reduced and/or nitrogen may be injected into the input flow stream to reduce the density of the drilling fluid sufficiently so that the BHP remains below the maximum value. The average calculated annular BP or any one of the interval calculated BP or the downhole measured annulus pressures may be used in an automatic choke control. As disclosed herein, the choke position may be controlled in time intervals by an electro-mechanical server to reduce the BP by the amount calculated until the system stabilizes.

Figure 21B:
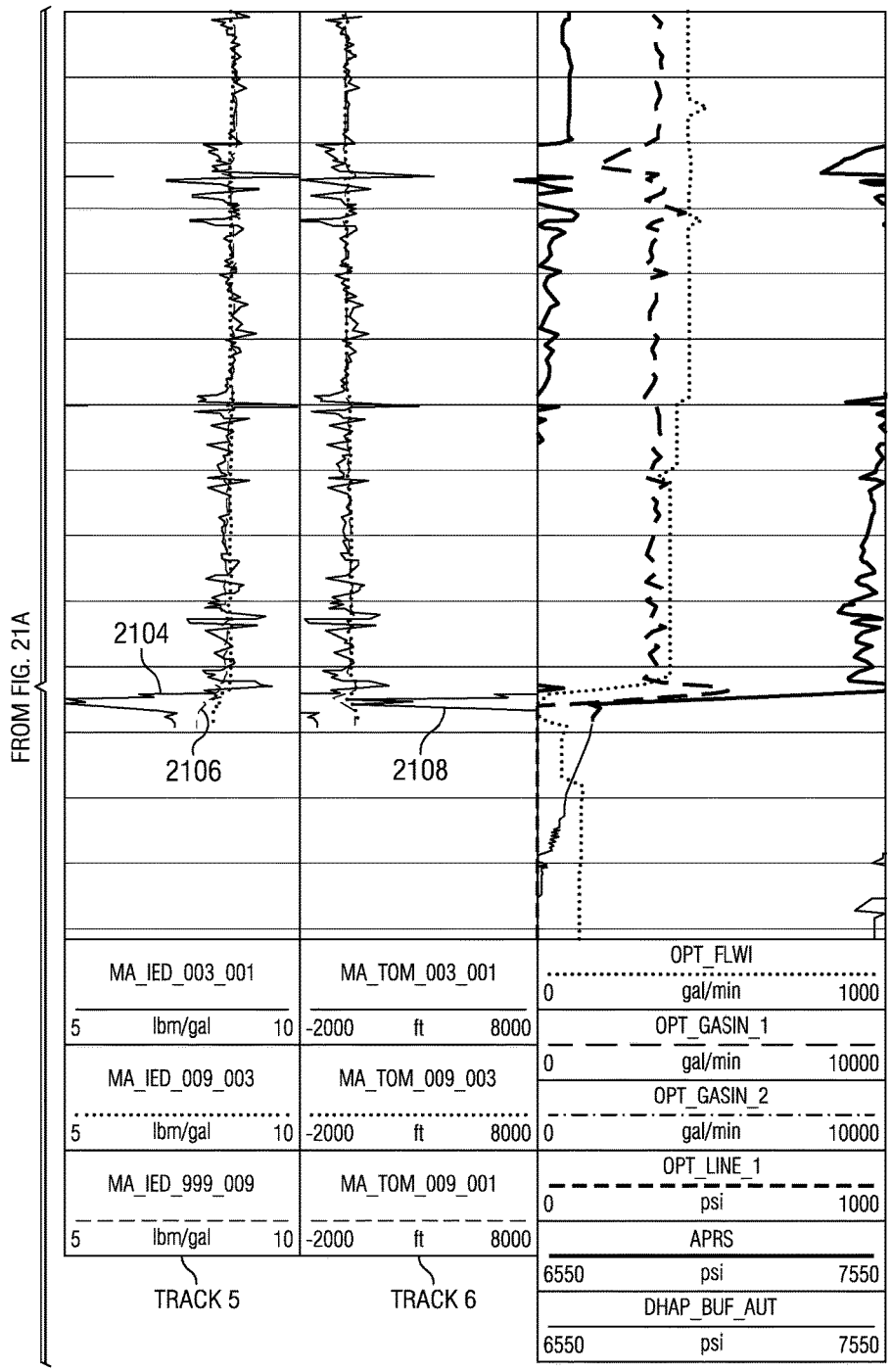
FIG. 21 depicts one example of a log from a well drilling operation in which drilling fluid flowed out of the wellbore into the formation.

FIG. 21 (including FIGS. 21A and 21B) depicts an example log from a well drilling operation in which drilling fluid was lost during the drilling operation. The depicted log is time stamped in track 1 (FIG. 21A). The lowermost annular pressure measurement was made in a Schlumberger arcVISION® tool deployed in the BHA. This pressure measurement is labeled APRS in track 3. The drill string further included first and second ASM annular pressure sensors labeled 1231 and 1244 in track 3. Density values based on a single sensor measurement are plotted in track 4. MA_ED_001 corresponds to the APRS pressure measurement, MA_ED_003 corresponds to the 1244 pressure measurement, and MA_ED_009 corresponds to the 1231 pressure measurement. Interval densities are plotted in track 5 (FIG. 21B). MA_IED_003_001 corresponds to the interval between the APRS and 1244 pressure measurements, MA_IED_003_009 corresponds to the interval between the 1244 and 1231 pressure measurements, and MA_IED_999_009 corresponds to the interval between the 1231 pressure measurement and the surface. Equivalent top of fluid values for each of the aforementioned intervals are plotted in track 6.

In the depicted example, downhole dynamics sensors detected a high degree of stick/slip in a measured depth range from about 5152 to about 5179 meters. A viscous pill was pumped on 14-Dec 16:00 one while the back pressure was kept at 350 psi. This was observed to stabilize the whole and drilling continued at a controlled rate of penetration to 5199 meters. On 15 Dec 07:20 the applied torque increased from 8000 to about 12,700 foot pounds and partial fluid losses were thought to occur based on bit level observations. At 07:42 pressures were observed to drop significantly in response to a lost circulation event and a loss of hydrostatic head. At the APRS sensor, the pressure dropped from about 7500 to about 6800 psi as indicated at 2102. The interval density between the APRS and 1244 pressure sensors also dropped from about 8.5 to about 5 ppg as indicated at 2104, while the other two interval densities remain approximately unchanged (dropping from about 8.5 to about 8 ppg) as indicated at 2106. Moreover the ETOFL of the lowermost interval the first spiked to a positive value before dropping to about −10,000 feet as indicated by the wraparound at 2108. These results strongly indicate a lost circulation event in the lowermost interval, likely at the bit. Drilling and circulation was subsequently suspended.

Figure 22A:
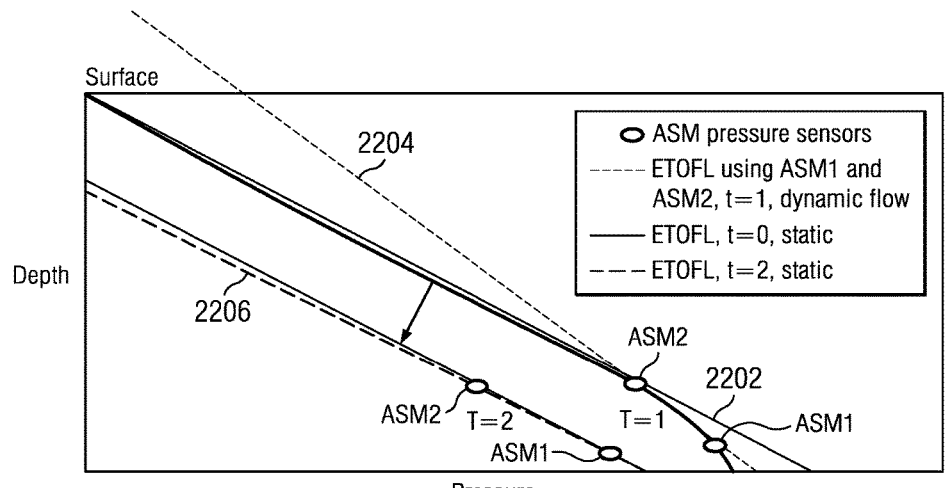
FIGS. 22A and 22B depict schematic depth versus pressure plots that illustrate equivalent top of fluid level changes that may result from lost circulation events.
Figure 22B:
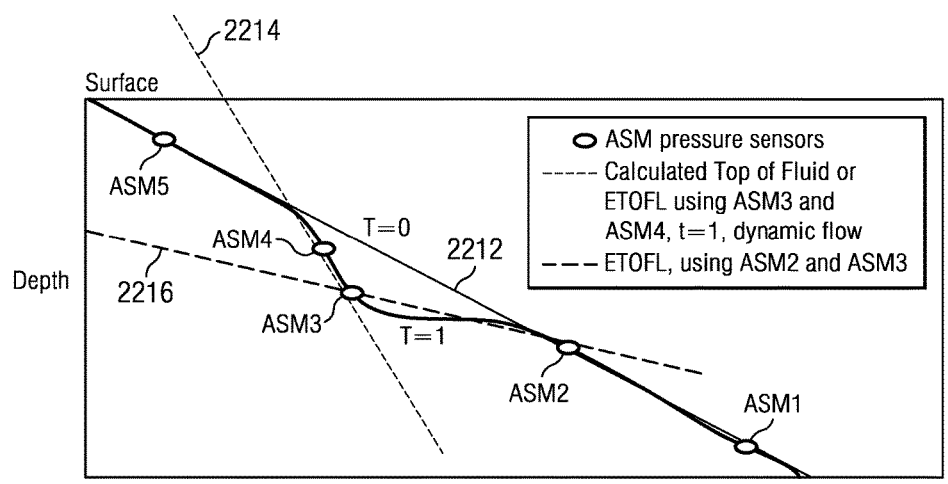

FIGS. 22A and 22B depict schematic depth vs. pressure plots illustrating ETOFL changes that may result from lost circulation events. In FIG. 22A the lost circulation event occurs at (or near) the bit. Prior to the event (at time t=0), the depth vs. pressure curve is approximately linear as indicated at 2202. At time t=1, the lost circulation event causes a pressure drop at the lowermost sensor ASM1 which may result in an increasing ETOFL (above the surface) in the lowermost interval (between ASM1 and ASM2) as indicated by the increased slope at 2204. As time progresses and the ETOFL may decrease significantly as indicated at 2206 (and 2108 of FIG. 21).

FIG. 22B depicts a schematic depth vs. pressure plot for a lost circulation event that occurs above the bit (between ASM2 and ASM4 in this example). Prior to the event, the depth vs. pressure curve is approximately linear as indicated at 2212. As circulation is lost the measured pressures drop at sensors ASM3 and ASM4. This may result in an increased ETOFL (above the surface) in the interval between sensors ASM3 and ASM4 as indicated at 2214 and a decreased ETOFL between sensors ASM2 and ASM3 as indicated at 2216. This signature strongly suggests a lost circulation event above the bit (e.g. nearby to ASM3 in FIG. 22B).

Figures 23, 23A:
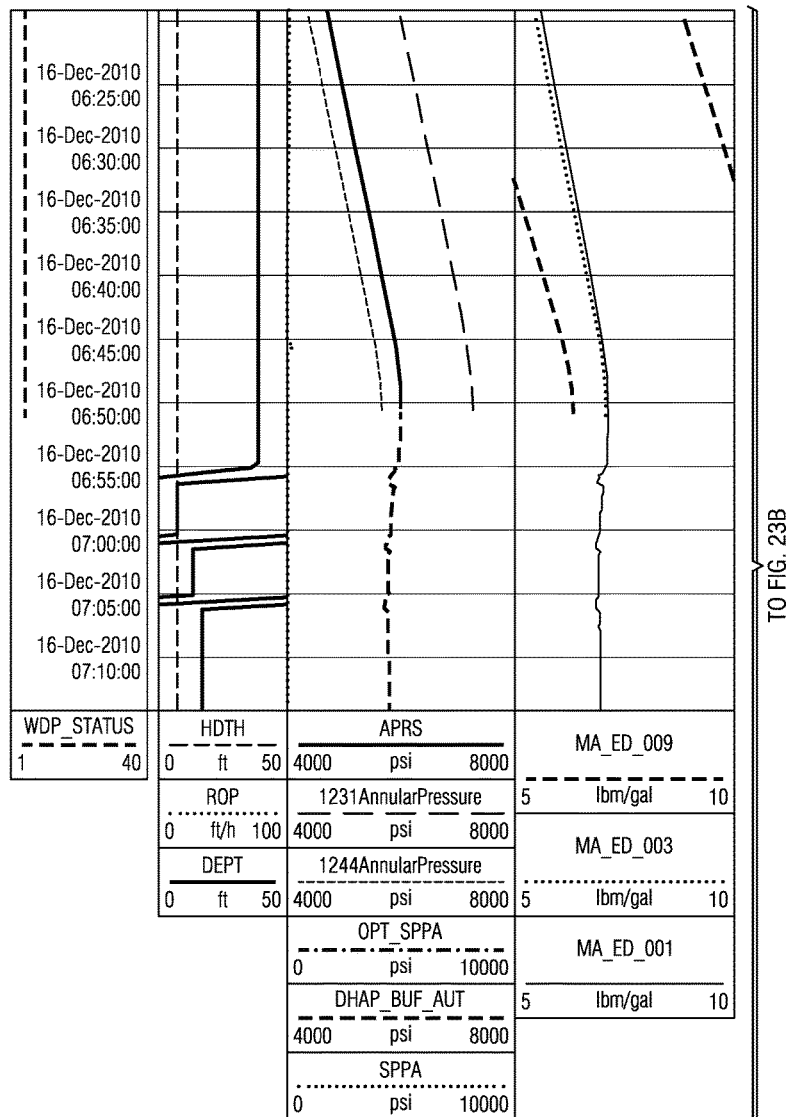
FIG. 23 depicts another example of a log from the well drilling operation depicted on FIG. 21.

FIG. 23 (including FIGS. 23A and 23B) depicts an example log from the well drilling operation depicted in FIG. 21 taken about one day later (the morning of 16-Dec). The same tracks and data flow are depicted. After drilling was discontinued (as described above with respect to FIG. 21), the BHA was pulled uphole to 5093 meters measured depth without circulation. An attempt was made to regain circulation at a low flow rate without success. After pulling the BHA back into the casing for a period of time, then tripping back to bottom, drilling fluid was again pumped into the well. The aforementioned interval densities and equivalent top of fluid were monitored while filling. The ETOFL can be seen to be rising with filling at 2302. Pumping was suspended at 06:51 and fluid level shots were performed using an Echometer. The Echometer detected a fluid depth of 2038 feet which is comparable to the average ETOFL of 2000 feet shown at 2304 on FIG. 23.

Managed Pressure Drilling Choke Adjustments

During managed pressure drilling (MPD) operations, the surface annular back pressure (SBP) is maintained such that the bottom hole pressure (BHP) remains in a predefined small range in order to prevent both lost circulation and kicks or wellbore stability issues. For example, as the mud pumps are brought down, the surface annular back pressure may be increased in order to compensate for the loss of annular friction and is also adjusted (up or down) to account for possible phase changes when using aerated (or nitrogenated) drilling fluid. Automated feedback control is desirable in order to make the adjustment more timely and accurate. Moreover, automatic control may be further desirable in the event of drilling condition changes (e.g., a kick or change in cuttings density). The back pressure calculations disclosed herein may provide for such automated feedback.

Figures 23B, 24:
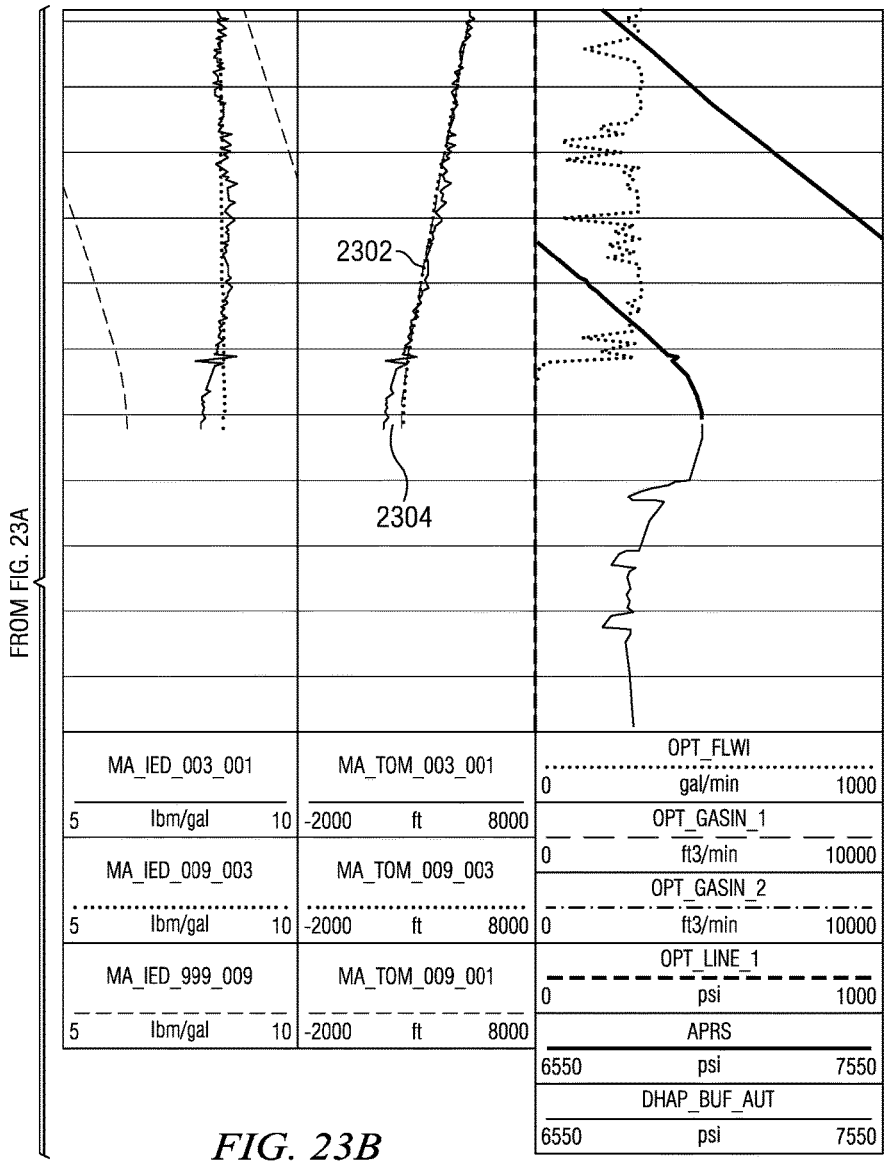
FIG. 24 depicts still another example of a log from the well drilling operation depicted on FIG. 21.

FIG. 24 (including FIGS. 24A and 24B) depicts an example log from the same well drilling operation as was depicted in FIG. 21. Tracks 1 through 7 are identical to FIGS. 21 and 23. Track 8 is added and includes a computed interval back pressure BP using Equation 21. MA_BP_003_001 corresponds to the BP computed for the interval between the APRS and 1244 pressure measurements while MA_IED_003_009 corresponds to BP computed for the interval between the 1244 and 1231 pressure measurements. OPT_LINE_1 plots the actual SBP.

Figure 24A:
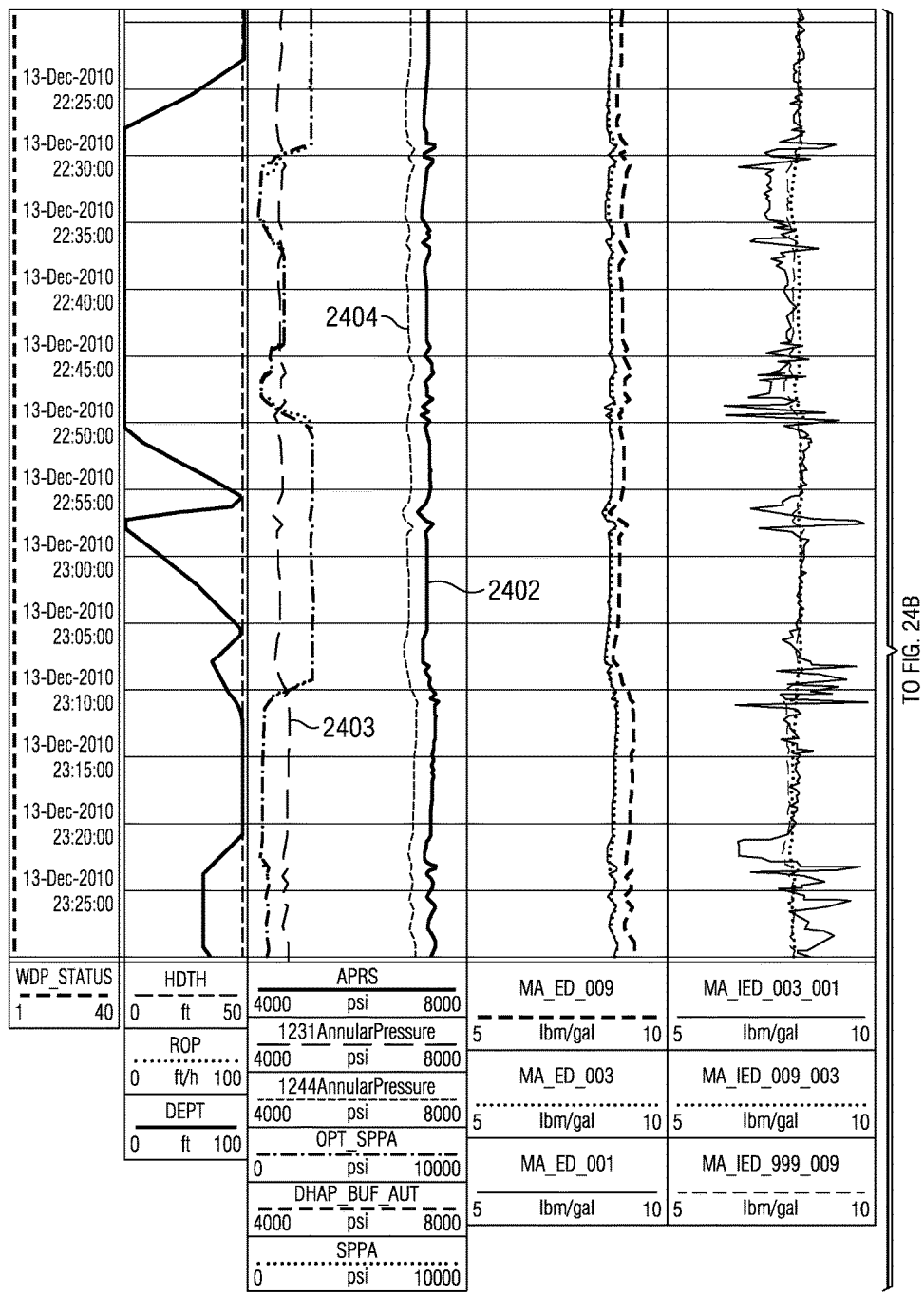
Figure 24B:
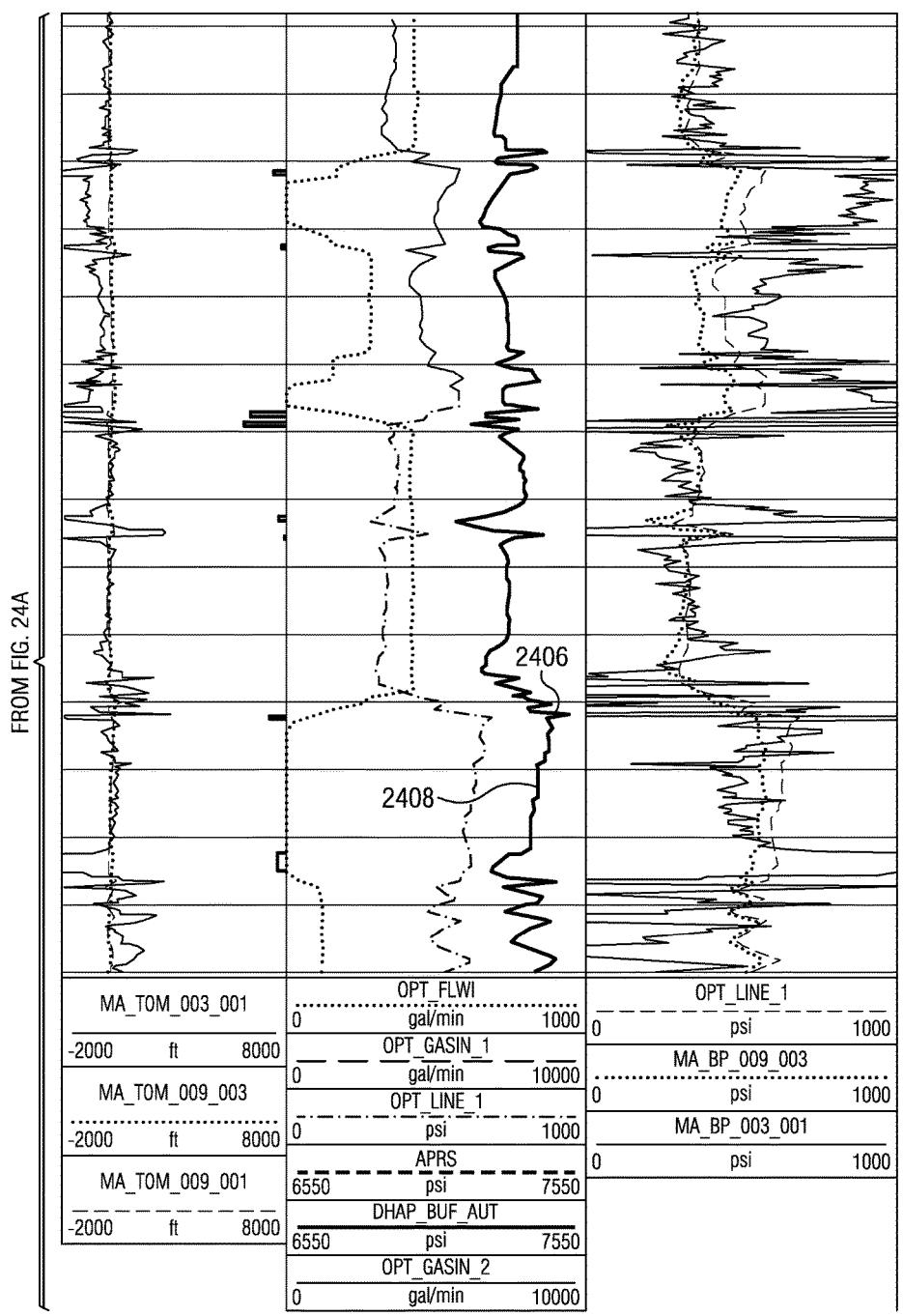

In FIG. 24, logging data is shown that corresponds to a time interval prior to making a connection (Dec 13 23:10-23:30) in which the pumps were shut down, but the wired drill pipe remained connected. Annular back pressure was being applied; however there was no nitrogen injection. The average back pressure during prior drilling (e.g., at 22:20) was about 350 psi. When shutting the pumps down at 23:10, back pressure was increased by 275 psi to 625 psi to compensate for the loss of annular friction. The downhole pressure measurements at the APRS, 1231, and 1244 sensors are seen to increase by about 100-150 psi above the drilling value at 2402, 2403, and 2404 in track 3 (FIG. 24A). The APRS pressure measurement is reproduced in track 7 at 2406 using the same resolution as the SBP (FIG. 24B).

In this operation the goal was to minimize the pressure overshoot and reduce the pressure to the drilling value. The overshoot was reduced by lowering the back pressure over the following 10 minutes (from 23:10 to 23:20) as indicated at 2408. In this operation, a back pressure of about 525-550 psi appears optimal for compensating for the loss of annular friction losses. Therefore, the annular pressure losses due to friction were about 175 psi, rather than the 275 psi originally assumed. Such calibration of the back pressure may improve stability and eliminate inflow issues at connections.

Track 8 displays the computed BP. These computed back pressures indicate the efficiency at which the SBP is being transmitted to the drilling fluid in the annulus at any particular interval. The computed BP may be compared directly in a control loop to obtain a desirable SBP, for example, via adjusting the SBP such that the SBP and computed BP are approximately equal. Since a constant BHP is desirable, the MA_BP_003_001 data may be used directly in the control loop. In FIG. 24 there are several intervals in which swab effects are observed, e.g., between 23:22 and 23:27. In such instances, the computed BP is higher than the actual SBP implying that SBP should be increased which would in turn decrease the computed BP. The aforementioned control loop may be configured, for example, to incrementally increase SBP until SBP is approximately equal to the computed BP. Such a loop tends to be inherently stable since these quantities generally move in opposite directions (e.g., increasing SBP decreases BP and decreasing SBP increases BP). When surge effects take place (e.g., between 22:50 and 22:55), the computed BP is lower than the actual SBP. The SBP should therefore be lowered.

The above described methodology for controlling back pressure during managed pressure drilling operations may be advantageously highly stable since the computed back pressure (from Equation 21) is sensitive to the transmission efficiency of the applied SBP to the annular fluid.

In maintaining a desired BHP during MPD operations, the input flow rate may be adjusted, the mud weight may be adjusted, the volume of injected nitrogen varied, or the BP may be adjusted. In many cases two or more of these parameters may be adjusted substantially simultaneously. Moreover, the average calculated annular BP or any one of the interval calculated BP or the measured downhole measured annulus pressure may be used in an automatic choke control methodology. The choke position may be controlled, for example, in incremental steps by an electro-mechanical device until the system stabilizes and BP and SBP are substantially equal as described above.

Table 10 lists the direction of change for the theoretical BP calculation across the depth intervals while certain other drilling events take place (other than compensating for annular friction losses as described above). These events are listed in column 1. Column 2 lists the desired change in the surface BP during MPD operations in order to counter-act the event down-hole and to maintain a substantially constant BHP (or to maintain the BHP within a safe mud weight window).

TABLE 10

| Event | Desired Surface BP Adjustment | Theoretical or Calculated BP | |
|---|---|---|---|
| | | BP across event | BP below event |
| Drilling lighter Cuttings | Increase Surface BP | Circulating and static BP will increase at lowermost sensor pair | NA |
| Drilling heavier Cuttings | Decrease Surface BP | Circulating and static BP will decrease at lowermost sensor pair | NA |
| Washout | Increase Surface BP | Circulating BP will increase across washout. Static BP constant | No Change |
| Pack-off | Decrease Surface BP | Circulating BP will decrease across pack-off. Static BP constant | Circulating BP will slightly increase below the pack-off |
| Kick | Increase Surface BP | Circulating and static BP will increase across kick interval | Circulating and static BP will slightly decrease below kick interval if applicable |
| Lost Circulation | Decrease Surface BP | Circulating and static BP will slightly decrease across fluid level | Circulating and static BP will decrease in all intervals below fluid level |
| Mud Rheology or property changes resulting in interval density increases | Decrease Surface BP since BHP will be increasing | If interval density increases, circulating and static BP will decrease | NA |
| Mud Rheology or property changes resulting in interval density decreases | Increase Surface BP since BHP will be decreasing | If interval density decreases, circulating and static BP will increase | NA |

In-Situ Monitoring of Drilling Fluid Health

As described above, the internal ASM pressures and temperatures may be used to measure the input mud density and temperature profiles. The internal ASM measurements may be further used to compute hydraulic modeling parameters that are in turn used to predict subsequent pressure and temperature effects on the annular fluid as it moves up the annulus. When changing the mud weight or other properties such as the viscosity during a viscous sweep, it may be beneficial to know where the viscous mud (or pill) is in the system. When the mud becomes uniform within the system, drilling can resume.

A circulating time or bottoms up time may be used to determine the depth from which the cuttings collected at the surface have come. Many times the driller will circulate "bottoms up" before POOH (Pull Out Of Hole). This is estimated using an estimated borehole diameter and volume which can be in error. Since the time needed to clean the borehole of all cuttings is not well defined, a safety factor of 1.5 to 2 is commonly used, meaning that circulation time is increased by these factors to insure a clean hole before POOH.

The interval densities and annular friction tend not to change with time once the mud is homogeneous. Non-changing interval densities may therefore be used to determine when the mud density is homogeneous within the borehole volumes. When the annulus is free of cuttings, the annular interval densities tend to reflect the density of the input mud corrected for pressure and temperature effects. Circulation can then be stopped in order to POOH. Either or both of Equations 22 and 23 may be used to determine when the mud system is homogeneous and other drilling operations have resumed.

Production Analysis

Obtaining production in wells, especially lateral wells, is often complicated by conveyance issues. In a lateral well, deployment of downhole tools through standard gravity descent may not be possible. To overcome this difficulty, the tools may be either pushed or pulled into the well by means of drill pipe assisted logging, tubing conveyance, tractored, propelled with a swab cup, or some other means. The accumulation of debris while conveying various production tools into the well can be particularly problematic in horizontal or near horizontal wells. Moreover excessive rig time is often required for conveying conventional wireline (WL) tools into horizontal wells such that WL tools are sometimes not used.

Wireline conveyed production analysis tools often include numerous measurement sensors deployed at various depths in the wellbore. Such measurement sensors may alternatively be deployed using wired drill pipe conveyance. The use of WDP enables substantially identical sensors to be deployed in the same configuration and at multiple depths in the wellbore. Sensor deployment may be accomplished via tripping the WDP into the bore hole. The surface pressure may be adjusted such that formation fluids flow into the wellbore and up the interior of the drill pip where they may be vented through a surface choke or routed to production facilities. The along string pressure and temperature measurements as well as the computed interval densities and temperature gradients may then be used to gauge the type and rate of fluid flow from the various intervals. Additionally, by controlling the up-hole pressure, the effect of the pressure variability on the fluid properties down-hole can be assessed—such as phase changes, flow rate changes, liquid holdup changes, and the like.

Cuttings Transport Management

Adequate transport of cuttings from the drill bit to the surface is necessary in order to prevent various drilling problems such as friction caused by the accumulation of the cuttings, generation of a pack-off around the BHA or other locations on the drill string, and stuck drill pipe. Increased friction due increased cuttings volume or barite sag in the drilling fluid can slow the removal of the cuttings and result in one or more of the above problems. Cuttings transport issues, if not properly identified and mitigated, can quickly spiral out of control, for example, from increased friction, to a pack-off, to a stuck drill pipe.

In high angle wells, for example including horizontal and near horizontal wells, there is an increased tendency for cuttings to drop out of suspension. This can occur for at least two reasons, including the non-uniform annular flow profile with stagnation increasing towards the bottom of the borehole and the action of gravity in a perpendicular direction to the flow velocity. Having only a short distance to fall into the stagnation flow profile at the bottom of the bore hole, the aforementioned cutting transport problems can therefore manifest quickly in high angle wells.

Various factors such as drill string rotation rate, drilling fluid flow rate, and periodic BHA and drill-pipe axial movements help to keep the cuttings bed stirred up and in suspension. However, at the time of this disclosure there is no known definitive down-hole measurement available to measure the degree of success of these practices at specific depth intervals. Drilling personnel often wait to determine whether or not targeted cuttings appear at the shale shakers approximately (e.g., 20-90 minutes after penetration of the particular formation). Current practice may also make use of single sensor BHA measurements from which drilling personnel look for increases in overall annular density with time to detect cuttings buildups. However, such a buildup may also be due to drilling denser rock with a high rate of penetration or to pack-offs located above the BHA. It is commonly assumed that a decrease in annular density with time corresponds to better hole cleaning and cuttings transport. In reality, cuttings dropping out of solution can give the same signature. In contrast, the ASM pressure and temperature measurements, computed interval densities, and their derivatives may be used to distinguish cuttings drop-out from other effects and locate the affected depth intervals.

Figure 25:
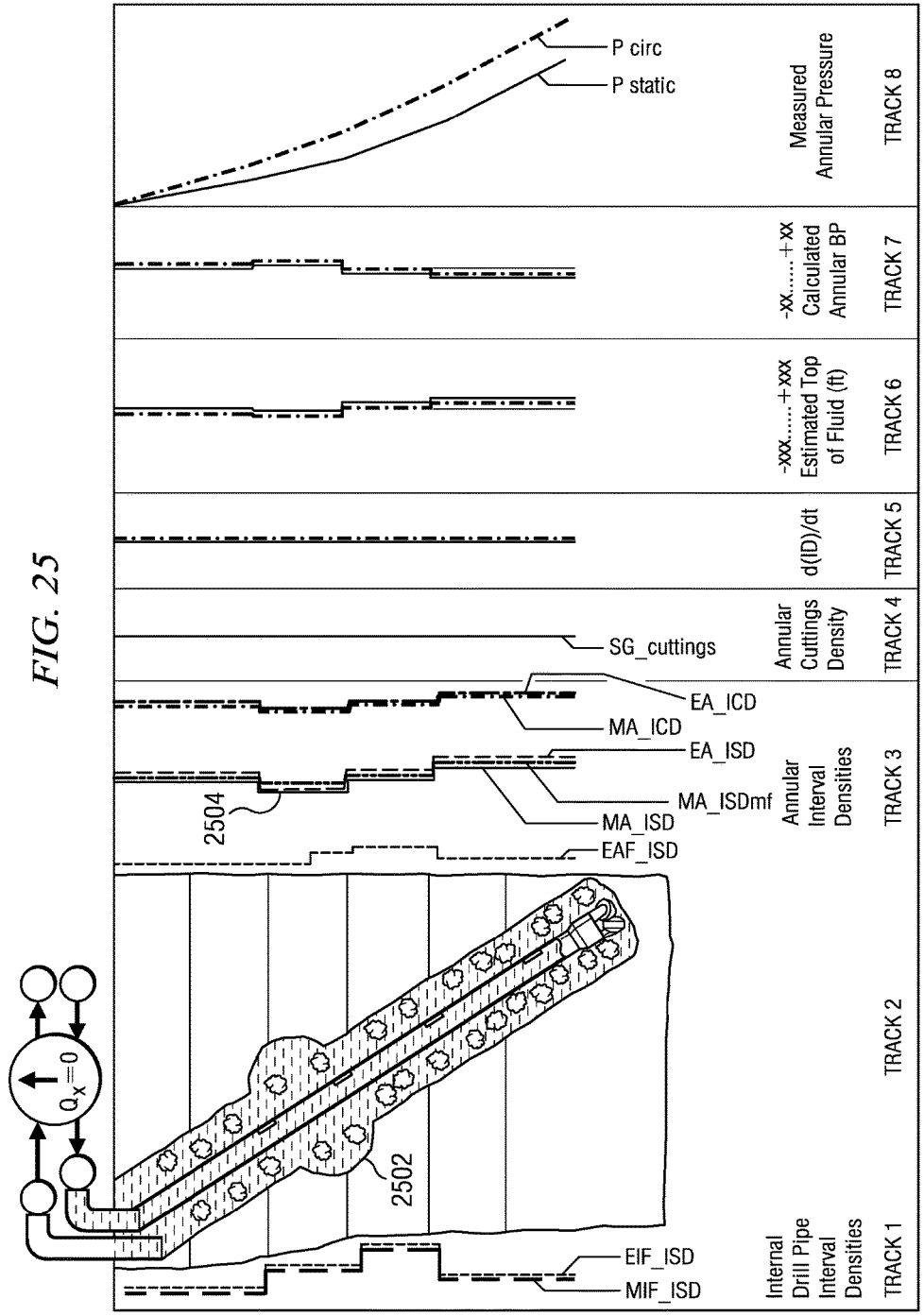
FIGS. 25 and 26 depict a hypothetical example of a well drilling operation in which cuttings are dropping out of suspension in the annular drilling fluid with FIG. 22 depicting the hypothetical drilling operation at time $t_1=0$ and FIG. 23 depicting time $t_2=t_1+\Delta t$.
Figure 26:
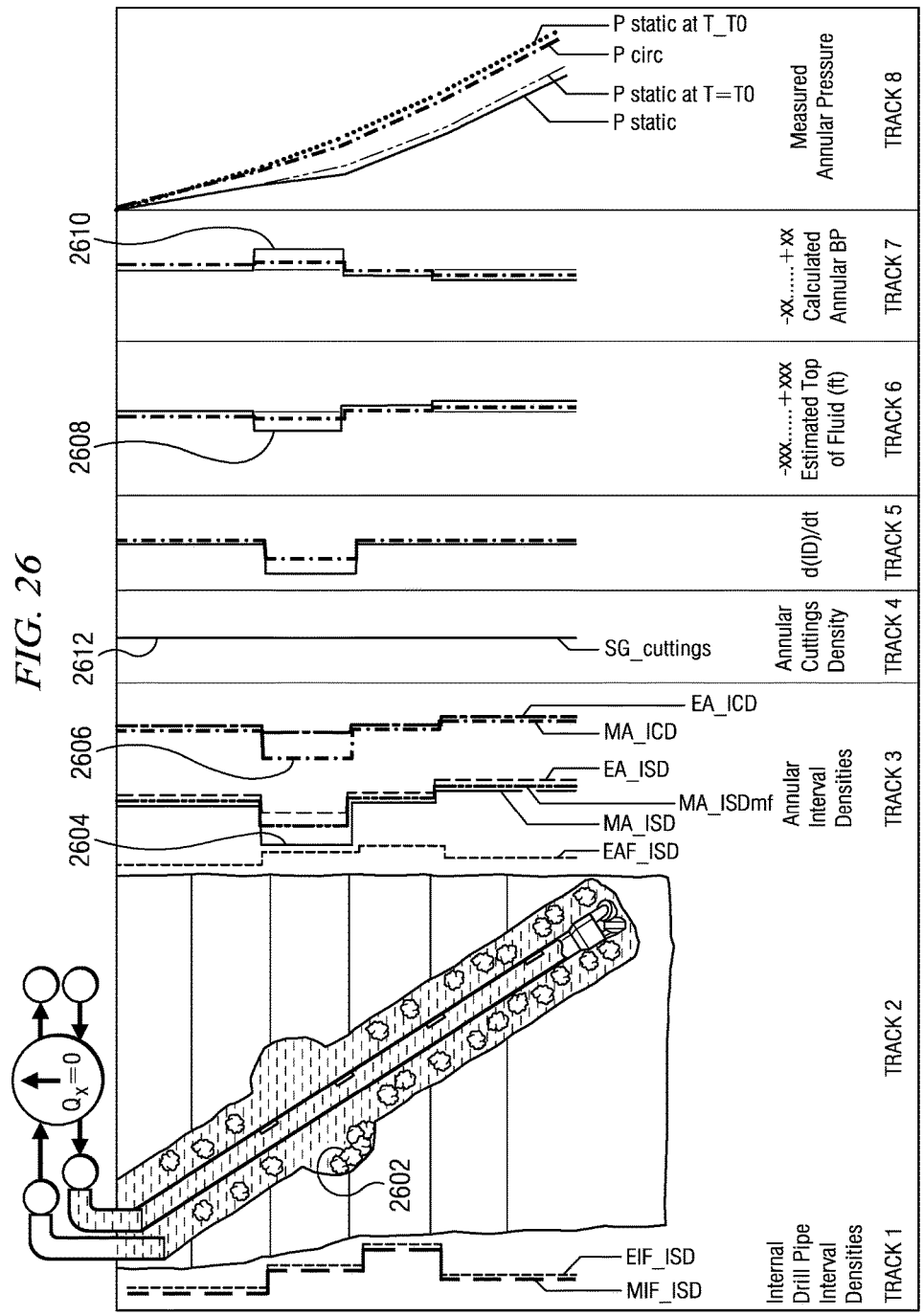

FIGS. 25 and 26 depict a hypothetical example of a well drilling operation in which borehole cuttings drop out of suspension in a deviated borehole. Track 2 of FIG. 25 includes an enlargement at 2502 as described above with respect to FIGS. 9 and 10. FIGS. 25 and 26 display the same tracks as described above in FIGS. 6-8. In this example, FIG. 25 depicts the hypothetical drilling operation at time $t_1=0$ (after the formation of the washout but prior to cuttings dropping out of suspension). It will be understood that the disclosed embodiments are not limited by the depiction of a washout. In track 3 of FIG. 25, the measured and expected interval densities are substantially equal to one another along the length of the wellbore (i.e., MA_ISD=EA_ISD and MA_ICD=EA_ICD) indicating that the cuttings volume, cuttings density, cuttings transport and fractional volume, and the annular frictional effects have been properly modeled.

FIG. 26 depicts the hypothetical drilling operation at time $t_2=t_1+\Delta t$ at which cuttings are dropping out of suspension. The dropped cuttings are depicted schematically in track 2 (at 2602) in FIG. 26. As the cuttings move uphole from the bit, the cuttings density remains approximately constant and may be tracked as a function of time and depth (e.g., after $SG_{cuttings}$ stabilizes). When cuttings drop out of suspension, $SG_{cuttings}$ may decrease significantly (e.g., by about 10 to about 50 percent).

An automated routine may be utilized to identify and quantify the severity of a cuttings transport issue (e.g., dropped cuttings from the annular volume) as a function of time and depth prior to running the aforementioned minimization routine. When cuttings are dropping out of suspension, MA_ISD decreases below EA_ISD and approaches (or is substantially equal to) EAF_ISD (as can be seen by comparing FIGS. 25 and 26 at 2504 and 2604). MA_ICD also decreases below EA_ICD as depicted at 2606 of FIG. 26. The Equivalent top of fluid ETOFL may also decrease while the annular back pressure BP increases as depicted at 2608 and 2610.

While the interval density changes tend to mimic those of a kick signature and/or a lost circulation signature, cuttings transport issues can be readily identified by noting that $Q_x=0$ in FIGS. 25 and 26. This distinguishes cuttings transport from inflow or outflow events. Note also that the routine holds $SG_{cuttings}$ constant as depicted at 2612. In the event that $SG_{cuttings}$ is mistakenly computed instead of being held constant by the program, the value of $SG_{cuttings}$ may drop a value approximately equal to the mud density whereas during a kick (especially a gas kick), $SG_{cuttings}$ drop to a value below the mud density.

It will be understood that cuttings transport issues, especially in inclined wells, may cause corresponding changes in certain of the disclosed parameters other than those described above with respect to FIGS. 25 and 26. Table 11 lists certain changes caused by cuttings dropping out of suspension in the annulus. These changes are observed before a minimization routine has computed new interval density values and adjusted the expected annulus (EA) quantities accordingly.

between the surface and the drill bit. The disclosed embodiments are not limited in any of these regards.

Internal and External Temperature Gradients

Internal and annular temperature measurements made as a function of depth and time may be used to compute various temperature gradients in the borehole. For example, internal and external (annular) temperature gradients may be determined along the length of the drill string (as a function of measured depth). Moreover, radial gradients through the drill string between internal and external temperature measurements may be determined. These temperature gradients may be utilized to evaluate various drill string and tool related conditions as well as various formation related conditions.

In one embodiment, temperature gradients may be computed as a function of both time and depth along the drill string to predict when the borehole temperature in the BHA may exceed rated tool temperatures. These measurements may be made in both circulating and static conditions. In a high temperature formation the temperature of the borehole may increase with both time and depth during static conditions. Therefore, measured temperature gradients may enable the determination of a time at which rated tool temperatures are exceeded. For example, LWD formation fluid sampling operations are generally carried out during static conditions. The aforementioned temperature gradients may enable a maximum time-on-station to be determined

TABLE 11

| Parameter | Changes with Time | Changes with Depth |
| --- | --- | --- |
| $Q_x$ | $Q_x = 0$ | $Q_x = 0$ |
| $F_x$ | May change | May change |
| $SG_{cuttings}$ | NA | NA |
| MA_ISD vs. EA_ISD | MA_ISD equals EA_ISD until cuttings drop-out occurs at which time MA_ISD drops below EA_ISD and approaches the mud density. Differences increase with time until driller takes remedial action. Unlike a washout where MA_ISD remains constant and MA_ICD is affected. | The ISD signatures tend to be affected at particular intervals where cuttings drop-out is most probable, e.g., at 40-65 degree inclination. The depth intervals creating drop-out tend not to change with time. MA_ISD < MA_ISD$_{mf}$. |
| MA_ICD vs. EA_ICD | MA_ICD and EA_ICD tend to mimic the ISD signatures, although the effect may be larger or smaller depending on the drop out volume and the net effect on annular friction. | Same signatures as ISD curves. |
| Equivalent top of fluid | ETOFL decreases with time over the affected intervals as cuttings drop out. | ETOFL decreases over intervals where cuttings are dropping out. Slight increase below affected intervals. |
| Calculated Surface annular BP | BP increases with time as cuttings drop out. | BP increases with time as cuttings drop out. Slight decrease below affected intervals. |
| ASM Pressure | Slight decrease | Slight decrease |
| ASM Temperature | No expected change | No expected change |

A driller may elect to respond to cuttings transport issues, such as cuttings falling out of suspension in the annulus, using a number of mitigating techniques. For example, a drilling operator may elect to (i) increase the rotation rate of the drill string to promote turbulent mixing of the annular fluid, (ii) increase the drilling fluid flow rate, (iii) reduce the rate of penetration (e.g., via reducing weight on bit), or even (iv) replace the drill bit with a less aggressive bit or a bit having a different nozzle configuration. Other BHA components may also be replaced so as to change the pressure drop during which the sampling operation would need to be completed. Circulation may then be resumed so as to cool the BHA.

In another embodiment internal and external measurements may be used to model a radial heat transfer coefficient of the drill string or downhole tool. Such modelling may further include a third temperature measurement to be made between the internal and external fluids (e.g., in an internal circuit board). The use of three temperature measurements may enable non-linear heat transfer effects to be evaluated. Such measurements may be made during circulating and/or static conditions. These temperature measurements may be included in a model to predict drill string temperatures for numerous drilling conditions. For example, temperature gradients may be evaluated at multiple drill string rotation rates (e.g., 50 rpm, 100 rpm, and 200 rpm) and at multiple drilling fluid flow rates (e.g., 300 gpm, 500 gpm, and 800 gpm). This may enable the effects of various drilling parameters, including drill string rotation rate and drilling fluid flow rate, in mitigating high temperature drilling situations.

Developing a heat transfer model, for example, as described in the preceding paragraph may further enable the measured temperatures to be used to calculate a static formation temperature. Obtaining the static formation temperature may be highly valuable in that it is related to numerous parameters of interest including formation heat transfer capacity which is in turn related to the fluid and lithology content of the formation which is still further related to the porosity, hydrocarbon saturation, and pore pressure. Determination of the static formation temperature may further enable circulating and static borehole temperatures to be predicted long before completing the well. Phase changes may also be identified. Moreover knowledge of the static formation temperature may enable staging plans to be refined while tripping into hot wells.

Although numerous methods for computing and utilizing wellbore interval densities and certain advantages thereof have been described in detail, it should be understood that various changes, substitutions and alternations can be made herein without departing from the spirit and scope of the disclosure as defined by the appended claims.

What is claimed is:

1. A method for identifying an inflow event in a subterranean wellbore while drilling, the method comprising:
   (a) rotating a drill bit in a wellbore penetrating a subterranean formation, the drill bit being deployed in a drill string including a plurality of axially spaced along string pressure sensors, said rotating operative to drill the wellbore and enable the inflow event in which formation fluids flow into the wellbore when the formation has a higher pore pressure than a drilling fluid pressure at a depth in the wellbore;
   (b) using the plurality of axially spaced along string pressure sensors to make a corresponding plurality of axially spaced annular pressure measurements while drilling in (a);
   (c) processing the plurality of axially spaced annular pressure measurements to compute a plurality of corresponding measured annular interval circulating densities and measured annular interval static densities;
   (d) monitoring the computed measured annular interval circulating densities and the measured annular interval static densities while drilling in (a);
   (e) evaluating a decrease in at least one of the measured annular interval circulating densities and the measured annular interval static densities and an increase in a differential flow rate as an indicator of the inflow event; and
   (f) processing at least one of the measured annular interval static densities and the differential flow rate to compute a density of an inflow constituent.

2. The method according to claim 1, wherein:
   the measured annular interval circulating density decreases below a modeled annular interval circulating density in (e); and
   the measured annular interval static density decreases below a modeled annular interval static density in (e).

3. The method of claim 1, wherein (e) further comprises evaluating a decrease in at least one of measured the annular interval circulating densities and the measured annular interval static densities moving up the wellbore with time as a further indicator of an inflow event.

4. The method according to claim 1, wherein:
   (c) further comprises processing the plurality of annular pressure measurements to compute a plurality of equivalent top of fluid levels;
   (d) further comprises monitoring the equivalent top of fluid levels with time; and
   (e) further comprises evaluating a negative equivalent top of fluid level as a further indicator of the inflow event.

5. The method according to claim 1, wherein:
   (c) further comprises processing the plurality of annular pressure measurements to compute a plurality of annular surface back pressures;
   (d) further comprises monitoring the annular surface back pressures with time; and
   (e) further comprises evaluating a positive annular surface back pressure as a further indicator of the inflow event.

6. The method according to claim 1, further comprising:
   (g) circulating the drilling fluid through an annular choke while pumping heavy drilling fluid downhole in response to the inflow event indicated in (e).

7. A method for identifying an outflow event in a subterranean wellbore while drilling, the method comprising:
   (a) rotating a drill bit in a wellbore penetrating a subterranean formation, the drill bit being deployed in a drill string including a plurality of axially spaced along string pressure sensors, said rotating operative to drill the wellbore and enable the outflow event in which annular fluids flow into the formation when the formation has a lower pore pressure than a drilling fluid pressure at a depth in the wellbore;
   (b) using the plurality of axially spaced along string pressure sensors to make a corresponding plurality of axially spaced annular pressure measurements while drilling in (a);
   (c) processing the plurality of axially spaced annular pressure measurements to compute a plurality of annular interval densities;
   (d) monitoring the computed annular interval densities with time while drilling in (a); and
   (e) evaluating a decrease in at least one of the annular interval densities and a decrease in a differential flow rate as an indicator of the outflow event.

8. The method according to claim 7, wherein the annular interval densities comprise a measured annular interval circulating density and a measured annular interval static density.

9. The method according to claim 8, wherein:
   the measured annular interval circulating density decreases below a modeled annular interval circulating density in an interval including a liquid level; and
   the measured annular interval static density decreases below a modeled annular interval static density in an interval including the liquid level.

10. The method of claim 8, wherein (e) further comprises evaluating a decrease in at least one of the annular interval densities moving down the wellbore with time as a further indicator of the outflow event.

11. The method according to claim 8, wherein:
   (c) further comprises processing the plurality of annular pressure measurements to compute a plurality of equivalent top of fluid levels;

(d) further comprises monitoring the equivalent top of fluid levels with time; and
(e) further comprises evaluating an increase in the equivalent top of fluid levels below a liquid level as a further indicator of the outflow event.

12. The method according to claim 8, wherein:
(c) further comprises processing the plurality of annular pressure measurements to compute a plurality of annular surface back pressures;
(d) further comprises monitoring the annular surface back pressures with time; and
(e) further comprises evaluating an increase in the annular surface back pressures below a liquid level as a further indicator of the outflow event.

13. The method according to claim 7, further comprising:
(f) shutting in the wellbore and closing an annular choke in response to the outflow event indicated in (e).

* * * * *